United States Patent
Saffer et al.

(10) Patent No.: US 6,990,238 B1
(45) Date of Patent: *Jan. 24, 2006

(54) DATA PROCESSING, ANALYSIS, AND VISUALIZATION SYSTEM FOR USE WITH DISPARATE DATA TYPES

(75) Inventors: Jeffrey D. Saffer, Richland, WA (US); Augustin J. Calapristi, Richland, WA (US); Nancy E. Miller, San Diego, CA (US); Randall E. Scarberry, Richland, WA (US); Sarah J. Thurston, Richland, WA (US); Susan L. Havre, Richland, WA (US); Scott D. Decker, Richland, WA (US); Deborah A. Payne, Richland, WA (US); Heidi J. Sofia, Walla Walla, WA (US); Gregory S. Thomas, Kennewick, WA (US); Lisa C. Stillwell, Richland, WA (US); Guang Chen, Richland, WA (US); Vernon L. Crow, Kennewick, WA (US); Cory L. Albright, Richland, WA (US); Sean J. Zabriskie, Richland, WA (US); Kevin M. Groch, Richland, WA (US); Joel M. Malard, Richland, WA (US); Lucille T. Nowell, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,367

(22) Filed: Sep. 30, 1999

(51) Int. Cl.
G06K 9/62 (2006.01)

(52) U.S. Cl. .......................................... 382/224; 707/1
(58) Field of Classification Search ................ 382/190, 382/195, 186, 187, 189, 224, 225, 228, 229, 382/159; 707/1, 2, 3, 4, 5, 6, 101, 102, 103 R, 707/104.1, 200, 522, 526, 532, 501.1; 345/427, 345/440, 619, 649, 712, 848; 704/9; 705/7, 705/14, 35
See application file for complete search history.

(56) References Cited

U.S. PATENT DOCUMENTS 5,047,842 A 9/1991 Bouman, Jr. et al. ....... 358/515

(Continued)

FOREIGN PATENT DOCUMENTS

EP 0 202 686 A2 11/1986

(Continued)

OTHER PUBLICATIONS

Jonathan C. Roberts, On Encouraging Multiple Views for Visualization, IEEE Paper.*

(Continued)

*Primary Examiner*—Samir Ahmed
(74) *Attorney, Agent, or Firm*—Finnegan, Henderson, Farabow, Garrett & Dunner, L.L.P.; Konstantin Linnik, Esq.

(57) ABSTRACT

A system or method consistent with an embodiment of the present invention is useful in analyzing large volumes of different types of data, such as textual data, numeric data, categorical data, or sequential string data, for use in identifying relationships among the data types or different operations that have been performed on the data. A system or method consistent with the present invention determines and displays the relative content and context of related information and is operative to aid in identifying relationships among disparate data types. Various data types, such as numerical data, protein and DNA sequence data, categorical information, and textual information, such as annotations associated with the numerical data or research papers may be correlated for visual analysis. A variety of user-selectable views may be correlated for user interaction to identify relationships that exist among the different types of data or various operations performed on the data.

Furthermore, the user may explore the information contained in sets of records and their associated attributes through the use of interactive 2-D line charts and interactive summary miniplots.

15 Claims, 49 Drawing Sheets

U.S. PATENT DOCUMENTS

| | | | |
|---|---|---|---|
| 5,121,337 A | 6/1992 | Brown | 702/28 |
| 5,261,093 A | 11/1993 | Asmuth | 707/2 |
| 5,325,298 A | 6/1994 | Gallant | 704/9 |
| 5,361,326 A | 11/1994 | Aparicio, IV et al. | 706/44 |
| 5,446,681 A | 8/1995 | Gethner et al. | 702/27 |
| 5,506,937 A | 4/1996 | Ford et al. | 706/11 |
| 5,528,735 A | 6/1996 | Strasnick et al. | 345/427 |
| 5,546,472 A | 8/1996 | Levin | 382/131 |
| 5,555,354 A | 9/1996 | Strasnick et al. | 345/427 |
| 5,574,837 A * | 11/1996 | Clark et al. | 345/440 |
| 5,592,599 A | 1/1997 | Lindholm | 345/427 |
| 5,619,709 A | 4/1997 | Caid et al. | 707/532 |
| 5,623,679 A | 4/1997 | Rivette et al. | 707/526 |
| 5,623,681 A | 4/1997 | Rivette et al. | 707/522 |
| 5,625,767 A | 4/1997 | Bartell et al. | 345/440 |
| 5,659,766 A | 8/1997 | Saund et al. | 704/9 |
| 5,671,381 A | 9/1997 | Strasnick et al. | 345/848 |
| 5,675,788 A | 10/1997 | Husick et al. | 707/104.1 |
| 5,687,364 A | 11/1997 | Saund et al. | 704/5 |
| 5,692,107 A | 11/1997 | Simoudis et al. | 706/12 |
| 5,696,963 A | 12/1997 | Ahn | 707/5 |
| 5,699,507 A * | 12/1997 | Goodnow et al. | 714/38 |
| 5,721,903 A | 2/1998 | Anand et al. | 707/5 |
| 5,721,912 A | 2/1998 | Stepczyk et al. | 707/102 |
| 5,732,260 A | 3/1998 | Nomiyama | 707/5 |
| 5,737,591 A | 4/1998 | Kaplan et al. | 707/1 |
| 5,751,612 A | 5/1998 | Donovan et al. | 703/6 |
| 5,767,854 A | 6/1998 | Anwar | 345/848 |
| 5,784,544 A | 7/1998 | Stevens | 358/1.13 |
| 5,787,274 A | 7/1998 | Agrawal et al. | 707/102 |
| 5,794,178 A | 8/1998 | Caid et al. | 704/9 |
| 5,819,258 A | 10/1998 | Vaithyanathan et al. | 707/2 |
| 5,838,973 A | 11/1998 | Carpenter-Smith et al. | 717/105 |
| 5,842,206 A | 11/1998 | Sotomayor | 707/5 |
| 5,857,179 A | 1/1999 | Vaithyanathan et al. | 707/2 |
| 5,857,185 A | 1/1999 | Yamaura | 707/5 |
| 5,861,891 A | 1/1999 | Becker | 345/619 |
| 5,864,863 A | 1/1999 | Burrows | 707/103 R |
| 5,873,076 A | 2/1999 | Barr et al. | 707/3 |
| 5,907,838 A | 5/1999 | Miyasaka et al. | 707/4 |
| 5,913,214 A | 6/1999 | Madnick et al. | 707/10 |
| 5,918,010 A | 6/1999 | Appleman et al. | 709/203 |
| 5,926,806 A | 7/1999 | Marshall et al. | 707/3 |
| 5,926,820 A | 7/1999 | Agrawal et al. | 707/200 |
| 5,930,784 A | 7/1999 | Hendrickson | 707/2 |
| 5,930,803 A | 7/1999 | Becker et al. | 707/104.1 |
| 5,945,982 A | 8/1999 | Higashio et al. | 707/3 |
| 5,953,006 A * | 9/1999 | Baker et al. | 345/700 |
| 5,953,716 A | 9/1999 | Madnick et al. | 707/4 |
| 5,963,965 A | 10/1999 | Vogel | 707/501.1 |
| 5,966,139 A | 10/1999 | Anupam et al. | 345/440 |
| 5,982,370 A | 11/1999 | Kamper | 345/760 |
| 5,986,652 A | 11/1999 | Medl et al. | 345/712 |
| 5,986,673 A | 11/1999 | Martz | 345/649 |
| 5,987,470 A | 11/1999 | Meyers et al. | 707/102 |
| 5,991,714 A | 11/1999 | Shaner | 704/9 |
| 5,999,192 A | 12/1999 | Selfridge et al. | 345/440 |
| 5,999,937 A | 12/1999 | Ellard | 707/101 |
| 6,012,053 A | 1/2000 | Pant et al. | 707/3 |
| 6,014,661 A | 1/2000 | Ahlberg et al. | 707/3 |
| 6,023,694 A | 2/2000 | Kouchi et al. | 707/2 |
| 6,026,409 A | 2/2000 | Blumenthal | 707/104.1 |
| 6,029,176 A | 2/2000 | Cannon | 707/104.1 |
| 6,032,157 A | 2/2000 | Tamano et al. | 707/104.1 |
| 6,034,697 A | 3/2000 | Becker | 345/606 |
| 6,035,057 A | 3/2000 | Hoffman | 382/159 |
| 6,038,538 A | 3/2000 | Agrawal et al. | 705/7 |
| 6,038,561 A | 3/2000 | Snyder et al. | 707/6 |
| 6,044,366 A | 3/2000 | Graffe et al. | 707/2 |
| 6,049,806 A | 4/2000 | Crecine | 707/200 |
| 6,058,391 A | 5/2000 | Gardner | 707/4 |
| 6,067,542 A | 5/2000 | Carino, Jr. | 707/4 |
| 6,073,115 A | 6/2000 | Marshall | 705/35 |
| 6,073,138 A | 6/2000 | de l'Etraz et al. | 707/104.1 |
| 6,078,314 A | 6/2000 | Ahn | 345/169 |
| 6,078,914 A | 6/2000 | Redfern | 707/3 |
| 6,081,788 A | 6/2000 | Appleman et al. | 705/14 |
| 6,081,802 A | 6/2000 | Atherton et al. | 707/3 |
| 6,085,190 A | 7/2000 | Sakata | 707/6 |
| 6,088,032 A | 7/2000 | Mackinlay | 345/848 |
| 6,092,061 A | 7/2000 | Choy | 707/1 |
| 6,094,648 A | 7/2000 | Aalbersberg | 707/3 |
| 6,094,649 A | 7/2000 | Bowen et al. | 707/3 |
| 6,098,065 A | 8/2000 | Skillen et al. | 707/3 |
| 6,100,901 A | 8/2000 | Mohda et al. | 345/440 |
| 6,101,493 A | 8/2000 | Marshall et al. | 707/3 |
| 6,108,004 A | 8/2000 | Medl | 345/804 |
| 6,108,651 A | 8/2000 | Guha | 707/4 |
| 6,108,666 A | 8/2000 | Floratos et al. | 707/104.1 |
| 6,111,578 A | 8/2000 | Tesler | 345/850 |
| 6,112,194 A | 8/2000 | Bigus | 706/11 |
| 6,112,209 A | 8/2000 | Gusack | 707/101 |
| 6,121,969 A | 9/2000 | Jain et al. | 345/850 |
| 6,122,636 A | 9/2000 | Malloy et al. | 707/102 |
| 6,128,624 A | 10/2000 | Papierniak et al. | 707/104.1 |
| 6,252,597 B1 | 6/2001 | Lokuge | 345/353 |
| 6,259,451 B1 | 7/2001 | Tesler | 345/419 |
| 6,289,353 B1 | 9/2001 | Hazelhurst et al. | 707/102 |
| 6,327,574 B1 | 12/2001 | Kramer et al. | 705/14 |
| 6,374,251 B1 * | 4/2002 | Fayyad et al. | 345/772 |
| 6,484,168 B1 | 11/2002 | Pennock | |
| 6,493,709 B1 * | 12/2002 | Aiken | 707/4 |
| 6,772,170 B2 | 8/2004 | Pennock | |
| 6,898,530 B1 | 5/2005 | Saffer et al. | |

FOREIGN PATENT DOCUMENTS

| | | |
|---|---|---|
| EP | 0 627 692 A1 | 7/1994 |
| EP | 0 717 346 A2 | 6/1996 |
| WO | WO 99/11602 | 3/1999 |
| WO | WO 99/27495 | 6/1999 |
| WO | WO99/27495 | 6/1999 |

OTHER PUBLICATIONS

Ahlberg et al, IVEE: An Information Visualization & Exploration Environment, IEEE Paper ISBN: 0-8186-7201-3, 1995, pp. 66-73.*

Magdi et al, Handwritten Word Recognition Using Segmentation-Free Hidden Markov Model and Segmentation-Based Dynamic Programming Techniques, May 1996, IEEE Pattern Analysis and Machine Intelligence, vol. 18, pp. 1-15.*

Cleveland, William S., *Visualizing Data*, Hobart Press, Summit, New Jersey, 1993;ISBN 0-9634884-0-6.

Nielson, Gregory M. et al., *Scientific Visualization*, IEEE Computer Society, 1997;ISBN-0-8186-7777-5.

Hobohm, Uwe et al., "A Sequence Property Approach to Searching Protein Databases", *Journal of Molecular Biology*, 1995, pp. 390-399.

van Heel, Martin, "A New Family of Powerful Multivariate Statistical Sequence Analysis Techniques", *Journal of Molecular Biology*, 1991, pp. 877-887.

Becker, Richard A. et al., "Brushing Scatterplots", *Technometrics*, May 1987, vol. 29, No. 2, pp. 127-142.

Agrafiotis, Dimitris K., "A New Method for Analyzing Protein Sequence Relatsionships Based on Sammon Maps", *Protein Science*, vol. 6, 1997, pp. 287-293.

Eisen, Michael B. et al., "Cluster Analysis and Display of Genome-Wide Expression Patterns," *Proc. Nat'l. Acad. Sci., USA*, vol. 95, 1998, pp. 1483-1486.

"Silicon Graphics MineSet™, Supporting the Discovery Research Process," *MineSet for Discovery Research*, Spring 1999, pp 1-49.

"Spotfire Pro 4.0—Speeding Discovery", visited at http://www.sportfire.com/of_2_1.htm on Jun. 17, 1999, 2 pages.

"Spotfire Pro—Offerings—Spotfire", visited at http://www.spotfire.com/of on Jun. 17, 1999, 2 pages.

"Discovery Innovation—Spotfire", visited at http://www.spotfire.com/di_1_1.htm on Jun. 17, 1999, 1 page.

"Discovery Innovation—Spotfire", visited at http://www.spotfire.com/di_1_1_4.htm on Jun. 17, 1999, 1 page.

"Downloads—Spotfire", visited at http://www.spotfire.com/down_00.htm#2.1.2 on Jun. 17, 1999, 1 page.

"Offerings—Spotfire", visited at http://www.spotfire.com/of_2_4.htm on Jun. 17, 1999, 1 page.

"Partners—Spotfire", visited at http://www.spotfire.com/pa_4_0.htm on Jun. 17, 1999, 2 pages.

"Partners—Spotfire", visited at http://www.spotfire.com/pa_4_2.htm on Jun. 17, 1999, 1 page.

"Cheminformatics Example", visited at http://www.partek.com/chem/index,html on Apr. 15, 1999, 1 page.

"Cheminformatics Data Description", visited at http://www.partek.com/chem/data,html on Apr. 15, 1999, 1 page.

"GIF Image 1203×697 pixels", visited at http://www.partek.com/frags.gif on Apr. 15, 1999, 1 page.

"Screening Cheminformatics Data", visited at http://www.partek.com/chem/screen.html on Apr. 15, 1999, 2 pages.

"Variable Transformation", visited at http://www.partek.com/chem/tx.html on Apr. 15, 1999, 1 page.

"Visualization of High Dimensional Data", visited at http://www.partek.com/chem/viz.html on Apr. 15, 1999, 3 pages.

"Correlating Activities w/Structural Descriptors", visited at http://www.partek.com/chem/cor.html on Apr. 15, 1999, 6 pages.

"Cluster Analysis of Cheminformatics Data", visited at http://www.partek.com/chem/cla.html on Apr. 15, 1999, 2 pages.

"Predicting Mechanism of Action from Activity Patterns", visited at http://www.partek.com/chem/mtp.html on Apr. 15, 1999, 3 pages.

U.S. Appl. No. 09/408,716, filed Sep. 30, 1999, Nancy Miller et al.

U.S. Appl. No. 09/409,260, filed Sep. 30, 1999, Jeffrey Saffer et al.

Higgins, Desmond G., "Sequence ordinations: a multivariate analysis approach to analyzing large sequence data sets," *Comput. Appl. Biosc.*, vol. 8, 1992, pp. 15-22.

Bertin, Jacques, *Semiology of Graphics*, University of Wisconsin Press, 1983;ISBN 0-299-09060-4.

International Search Report re: PCT/US00/26964 mailed Aug. 12, 2002.

Altschul et al. Basic Local Alignment Search Tool, 1990, Journal of Molecular Biology, vol. 215, pp. 403-410.

Allowed claims from U.S. Appl. No. 09/408,260 filed on Sep. 30, 1999 (3 pages).

* cited by examiner

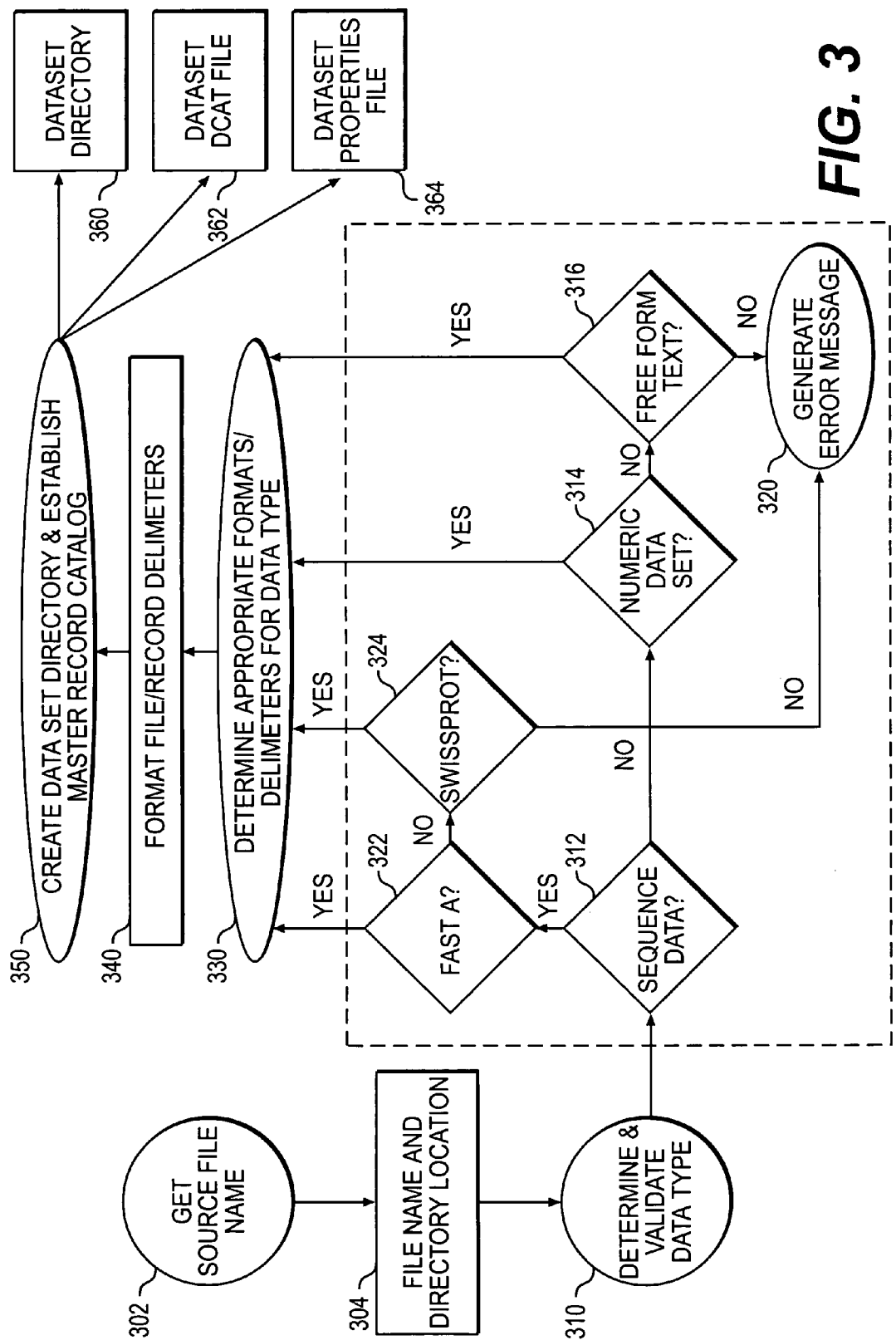

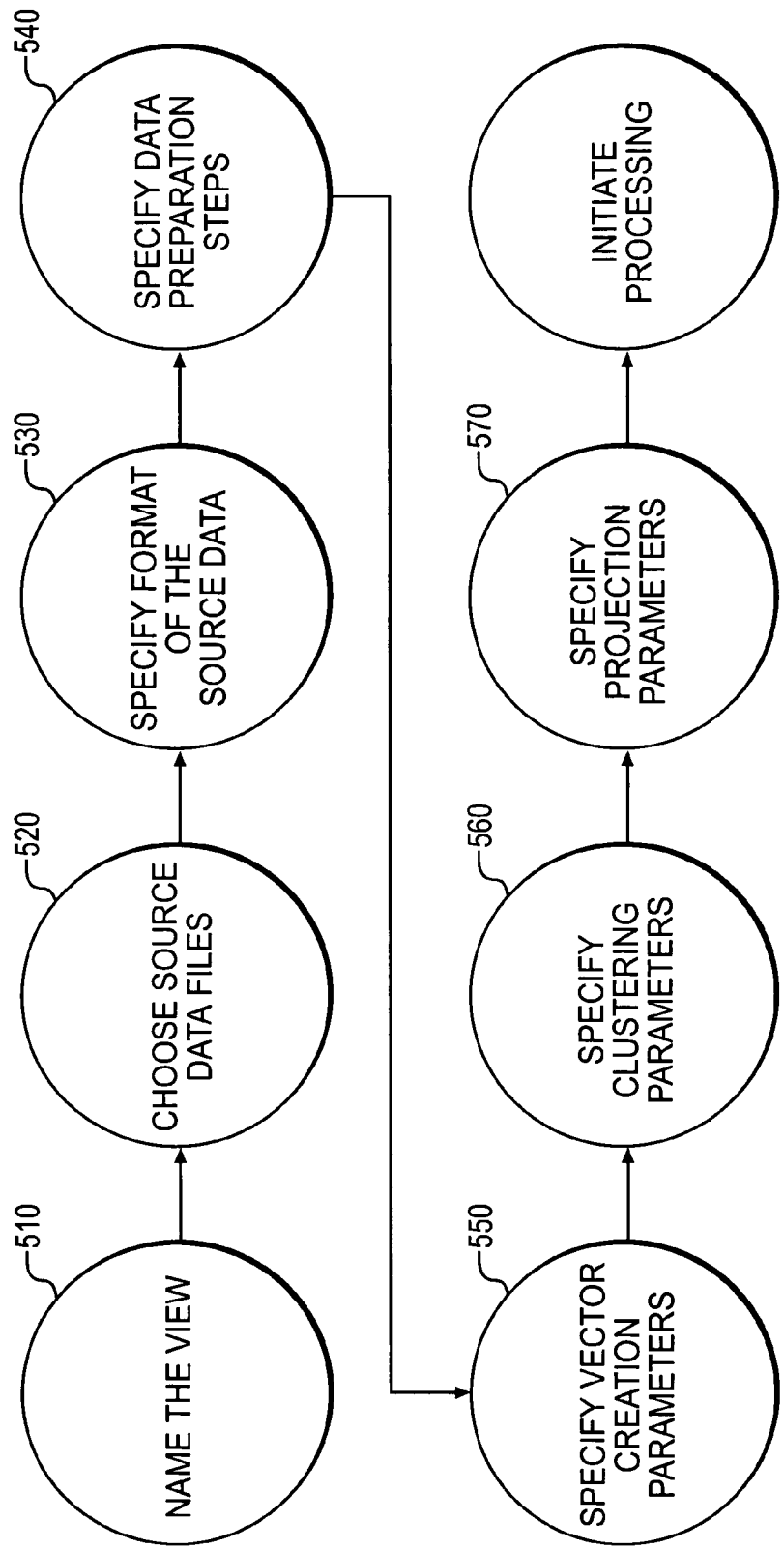

```
NAME=SPROT-ANO           ;CORPUS NAME
DESC=SWISSPROT ANNOTATIONS ;CORPUS DESCRIPTION
END_DESC
DELIMITER=//             ;RECORD DELIMITER TAG

IIFO
 NAME=TITLE              ;FIELD NUMBER
 TYPE=STRING             ;NAME OF THE FIELD
 TAG=DE                  ;DATA TYPE OF THIS FIELD (STRING, NUMERIC, SEQUENCE)
 METHOD=LINES:1          ;FIELD TAG AS IT APPEARS IN THE SOURCE FILE
 DOC_VECTOR=FALSE        ;DATA IS ON A SINGLE LINE
 SEARCH=TRUE             ;DON'T USE THIS FIELD FOR THE DOCUMENT VECTOR
 CORR=TRUE               ;MAKE THIS FIELD SEARCHABLE
 CASE_SENSITIVE=TRUE     ;USE THIS FIELD TO MAKE CATEGORIES
 WHOLE_BOUNDARY=TRUE     ;CASE SENSITIVE
 LINEPOS=START           ;THE TITLE TAG MUST BE A WORD (WHITE SPACE DELIMITED)
                         ;THE FIELD TAG ALWAYS STARTS AT THE BEGINNING OF A LINE
IIF1
 ...
IIF....
```

CREATE READ UPDATE

| FILE NAME | SET UP | | PROCESSING PROGRAMS | | | | | | | | INTERACTIVE TOOLS AND GRAPHICS | | | | | | | | |
|---|---|---|---|---|---|---|---|---|---|---|---|---|---|---|---|---|---|---|---|
| | | | | VECTOR CREATE | | | | | | | | | | | | | | | |
| | | | | | | CLUSTER | | | | | | | | | | | | | |
| | | | | | | | | | PROJECTION | | | | | | | | | | |
| | DATASET EDITOR | VIEW EDITOR | NUMERIC_ENGINE | TEXT_ENGINE | K_MEANS | CLUSTER_SID | CORRELATIONORDER | PCA_CLUSTERS | TRIANGLE | DOCPROJECTION | GALAXY | SURFACE MAP | MASTER QUERY | PLOT DATA | RECORD VIEWER | QUERY (WORD) | QUERY (NUM) | GROUP | GIST |
| <DATASETNAME>.DCAT | C | | | | | | | | | | | | | | R | | | | |
| <DATASETNAME>.PROPERTIES | C | | | | | | | | | | R | | | | | | | | |
| <VIEWNAME>.CLSP | | C | | | R | R | | | | | R | | | | | | | | |
| <VIEWNAME>.CLUSTER | | | | | | | | C | | C | | | | | | | | | |
| <VIEWNAME>.CORRV | | | | C | | | | | | | R | | | | | | | | |
| <VIEWNAME>.DCAT | | | | C | | | | | | | | | | | R | | | | |
| <VIEWNAME>.DOCPT | | | | | | | | | | C | R | | | | | | | | |
| <VIEWNAME>.DOCTERM | | | | C | | | | | | | | | | | | R | | | R |
| <VIEWNAME>.DOCTERM_INDEX | | | | C | | | | | | | | | | | | R | | | R |
| <VIEWNAME>.DOCV (VECTOR) | | | | C | R | R | R | | | R | R | R | | R | | R | | | |
| <VIEWNAME>.EDGE | | | | | | | | C | R | | | | | | | | | | |
| <VIEWNAME>.FIELD_OFF | | | | C | | | | | | | R | R | R | R | | | | | |
| <VIEWNAME>.GIF | | C | | | | | | | | | R | | | | | | | | |
| <VIEWNAME>.GROUPS | | | | | | | | | | | | | | | | | | U | |
| <VIEWNAME>.FMT | | | C | R | | | | | | | R | R | R | R | | | | | |
| <VIEWNAME>.HCLS | | | | | C | C | R | | | R | R | R | R | | R | | | | |
| <VIEWNAME>.HEADINGS | | | C | | | | | | | | R | R | | R | | R | | | |
| <VIEWNAME>.IFI | | | | C | | | | | | | | | | | R | | | | |
| <VIEWNAME>.IFI_INDEX | | | | C | | | | | | | | | | | R | | | | |
| <VIEWNAME>.PROPERTIES | U | U | U | U | U | U | U | U | U | U | R | R | | | | | | | |
| <VIEWNAME>.PUNC | | | C | R | | | | | | | | | | | R | R | | | |
| <VIEWNAME>.REL | | | | C | | | | | | | | | | | R | | | | |
| <VIEWNAME>.REPOSITORY | | | | | | | | | | | R | R | R | R | R | R | R | R | |
| <VIEWNAME>.STOP | | | C | R | | | | | | | | | | | R | | | | |
| <VIEWNAME>.TL | | | | C | | | | | | | R | R | R | R | R | | | | |
| <VIEWNAME>.TOPIC | | | | C | | | | | | | | | | | R | | | | |
| <VIEWNAME>.VOCAB | | | | C | | | | | | | | | | | R | | | | R |
| <VIEWNAME>.VOCAB_INDEX | | | | C | | | | | | | | | | | R | | | | R |
| TAB DELIMITED COLUMN/ROW OURCE | | | R | | | | | | | | | | | | | | | | |
| TAGGED TEXT SOURCE FILE(S) | | | C | R | | | | | | | | | | | R | | | | |
| REENGINEERED TAGGED TEXT SOURCE | | C | R | R | | | | | | | | | | | R | | | | |

*FIG. 11*

ATTRIBUTES VS. ATTRIBUTES

ROW ATTRIBUTE

◉ VOCABULARY WORD(S) [    ] TYPE IN WORDS, SEPARATED BY
○ VOCABULARY FILE [    ] (BROWSE)
○ CATEGORY FIELD(S) [    ] (ADD) (DROP DOWN LIST OF FIELDS)
○ CATEGORY FILE [    ] (BROWSE)

COLUMN ATTRIBUTE

◉ VOCABULARY WORD [    ] TYPE IN WORDS, SEPARATED BY
○ VOCABULARY FILE [    ] (BROWSE)
○ CATEGORY FIELD [    ] (ADD) (DROP DOWN LIST OF FIELDS)
○ CATEGORY FILE [    ] (BROWSE)

(CLEAR) (CANCEL) (DONE)

| | ATTRIBUTE_1 | ATTRIBUTE_2 | ATTRIBUTE_3 | ATTRIBUTE_4 | ATTRIBUTE_5 | ATTRIBUTE_6 |
|---|---|---|---|---|---|---|
| RECORD_1 | 1 | 1 | 1 | 1 | 0 | 0 |
| RECORD_2 | 0 | 1 | 1 | 1 | 1 | 0 |
| RECORD_3 | 0 | 1 | 1 | 1 | 0 | 0 |
| RECORD_4 | 1 | 0 | 1 | 1 | 0 | 0 |
| RECORD_5 | 1 | 1 | 0 | 0 | 1 | 1 |
| RECORD_6 | 0 | 1 | 0 | 1 | 0 | 0 |

TOOL BAR
 RECORD VIEWER
 ZOOM
 ZOOM RESET
 PAN
 EXPAND ROW CLUSTERS
 COLLAPSE ROW CLUSTERS
 EXPAND COLUMN CLUSTERS
 COLLAPSE COLUMN CLUSTERS
 ORIENT ROWS VS. VALUE
 ORIENT COLUMNS VS. VALUE
 RESET ORIENTATION
 SPACING TOGGLE
FIG. 29

DATA PROCESSING, ANALYSIS, AND VISUALIZATION SYSTEM FOR USE WITH DISPARATE DATA TYPES

RELATED APPLICATIONS

The following identified U.S. patent applications are relied upon and are incorporated by reference in this application:

U.S. patent application Ser. No. 09/409,260, entitled "METHODS AND APPARATUS FOR EXTRACTING ATTRIBUTES OF GENETIC MATERIAL," filed on the same date herewith by Jeffrey Saffer et al.;

U.S. patent application Ser. No. 08/695,455, entitled "THREE-DIMENSIONAL DISPLAY OF DOCUMENT SET," filed on Aug. 12, 1996; and U.S. patent application Ser. No. 08/713,313, entitled "SYSTEM FOR INFORMATION DISCOVERY," filed on Sep. 13, 1996.

The disclosures of each of these applications are herein incorporated by reference in their entirety.

TECHNICAL FIELD

This invention relates to data mining and visualization. In particular, the invention relates to methods for analyzing text, numerical, categorical, and sequence data within a single framework. The invention also relates to an integrated approach for interactively linking and visualizing disparate data types.

BACKGROUND OF THE INVENTION

A problem today for many practitioners, particularly in the science disciplines, is the scarcity of time to review the large volumes of information that are being collected. For example, modern methods in the life and chemical sciences are producing data at an unprecedented pace. This data may include not only text information, but also DNA sequences, protein sequences, numerical data (e.g., from gene chip assays), and categoric data.

Effective and timely use of this array of information is no longer possible using traditional approaches, such as lists, tables, or even simple graphs. Furthermore, it is clear that more valuable hypotheses can be derived by simultaneous consideration of multiple types of experimental data (e.g., protein sequence in addition to gene expression data), a process that is currently problematic with large amounts of data.

Visualization-based tools for analyzing data are discussed in, for example, Nielson G M, Hagen H, Muller H, eds., (1997) *Scientific Visualization*, IEEE Computer Society, Los Alamitos); (Becker R A, Cleveland W S (1987) *Brushing Scatterplots*, Technometrics 29:127–142; Cleveland W S (1993) *Visualizing Data*, Hobart Press, Summit, N J); (Bertin J (1983) *Seminology of Graphics*, University of Wisconsin Press, London; Cleveland W S (1993) *Visualizing Data*, Hobart Press, Summit, N J). These tools have focused largely on data characterization, and have provided limited user interactivity. For example, the user may gain access to underlying information by selecting an item with a pointer.

These tools, however, have significant drawbacks. Although current tools can handle certain data types (e.g., text, or numerical data), they do not allow a user to interact with disparate data types (i.e., text, numerical, categoric, and sequence data) within an integrated data analysis, mining, and visualization framework. Furthermore, these tools do not allow a user to interact well between different visualizations in the manner required to gain knowledge.

What is needed, therefore, is a tool that allows a user to analyze, mine, link, and visualize information of disparate data types within an integrated framework.

SUMMARY OF THE INVENTION

Systems and methods consistent with the present invention aid a user in analyzing large volumes of information that contain different types of data, such as textual data, numeric data, categorical data, or sequential string data. Such systems and methods determine and display the relative content and context of information and aid in identifying relationships among disparate data types.

More specifically, one such method defines a uniform data structure for representing the content of an object of different data types, selects attributes of different objects of a variety of different data types that may be represented in the uniform data structure and operates on the selected attributes to produce first representations of the objects in correspondence with the uniform data structure.

The data types may include numeric, sequence string, categorical and text data types. An index may be produced that includes second representations of non-selected attributes of a particular object and that associates the non-selected attributes with a particular first representation. The first and second representations may be vector representations. A first set of the selected attributes associated with a first set of objects may be used to determine the relationships among the first set of objects of a particular data type and non-selected attributes associated with the first set of selected attributes may be used to correlate objects represented by the first set of selected attributes with a second set of objects represented by a second set of selected attributes. The first and second set of objects may be displayed in first and second windows on a display screen and the second set of objects that corresponds to the selected object or objects may be highlighted.

A method consistent with the present invention identifies relationships among different visualizations of data sets and includes displaying first graphical results of a first type analysis performed on selected attributes of a first set of objects and displaying second graphical results of a second type analysis performed on selected attributes of a second set of objects. Certain objects represented in the first graphical results may be selected and corresponding objects represented by the second graphical results that correspond to the certain objects are highlighted. The highlighting may be based on attributes not used for creating the first graphical results.

Another aspect of the present invention is directed to a system and a method for visualization of multiple queries to a database that includes selecting multiple queries to a database, querying records in the database based on the multiple queries, creating a query matrix indexed based on the selecting, and populating the query matrix based on the querying.

Another method consistent with the present invention interactively displays records and their corresponding attributes and includes generating a first 2-D chart for a first record, where at least two attributes associated with the first record are shown along one axis, and the values of the attributes are shown along the other axis. Input is received from a user selecting the first record on the first 2-D chart and an index is analyzed to determine if the first record is shown in another view. If the first record is shown in another view, the visual representation of the first record is altered in the another view based on the user input.

Another method consistent with the present invention interactively displays records and their corresponding attributes and includes generating a 2-D scatter chart that depicts a plurality of records. A 2-D line chart is generated for a group of records contained in a portion of the 2-D scatter chart. At least two attributes associated with the group of records are shown along one axis, and a statistical value for each of the at least two attributes is shown along the other axis. A 2-D line chart is superimposed at a location on the 2-D scatter chart that is based on the location of the group of records on the 2-D scatter chart.

BRIEF DESCRIPTION OF THE DRAWINGS

The accompanying drawings, which are incorporated in, and constitute a part of, this specification illustrate at least one embodiment of the invention and, together with the description, serve to explain the advantages and principles of the invention.

In the drawings,

FIG. 3 is a flow diagram of a processes associated with a data editor consistent with the present invention;

FIGS. 5a–5d are flow diagrams of a processes associated with a view editor consistent with the present invention;

FIGS. 6a–6m are screen shots associated with a view editor consistent with the present invention;

FIG. 8 is an example file format consistent with an embodiment of the present invention;

FIG. 11 is table that identifies operations of program modules used in conjunction the meta data consistent with the present invention;

FIGS. 22A–22C display exemplary parameter-setting dialog boxes for query types shown in FIG. 21;

FIG. 23 illustrates a query matrix according to an aspect of the present invention;

FIG. 24 illustrates a visualization of the query matrix of FIG. 23 indexed by records;

FIG. 25 illustrates a visualization of the query matrix of FIG. 23 indexed by clusters;

FIG. 29 illustrates examples of functions of a tool bar associated with the visualization of FIG. 19.

DETAILED DESCRIPTION

Reference will now be made in detail to one or more embodiments of the present invention as illustrated in the accompanying drawings. The same reference numbers may be used throughout the drawings and the following description to refer to the same or like parts.

A. Overview

Systems and methods consistent with the present invention are useful in analyzing information that contains different types of data and presenting the information to the user in an interactive visual format that allows the user to discover relationships among the different data types. Such methods and systems include high-dimensional context vector creation for representing elements of a dataset, visualization techniques for representing elements of a dataset including methods for indicating relationships among objects in a proximity map, and interaction among datasets including linking the visualizations and a common set of interactive tools. In an embodiment, the interactions, regardless of data type, among the visualizations and the common set of tools for the interactions is enabled by maintaining meta data, as discussed herein, in a common set of file structures (or database).

Methods and systems consistent with the present invention may include various visualization tools for representing information. A tool for visualizing multiple queries to a database is provided. In another visualization tool, if a first record of a 2-D chart of one view is shown in a second view, the visual representation of the first record is altered in the second view based on the user input. In another visualization tool, a 2-D line chart is superimposed at a location on a 2-D scatter chart that is based on the location of a group of records on the 2-D scatter chart. Other tools consistent with the present invention may be used in conjunction with the methods and systems described herein.

Figure 1:
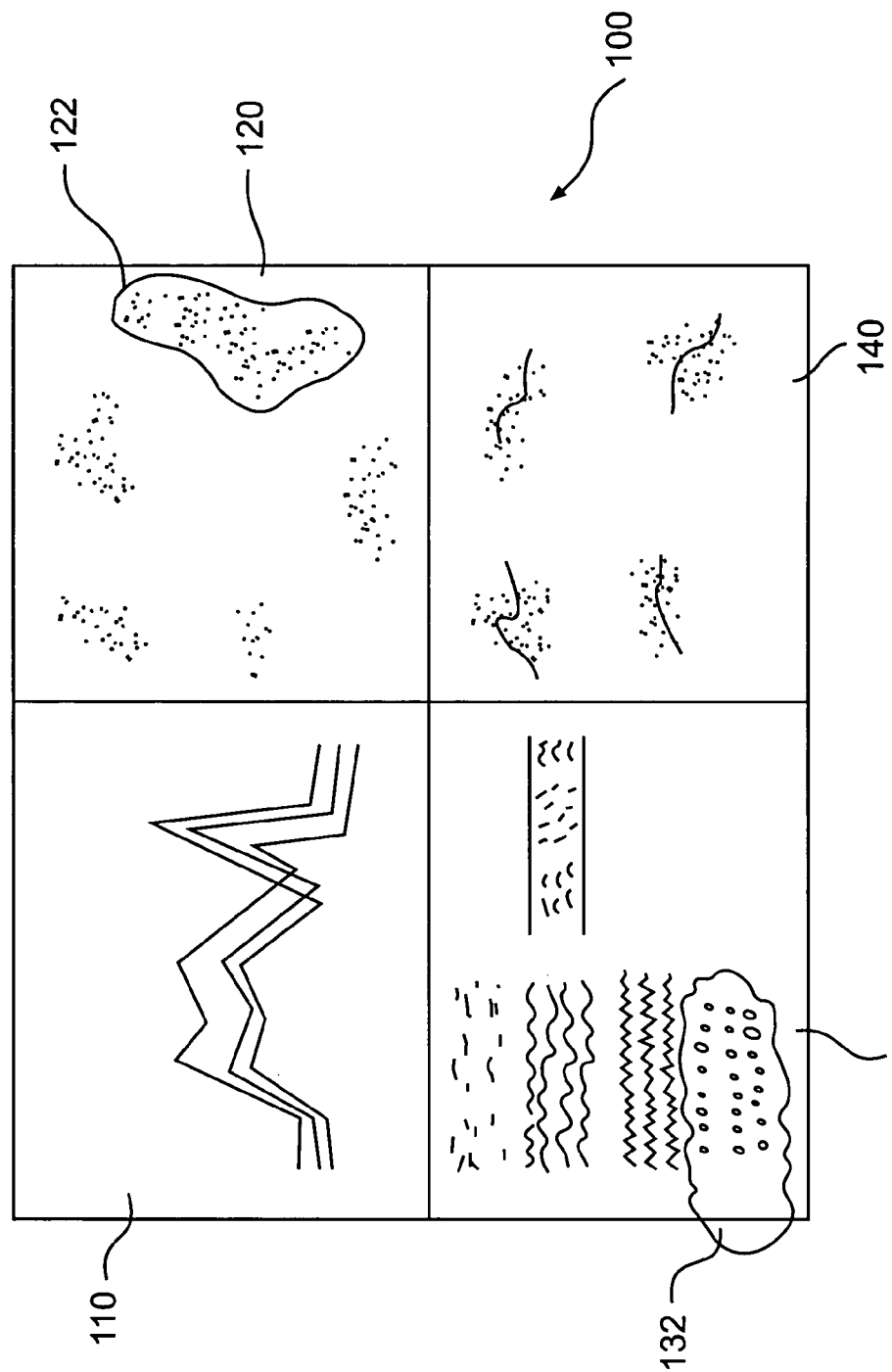
FIG. 1 is a block diagram of visualizations screens or views that are consistent with the present invention.

As used herein, a record (or object) generally refers to an individual element of a data set. The characteristics associated with records are generally referred to herein as attributes. A data set containing records is generally processed as follows. First, the information represented by the records (including text, numeric, categoric, and sequence/ string data) are received in electronic form. Second, the records are analyzed to produce a high-dimensional vector for each record. Third, the high-dimensional vectors may be grouped in space (i.e. a coordinate system) to identify relationships, such as clustering among the various records of the data set. Fourth, the high-dimensional vectors are converted to a two-dimensional representation for viewing purposes. The two-dimensional representation of the high-dimensional vectors is generally referred to herein as "projection." Fifth, the projections may be viewed in different formats according to user-selected options, as shown by the four views (110, 120, 130, and 140) on display monitor 100 in FIG. 1.

Systems and methods consistent with the present invention enable a user to select a record in view 110 and cause the corresponding record in another view to be highlighted. For example, selecting a particular record in view 110 causes the corresponding records 122 and 132 to be highlighted in views 120 and 130, respectively. The highlighted points may represent different analyses performed on the same records or may represent different data types associated with the records.

B. Architecture

Figure 2A:
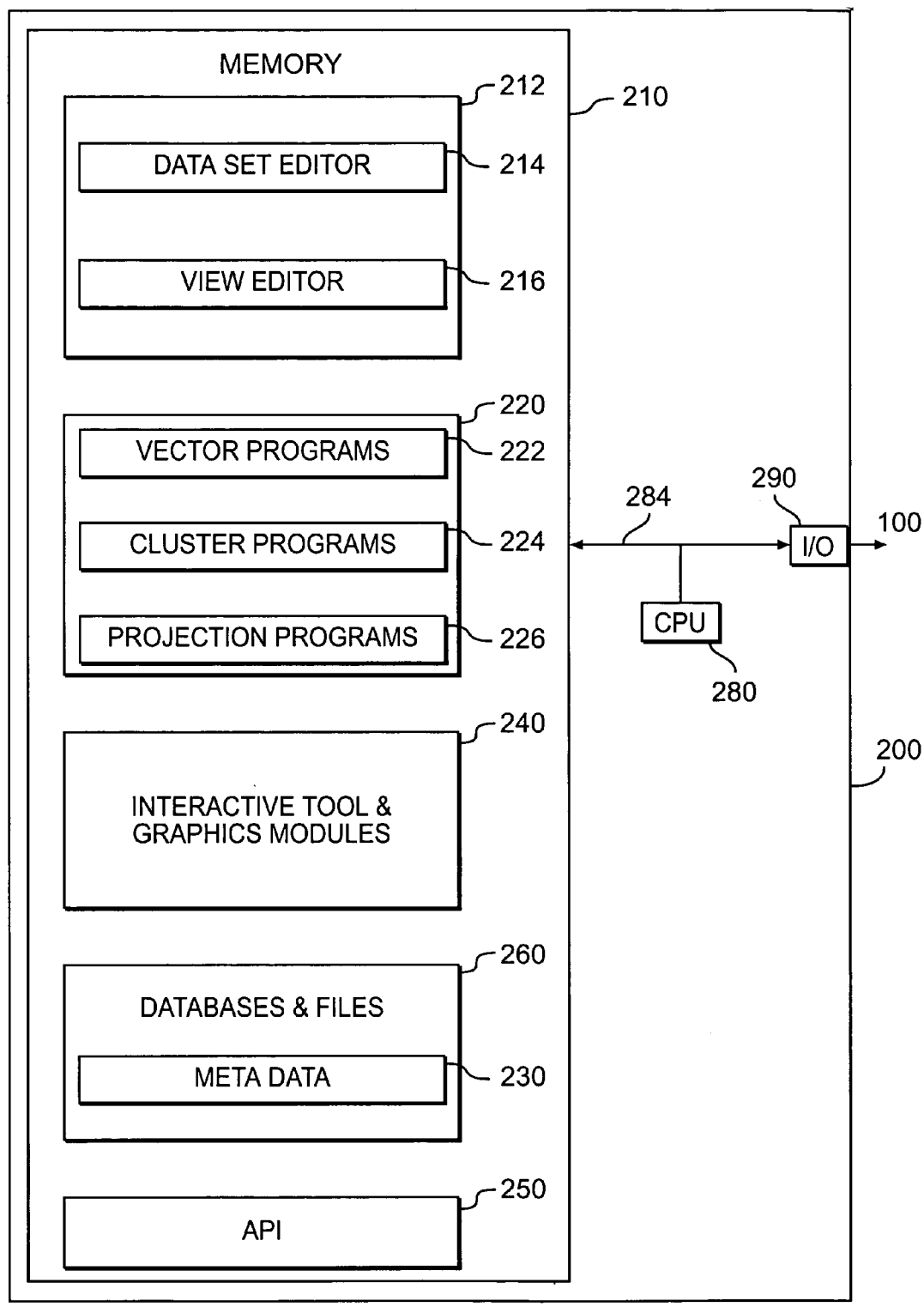
FIG. 2a is a block diagram of a computer system and program modules consistent with the present invention.

FIG. 2a depicts a computer system 200 consistent with the present invention. Computer programs used to implement methods consistent with the present invention are generally located in a memory unit 210, and the processes of the present invention are carried out through the use of a central processing unit (CPU) 280 in conjunction with application programs or modules. Those skilled in the art will appreciate that memory unit 210 is representative of read-only, random access memory, and other memory elements used in a computer system. For simplicity, many components of a computer system have not been illustrated, such as address buffers and other standard control circuits; these elements are well known in the art.

Memory unit 210 contains databases, tables, and files that are used in carrying out the processes associated with the present invention. CPU 280, in combination with computer software and an operating system, controls the operations of the computer system. Memory unit 210, CPU 280, and other components of the computer system communicate via a bus 284. Data or signals resulting from the processes of the present invention are output from the computer system via an input/output (I/O) interface 290.

The computer program modules and data used by methods and systems consistent with the present invention include visualization set up programs 212, processing programs 220, meta data files 230, interactive graphics and tools programs 240, and an application interface 250. The visualization set up programs 212 determine the name to be used for a collection of records identified by a user, determine the formats to be used for reading files associated with the records, identify formatting conventions for storing and indexing the records, and determine parameters to be used for analysis and viewing of the records. The processing programs 220 transform the raw data of the identified records into meta data, which in turn is used by the interactive visualization tools. The meta data files 230 include the results of statistical feature extraction, n-space representation, clustering, indexing and other information used to construct and interact among the different views. The interactive graphics and tools programs 240 enable the user to explore and interact with various views to identify the relationships among records. The application programming interface (API) 250 enables the components 212, 220, 230, and 240 to exchange and interface information as needed for use in analysis and visual display.

The visualization setup programs 212 further include a data set editor 214 and a view editor 216. The processing programs 220 further include vector programs 222, cluster programs 224, and projection programs 226. The meta data files 230 are a subset of databases and files 260.

The data set editor 212 enables the user to define the collection of records (i.e., a data set) to be analyzed, identifies the data type, and creates directories for use in organizing the data of the data set. The view editor 216 sets up the user's raw data for viewing by the interactive tools and graphics. Vector programs 222 create high-dimensional context vectors that represent attributes of the records of the data set. Cluster program 224 groups related records near each other in a given space (cluster) to enable a user to visually determine relationships. Projection programs 226 convert high-dimensional representations of the records of a data set to a two-dimensional or three-dimensional representation that is used for display. The databases and files 260 contain data used in conjunction with the present invention, such as the meta data 230.

C. Architectural Operation

1. Data Collection (Data Set Editor)

FIG. 3 illustrates an implementation of processes performed to define and enable the formatting of a selected data set, as performed by the data set editor 212. A data file to be used as the source for the subsequent analysis is requested (step 302). After a file name, data type and directory location is entered (step 304), the process determines and validates the data type indicated by the user (step 310). The validation process first determines whether the data of the source data file is in a common sequence data format (step 312). If the data is not one of the common sequence data formats, the process determines whether the data is an array of data consisting of numeric, categoric, sequnce, or text (step 314). If the data is not a data array, the process determines whether the data is free form text (step 316). If the data is not free form text (step 316), an error message is generated (step 320).

If the validation process determines that the data is sequence data, such as genome sequence data (step 312), the process determines whether the sequence data is in FastA file format (step 322) or whether the sequence data is in a SwissProt file format (step 324). An example FastA input file is provided in Appendix B. The operations and data associated with processing sequence data is discussed in more detail in U.S. patent application Ser. No. 09/409,260, now issued as U.S. Pat. No. 6,898,530, entitled "Methods and Apparatus for Extracting Attributes of Genetic Material" filed on the same day herewith by Jeffrey Saffer, et al. As stated in that patent, the steps for processing sequence data may comprise:

(i) comparing a sequence of each biopolymer material to a sequence of each other biopolymer material to provide respective comparison results;

(ii) arranging the comparison results in a square matrix indexed by the plurality of biopolymer materials; and (iii) creating a high-dimensional context vector for at least one of the biopolymer materials based on a row or column of the square matrix.

If the sequence data is not in either of these formats, an error message is generated (step 320). If, however, the data is either a FASTA file (step 322) or a SwissProt file (step 324), the appropriate formats and delimiters, as discussed herein, are determined to be used for the respective FASTA file or SwissProt file (step 330). After the appropriate format/delimiters for the data type are determined (step 330), the corresponding format file/record delimiters are established (step 340). The format file/record delimiters specify the valid formats for reading the files and identifies the meta data files that are to be used to for subsequent processing of the data set as discussed herein.

A file directory 360 is created for storing the meta data files associated with the data set (step 350). The file directory 360 includes a document catalog file (DCAT) 362 and a data set properties file 364. The DCAT file 362 is used as a master index for all records in the data set. The indexes stored in the DCAT file are used to integrate the information associated with the various views selected for the data set. For example, the DCAT file 362 contains indexes that associate all the data of a data set with a particular view, although only a subset of the data set is used to create the view. The properties file 364 is also produced and stored in the file directory and contains information about the source data files for the view, including their type (corpus type), the number and full path (location) for the source files, the format used, and the date created. In addition, the properties file keeps track of subsequently processed views including the subdirectory where those views reside. An example properties file is provided in Appendix A.

Figure 4A:
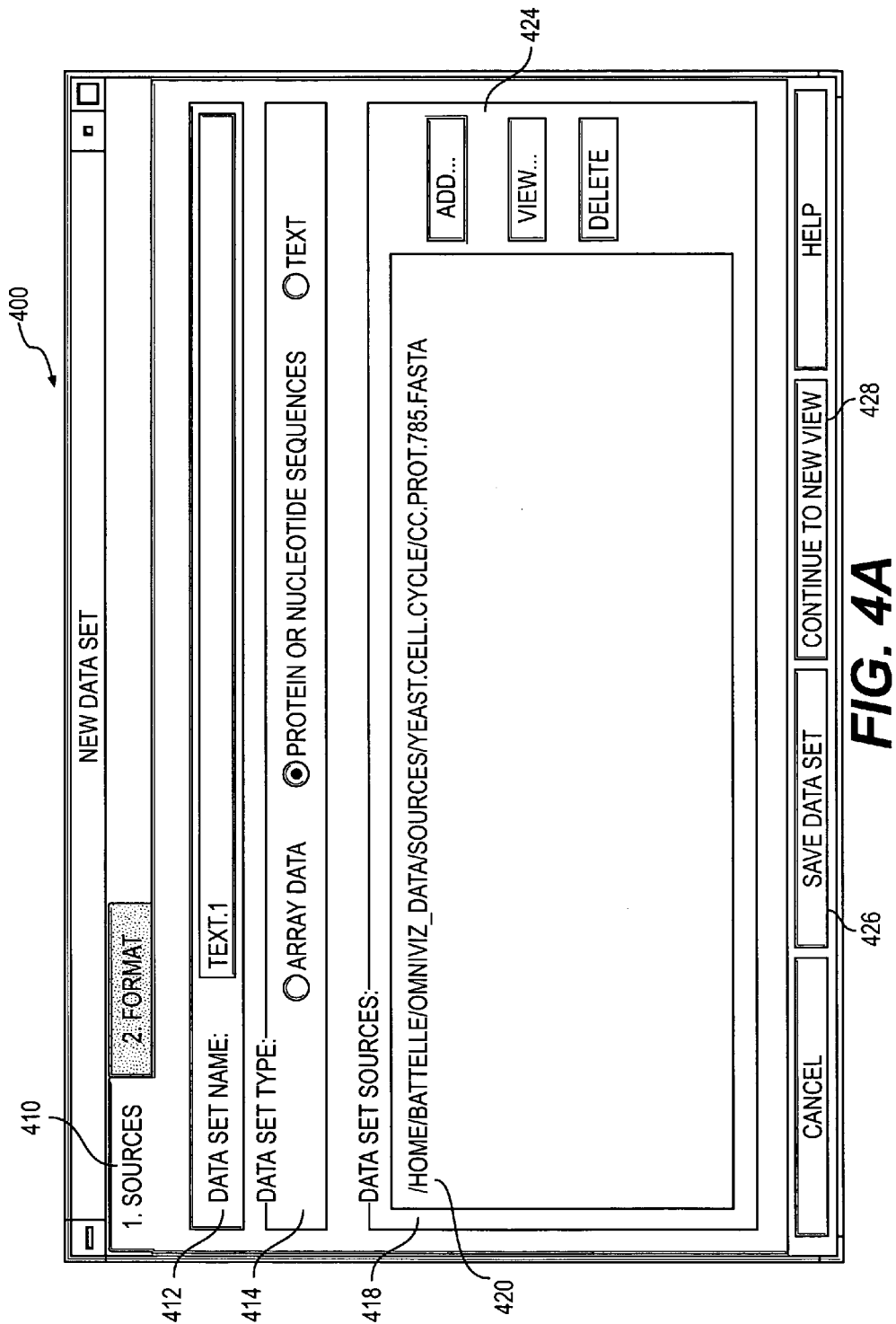
FIGS. 4a and 4b are screen shots associated with a data editor consistent with the present invention.
Figure 4B:
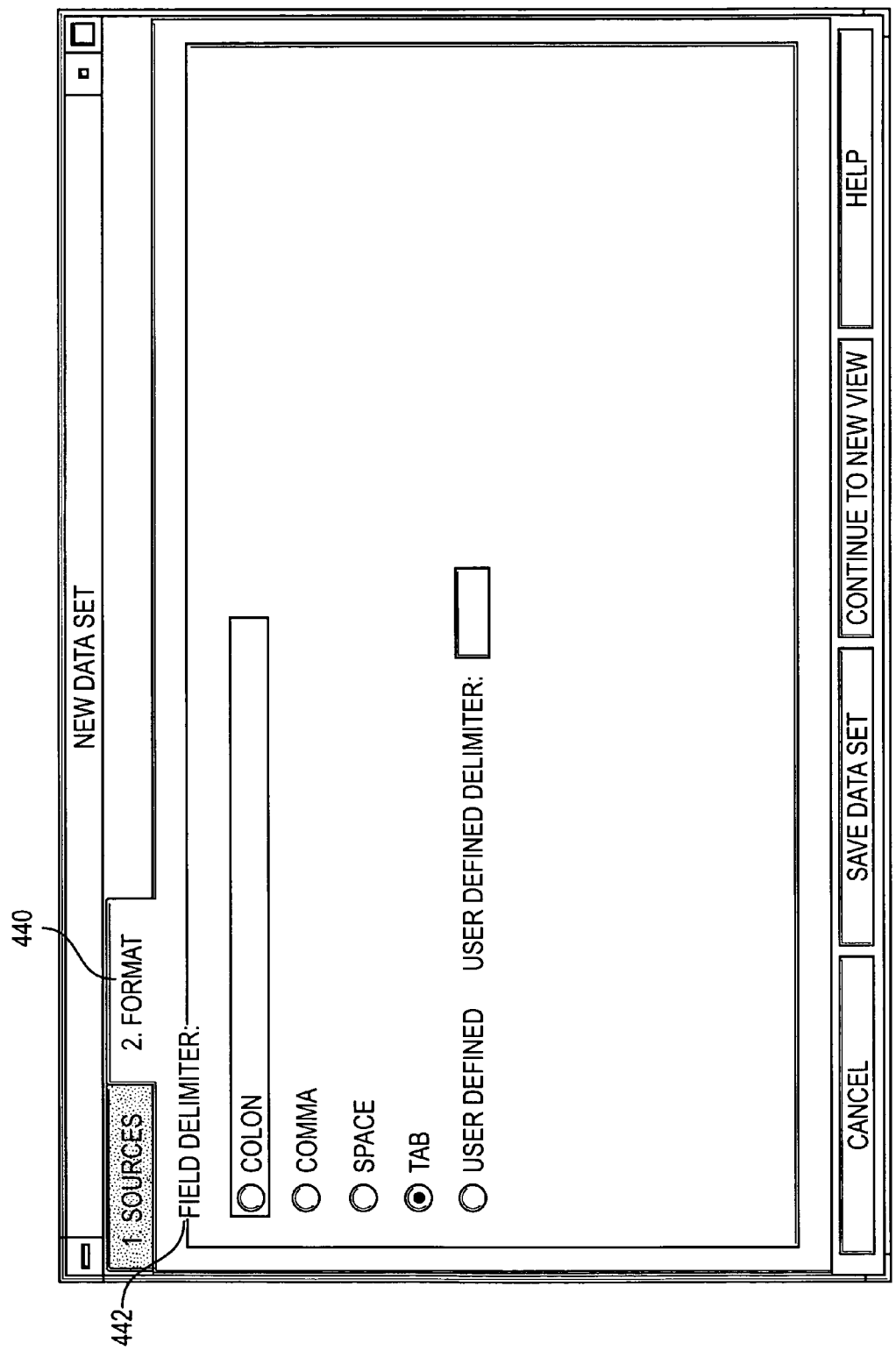

FIGS. 4a and 4b depict exemplary screen shots presented on a display monitor to a user for defining a new data set (i.e., collection of records) using data set editor 212. A user names and defines a data set using the data set editor 212. When the data set editor is selected, a graphical interface screen 400 is presented to a user for use in defining options or parameters associated with the data set. For example, graphical interface screen 400 is presented to a user when the user selects the sources tab 410.

The user may enter a name for the data set in a field 412 and may specify the data set type as indicated by the selection options 414, such as array data, protein or nucleotide sequences, or text. The source of this data set may be specified in the field 418 as indicated by the directory and subdirectory specification 420. The user may select the add, view, or delete options 424 to perform the function indicated by the name on the data set source. The user may save the data as indicated by the option 426 or continue to a new view as indicated by the option 428.

By selecting the format tab 440, the user may specify how fields contained within the source file are delimited by selection of a field delimiter option 442. The field delimiter options illustrated include an option to delimit the field by a colon, comma, space, tab, or a user defined delimiter.

2. Analysis and View Setup (View Editor)

FIG. 5a illustrates an implementation of a process used for creating parameters when defining the type of analyses or views for a data set, as performed by view editor 216. The user may enter this information using a graphical interface as depicted in FIG. 6a, which shows source file tab 604, format tab 610, preparation tab 630, processing tab 660, clustering tab 680, and projection tab 690, respectively.

Figure 6A:
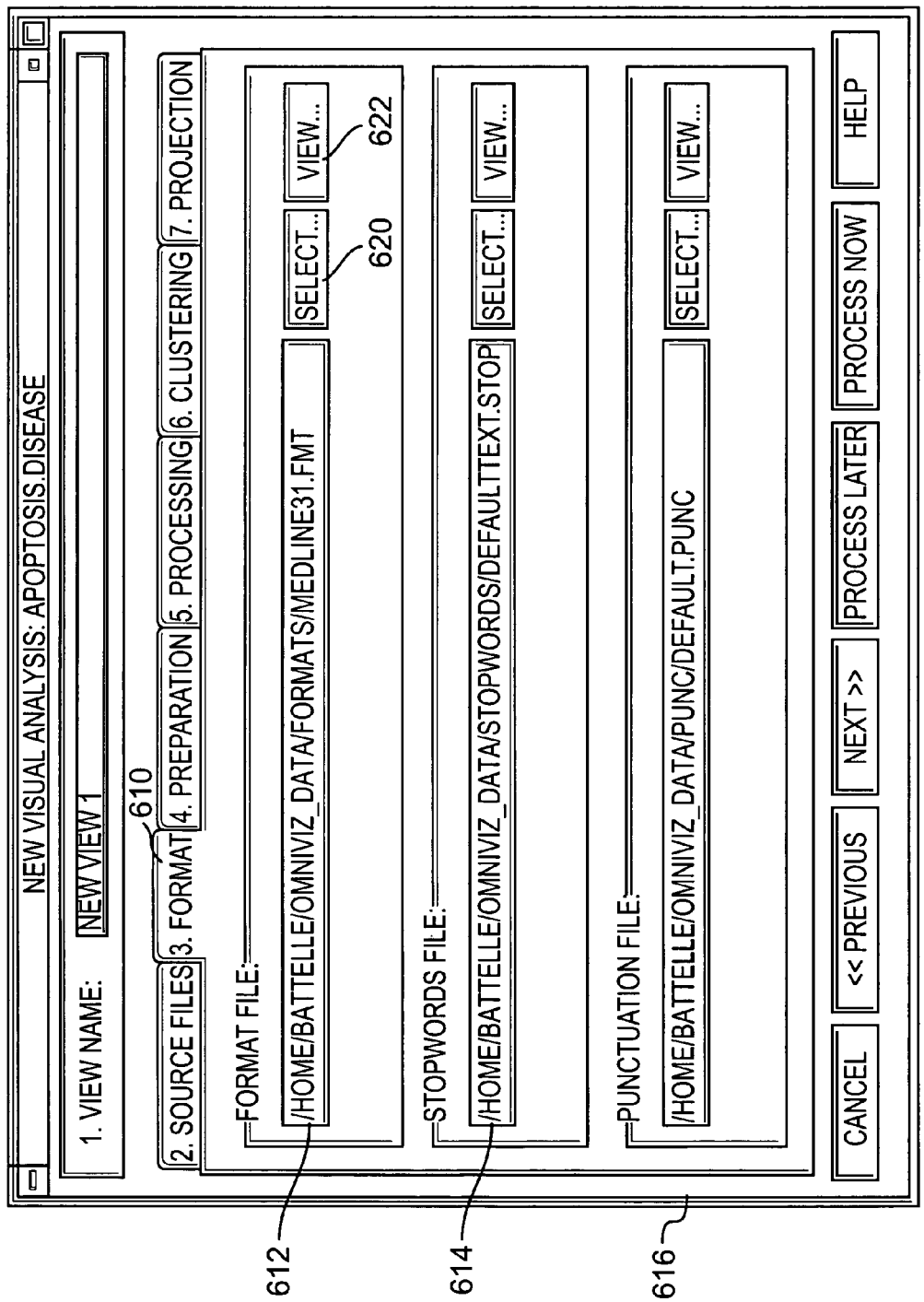
Figure 6B:
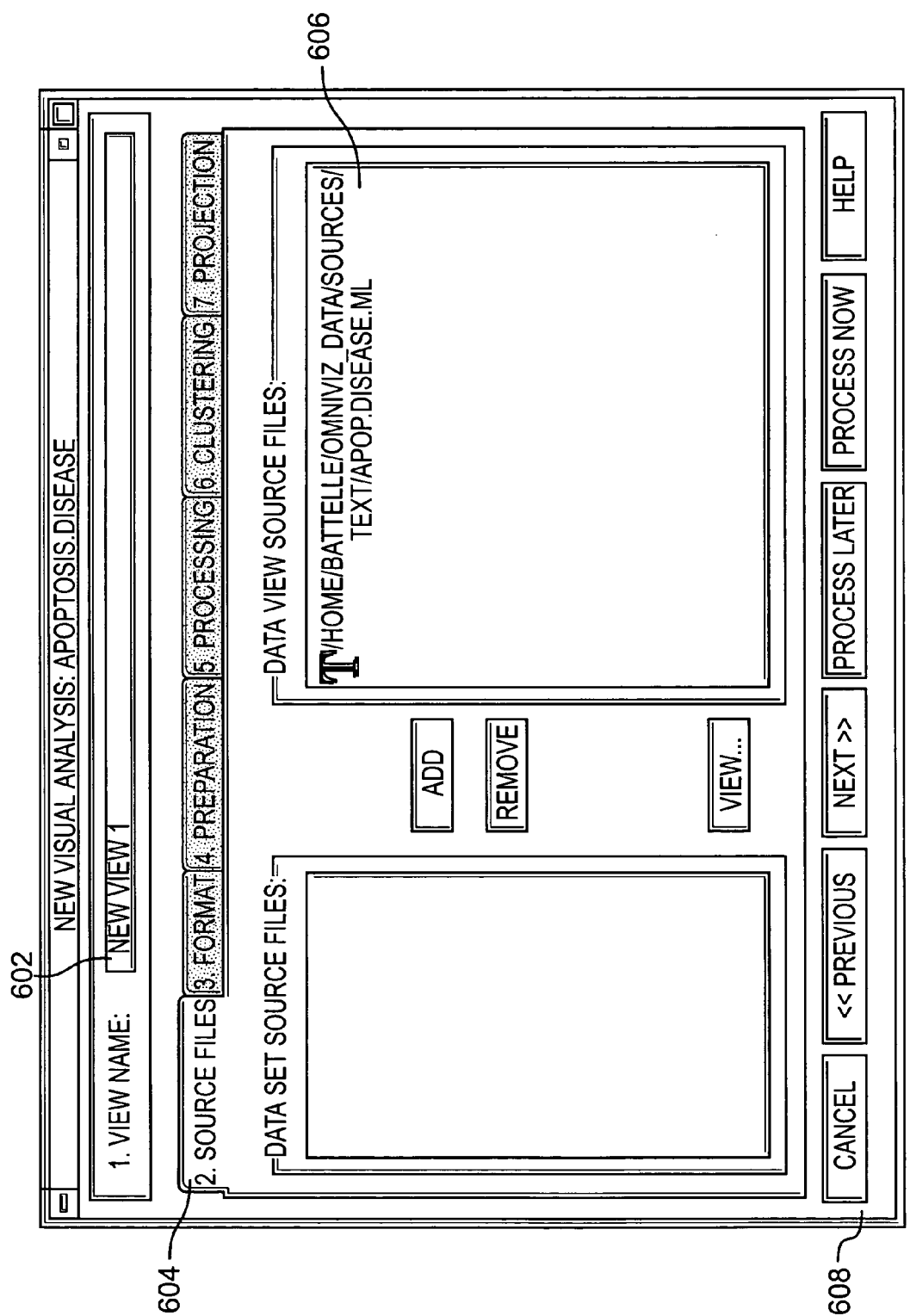

The user is first requested to name the view (step 510) and also is requested to identify the directory locations of the source files (step 520). The user is requested to specify the format of the source data (step 530). FIG. 6b is a screen display showing the options presented to a user when the format tab 610 is selected. The user may provide in the format file field 610, a file to use for formatting the view such as medline 31.fmt. The user may also specify a stop words file such as the default text stop file shown in the field 614. This stop words file is a list of words that the text engine will ignore during analysis. The user may input a file to specify the default punctuation of the file as indicated by the default.punc file indicated in the field 616. The punctuation file tells the text engine how to handle non-alphabet characters. For each of the files requested, the user may use the default file specified by the system or choose another. The user may select or view any of the files of the format screen of FIG. 6b by selecting the select option 620 or the view option 622.

The user is also requested to provide preparation parameters (step 540). The processes associated with step 540 are discussed in more detail in FIG. 5b. The user may specify vector creation, cluster, and projection parameters to be used in constructing a view (steps 550, 560, and 570, respectively). The projection parameters include cluster cohesion, cluster area, and cluster spread. Vector creation and clustering parameter processes are discussed in more detail in FIGS. 5c and 5d, respectively.

Figure 5B:
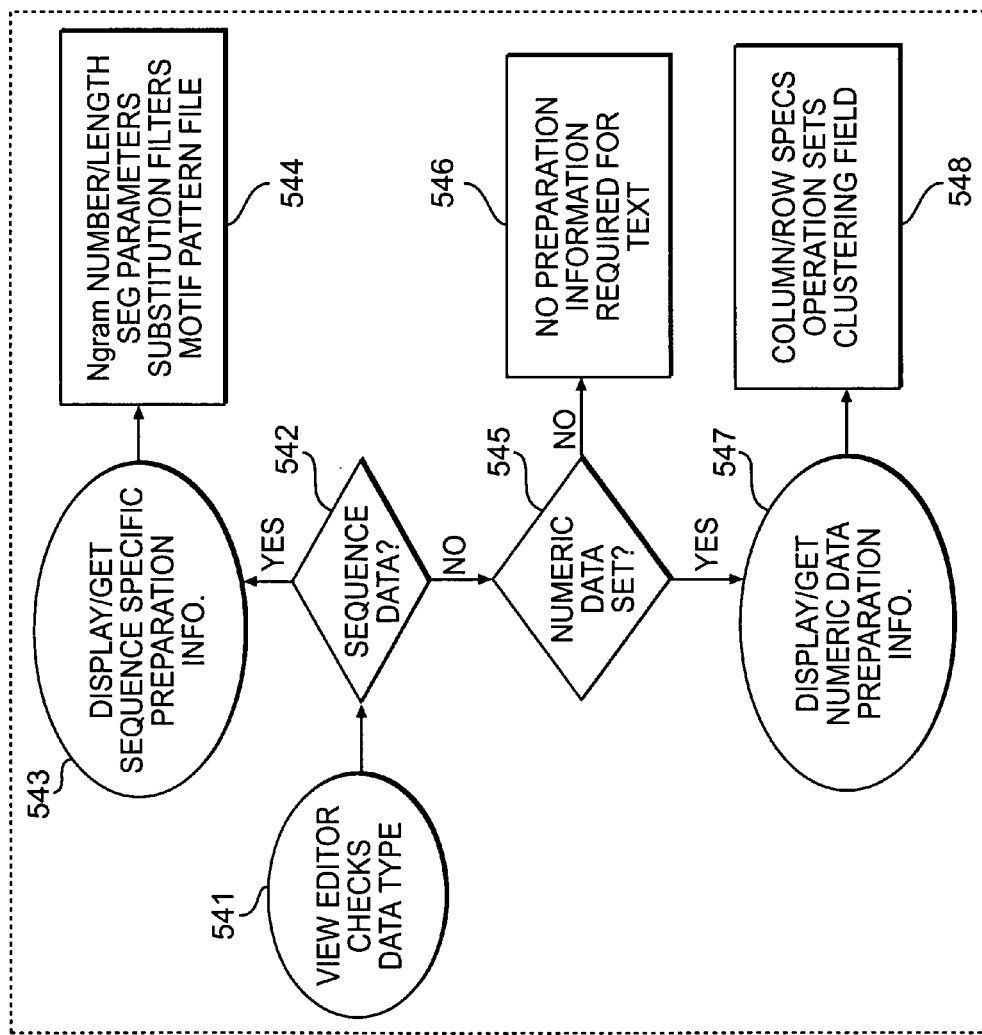

Referring to FIG. 5b, the view editor processes are discussed. The view editor first checks the data type (step 541) by evaluating whether the data is sequence data (step 542). If the data is sequence data, sequence specific preparation information is requested (step 543), such as requesting number and length of n grams, SEG parameters, substitution filter values, and motif pattern file parameters (step 544). If the data is not sequence data (step 542), the process determines whether the data is numeric data (step 545). If the data is not numeric data, no preprocessing or preparation information is required for text information (step 546). If the data is numeric data, a display screen that requests numeric data and preparation information from a user (step 547) is presented. The numeric preparation data request may include column/row specifications, operation sets, and clustering fields (step 548).

Figure 5C:
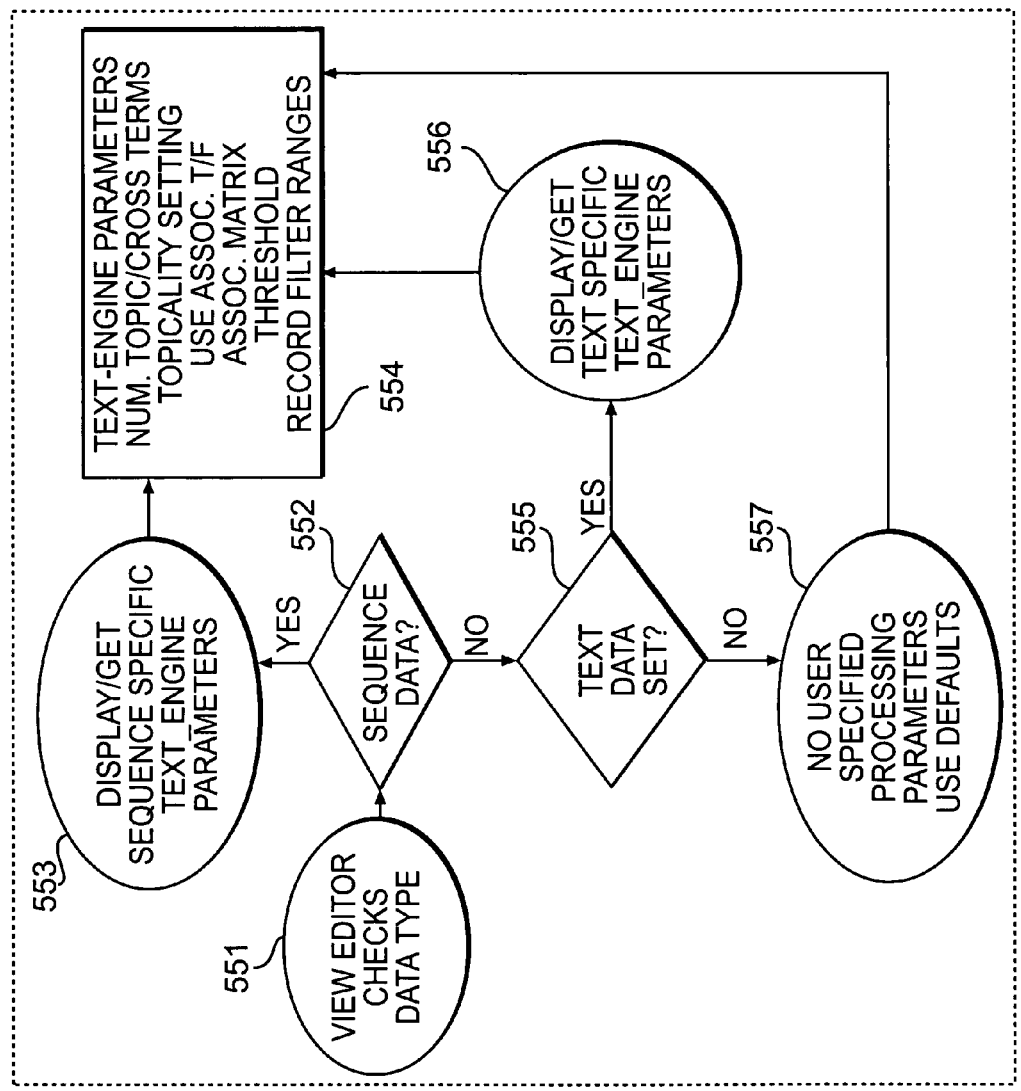

FIG. 5c illustrates an implementation of the processes associated with gathering vector creation parameters within the view editor 216 (FIG. 2). The view editor 216 first checks the data type (step 551). If the data is sequence data (step 552), sequence specific text engine parameters are requested or obtained for the particular data set (step 553). The text engine parameters requested may include the number of topics/cross terms, topicality settings, use association t/f parameters, associated matrix threshold parameters, and record filter ranges (step 554).

If the data is not sequence data (step 552), the view editor determines whether the data is text data (step 555). If the data is text data, text specific text engine parameters are requested from the user (step 556) such as the text engine parameters discussed above (step 554). If the data is not text data (step 555), no user specified parameters are needed and default parameters may be used (step 557). The text engine parameters may be used if desired (step 554).

Figure 5D:
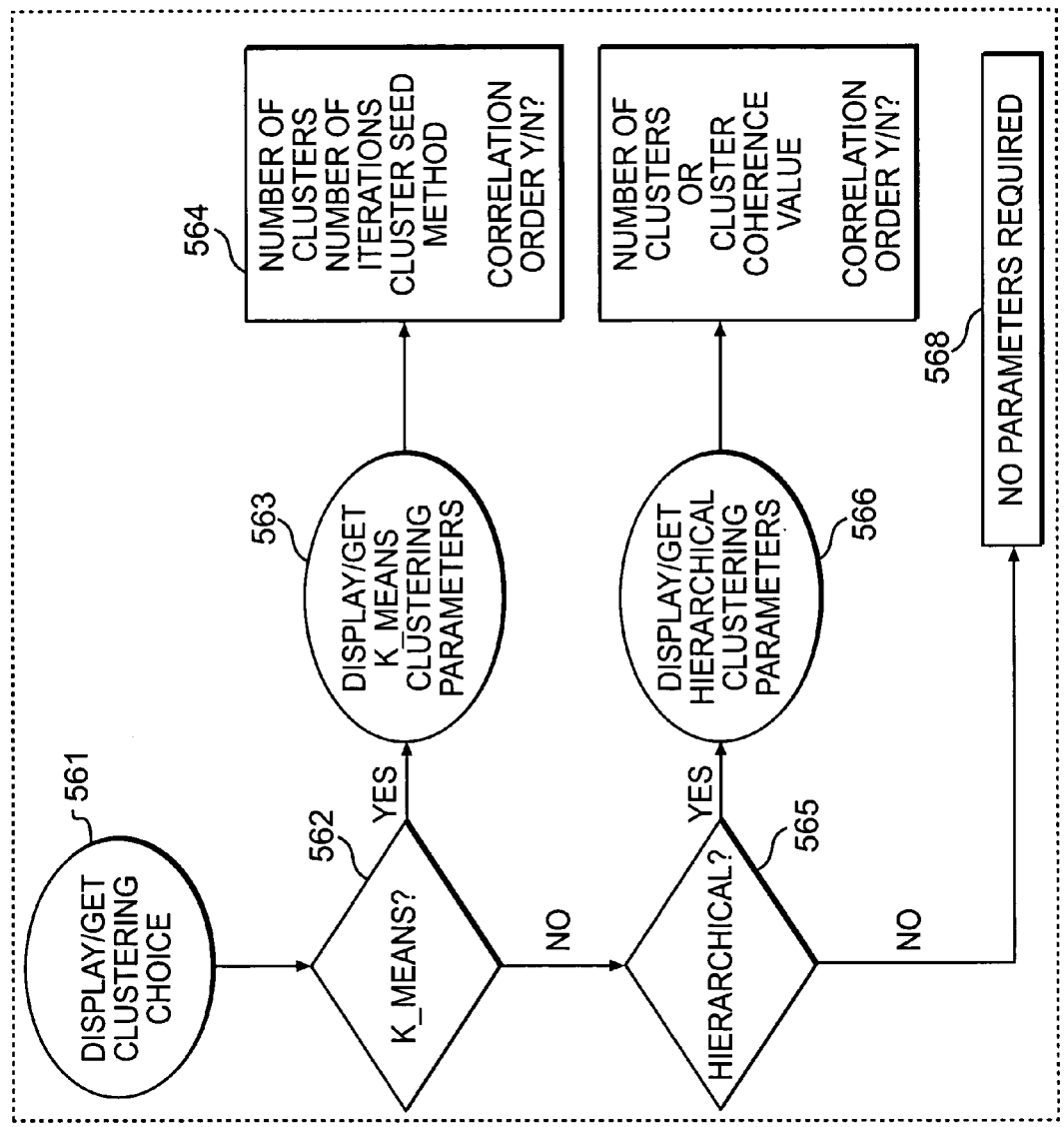

FIG. 5d illustrates an implementation of a process for specifying clustering parameters. Various types of clustering may be used such as k-means or hierarchical clustering as known to those skilled in the art. The view editor 216 presents a display screen to the user for the user to specify the clustering choice (step 561). The process determines whether k-means clustering has been chosen (step 562). If k-means clustering is requested (step 562), k-means clustering parameters are requested from a user or obtained (step 563) such as the number of clusters, the number of iterations, the cluster seed method or whether correlation order is to be used (step 564). If k-means clustering is not requested (step 562), the process determines whether the user desires hierarchical clustering (step 565), and displays or gets hierarchical clustering parameters (step 566). The hierarchical clustering parameters may include determining the number of clusters or cluster coherence values to be used and whether the user desires correlation order for the clusters may be determined (step 567). If hierarchical clustering is not desired (step 565), no parameters are required (step 568).

Figure 6C:
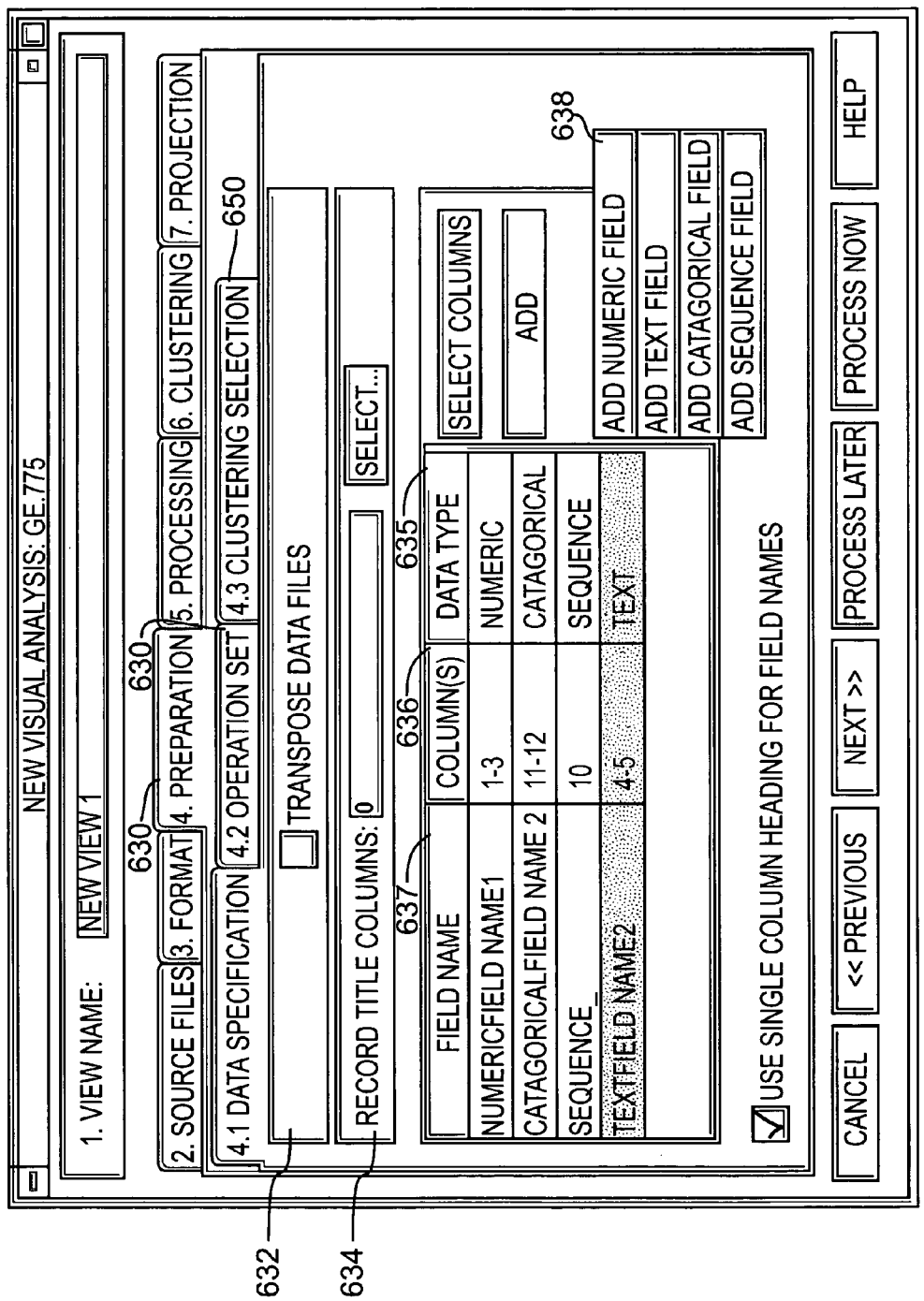

Referring to FIG. 6c, when the preparation tab 630 is selected, the user is presented with a data specification option 632, an operation set option 640 and a clustering selection option 650. The user may enter a value for the columns in the field 634. For the data set specified, the user may identify the type of data, such as numeric data, categorical data, sequence data, or text data by selecting a data type 635. The user may specify the columns 636 in which that data type is located and may specify a field name for that specific data as indicated under the field name 637. A predefined selection field 638 may be used to specify the types of data for the field name and columns provided.

Figure 6D:
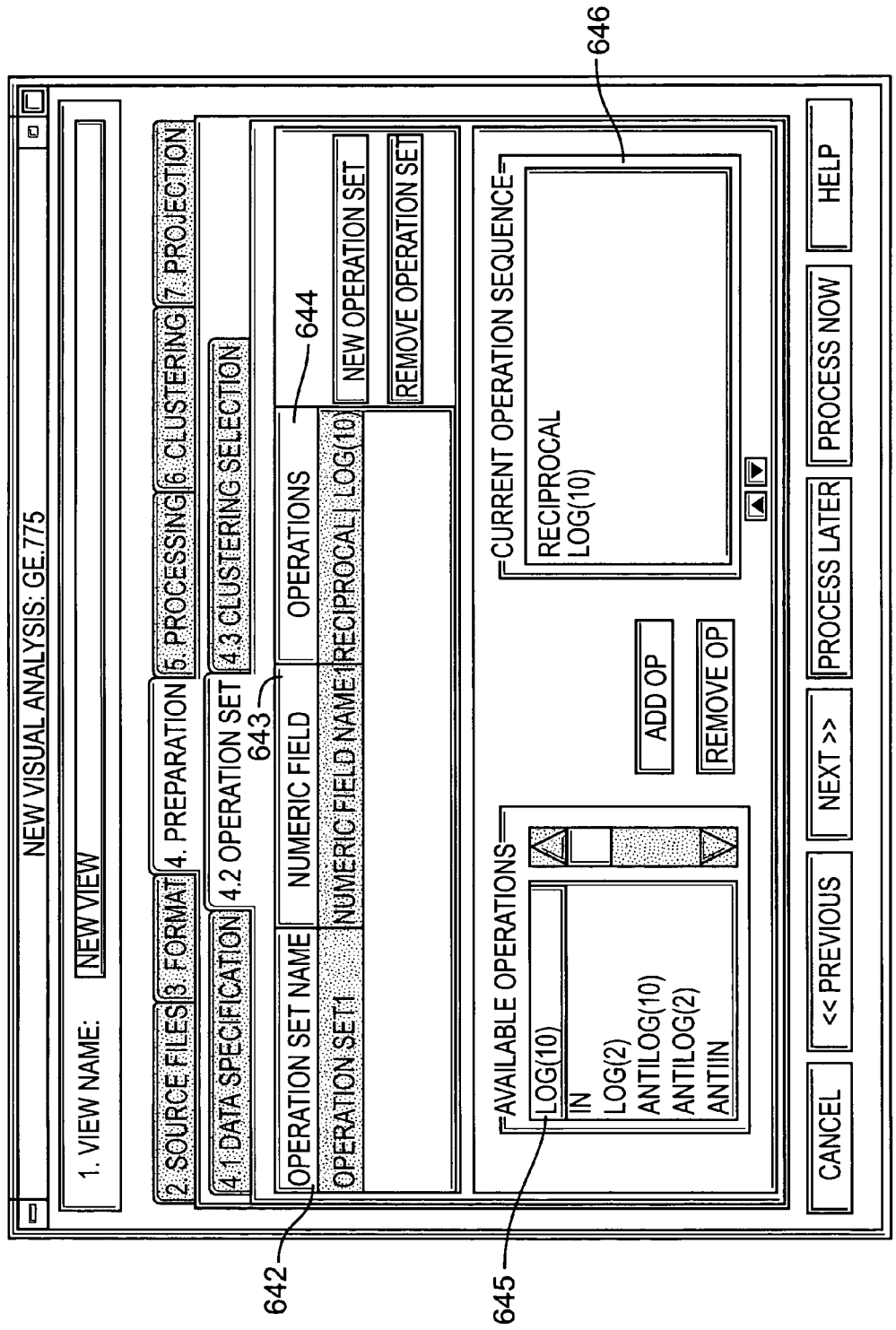

A user may perform any number of mathematical manipulations on the numeric data (one or more manipulations or transformations of the data is referred to as an operation set). These options include various logarithmic operations, methods for normalizing data, methods for filing missing data points, and all algebraic functions. Referring to FIG. 6d, for example, the reciprocal or the value for each numeric data item may be requested and then the logarithm taken for that reciprocal, creating a new field 642 called Operation Set1.

Figure 6E:
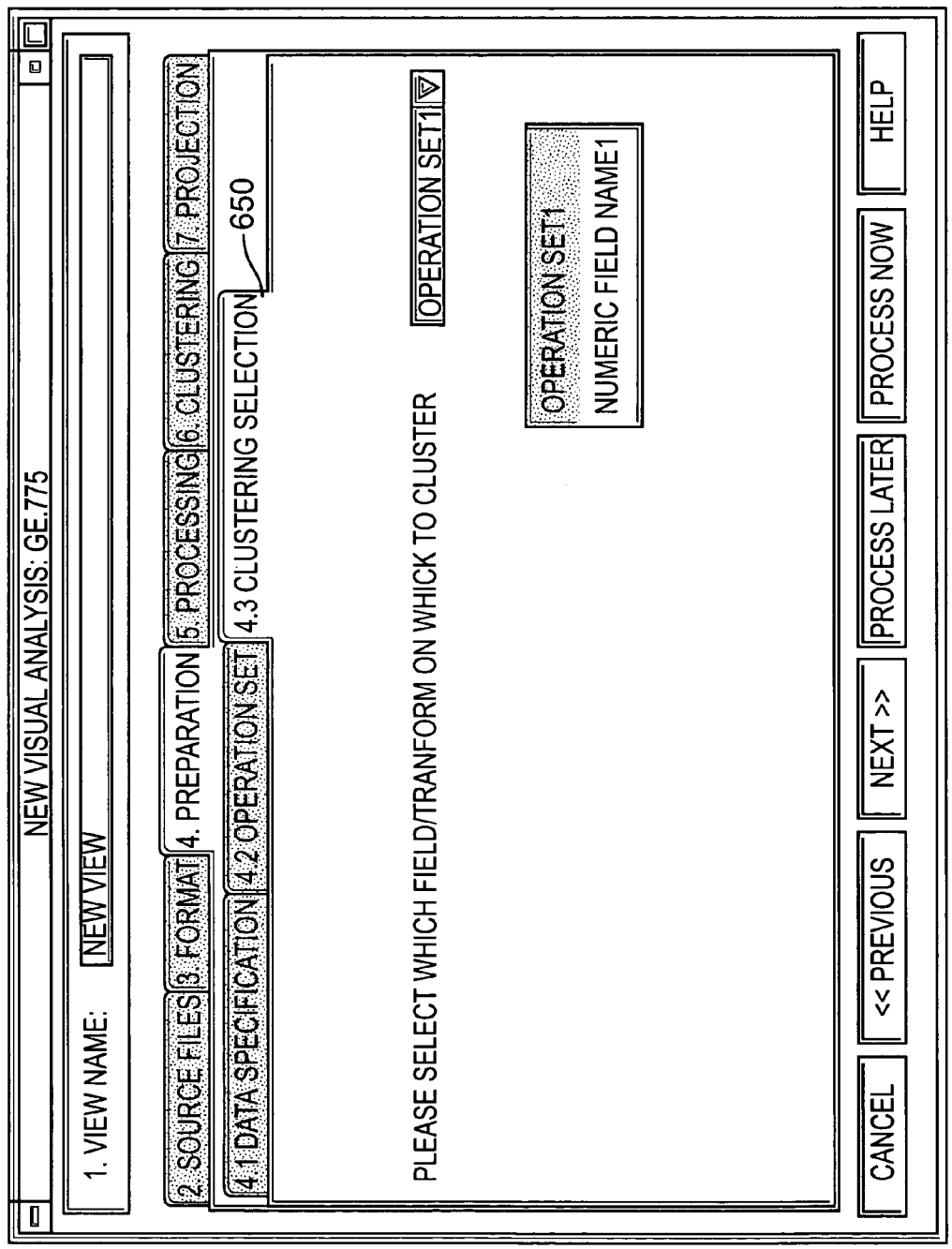

FIG. 6e shows the screen displayed if the clustering selection tab 650 is selected. The user is presented with a set of field/trench forms 652 for which clustering operations may be applied. In the example illustrated, operation set 1, or numeric field name 1 may be chosen for clustering.

Figure 6F:
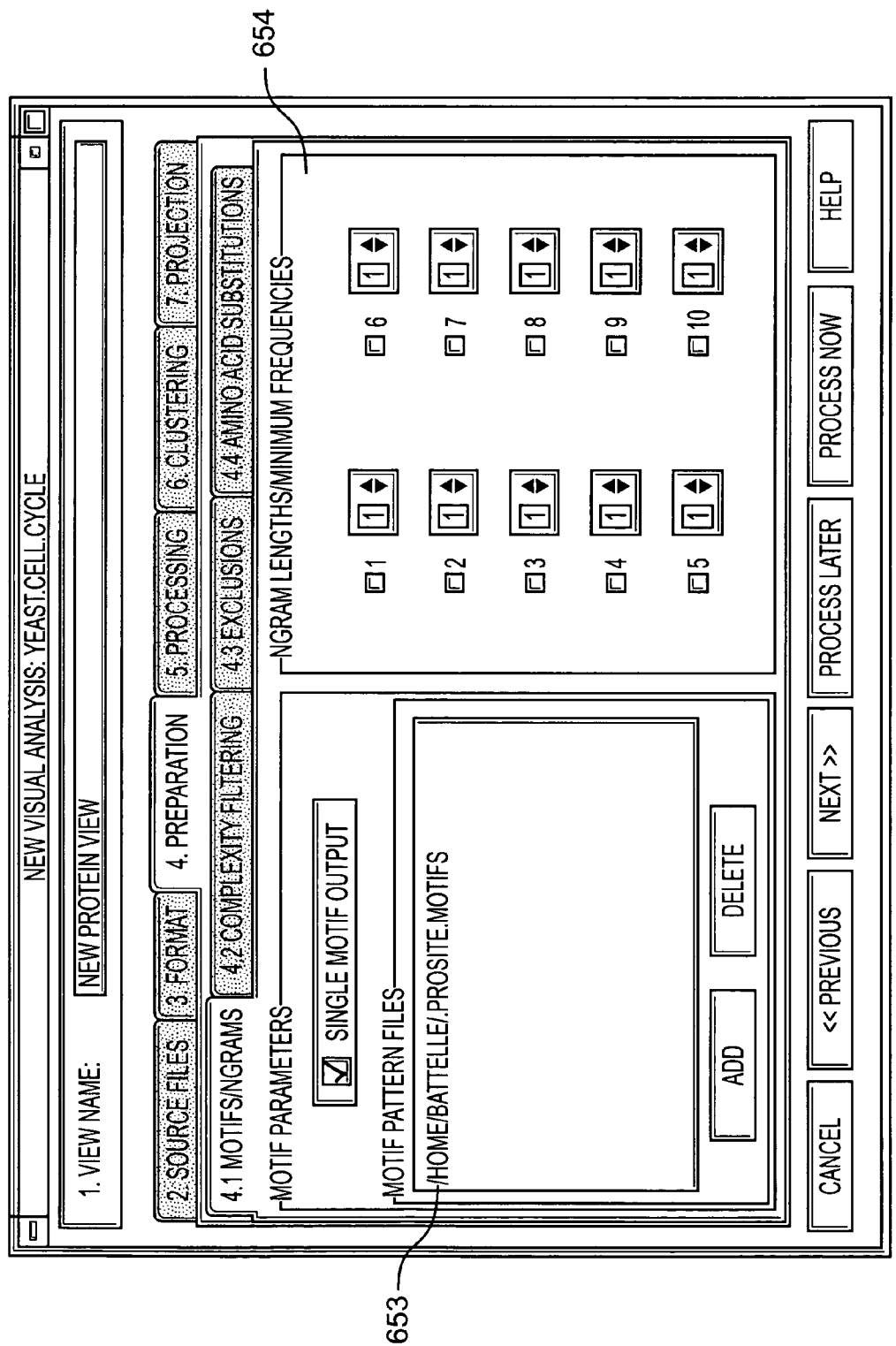

Referring to FIG. 6f, for a sequence, the user may have motifs/n-grams, complexity filtering, exclusions, and amino acid substitutions options from which to select. Operation on or with sequence data is discussed in more detail in U.S. patent application entitled "Method and Apparatus for Extracting Attributes from Sequence Strings and Biopolymer Materials" filed concurrently herewith and is expressly incorporated herein by reference. If the user wants to represent the sequence as a high-dimensional vector based on the occurrence of functional or structural motifs, a file is specified which defines those motifs. The user can have that vector based on the number of occurrences of each motif or, if desired, have the vector based on a binary format (the motif is either there or not) by checking the single motif output option. Alternatively, or in addition, the user may specify any combination of overlapping n-grams to be created to represent the sequence in field 654. The user also has the option to specify whether the n-gram should be included based on number of occurrences within the sequence. If neither motif nor n-gram options are selected, the program will analyze the text (e.g., annotations) associated with the sequence records. The complexity filtering options provide the user the ability to include the entire sequence dr eliminate regions of low or high complexity, for example, using the public domain tool SEG. The user may also specify certain records to be excluded, for example, based on sequence length, or title, by selecting options in the exclusion interface. Finally, the use of amino acid or nucleotide substitutions can be defined in the Amino Acid Substitution interface.

Figure 6G:
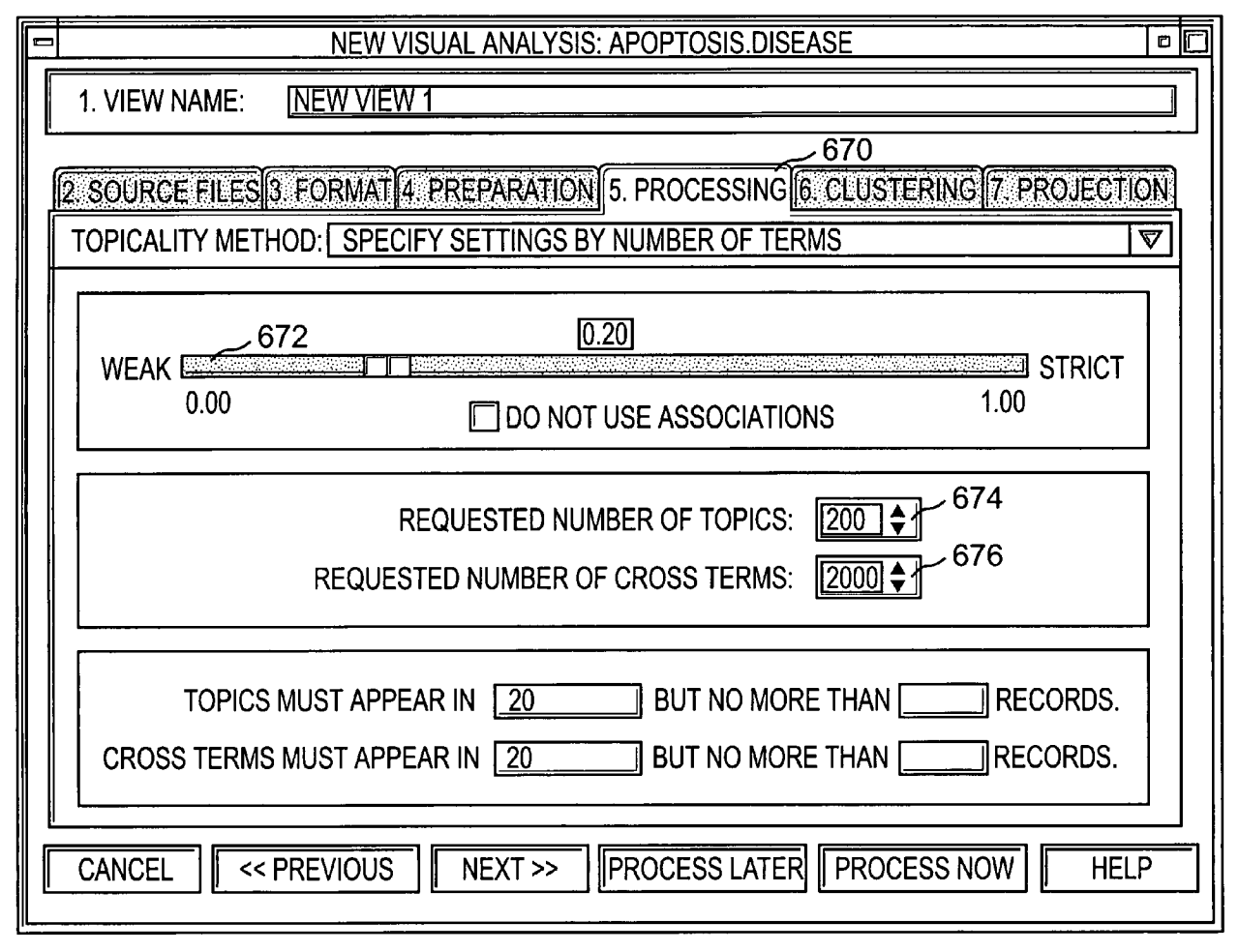

Referring to FIG. 6g, the options provided to the user for processing data is illustrated. The user may use a sliding scale to specify the magnitude or weight to give to associations as indicated by the association field 672. The user may enter the number of topics to be used in the field 674. The topics are the features that describe the vectors. For text, these are the vocabulary words that best describe the thematic content of the records; for sequences, the topics are the n-gram vocabulary words that best distinguish one sequence from another. The user may specify the requested number of cross terms as indicated in the field 676. Cross terms are the vocabulary words that are not topics. The user may specify the number of times that the topics may appear in a record before being identified as a topic and an upper limit may be included as well as indicated in the fields 678a and 678b. In the field 679a and 679b, the user may specify the number of times that the terms must appear in other documents by specifying a lower limit in field 679a and an upper limit in field 679b. These fields are used as filtering fields for processing. The topicality method for FIG. 6g is 'Specify the settings by the number of terms.'

Figure 6H:
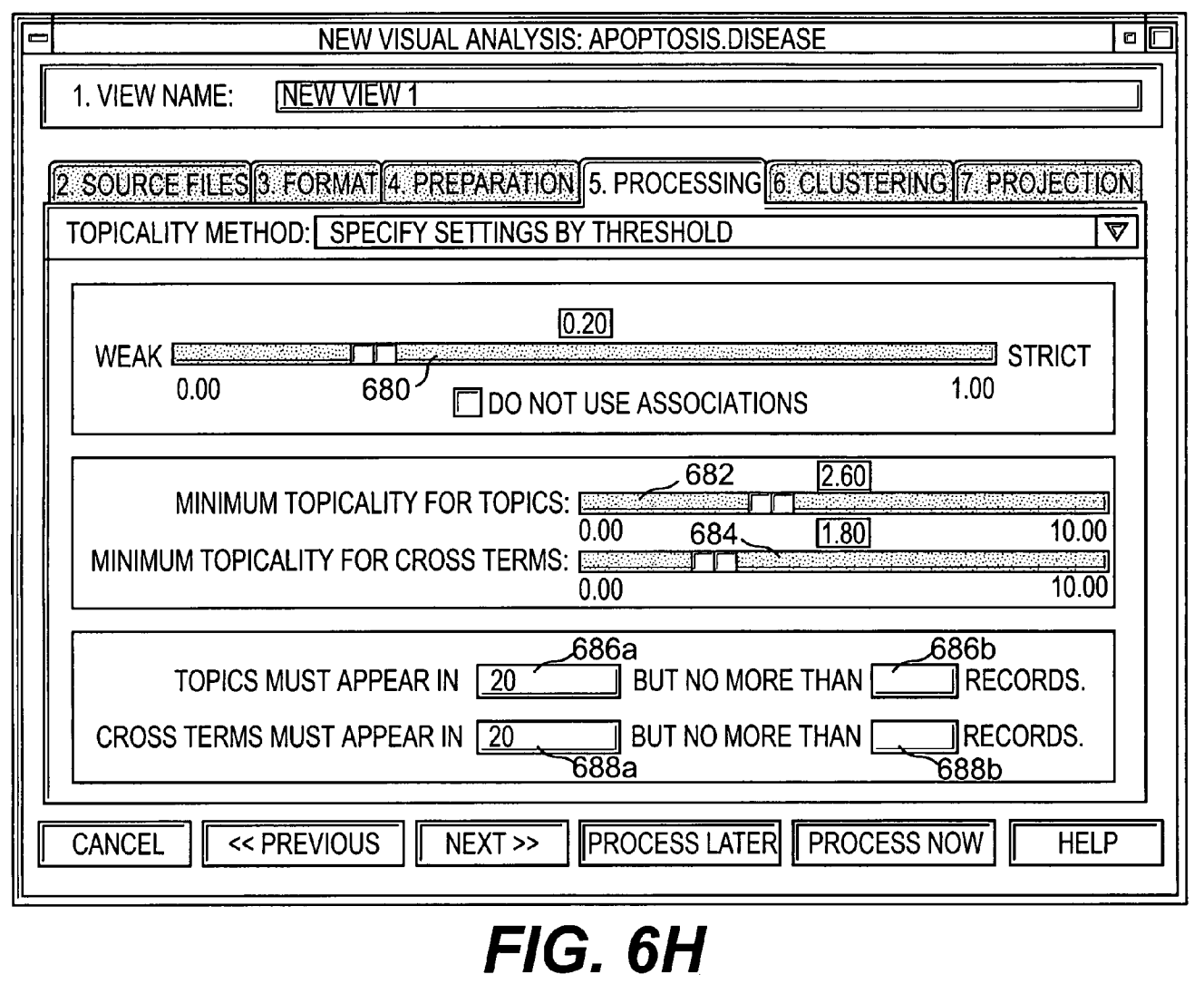

Referring to FIG. 6h, the topicality method for the processing option is specified as 'Specify the settings by threshold.' The user may use the sliding scale field 680 to specify the number of associations needed. The user may use a sliding scale input for identifying the minimum topicality for topics weight and the minimum topicality for cross terms as indicated by the fields 682 and 684, respectively. The user may specify upper and lower limits for defining the number of appearances to trigger identification for topics and cross terms, as indicated by the fields 686a, 686b, 688a, 688b.

Figure 6I:
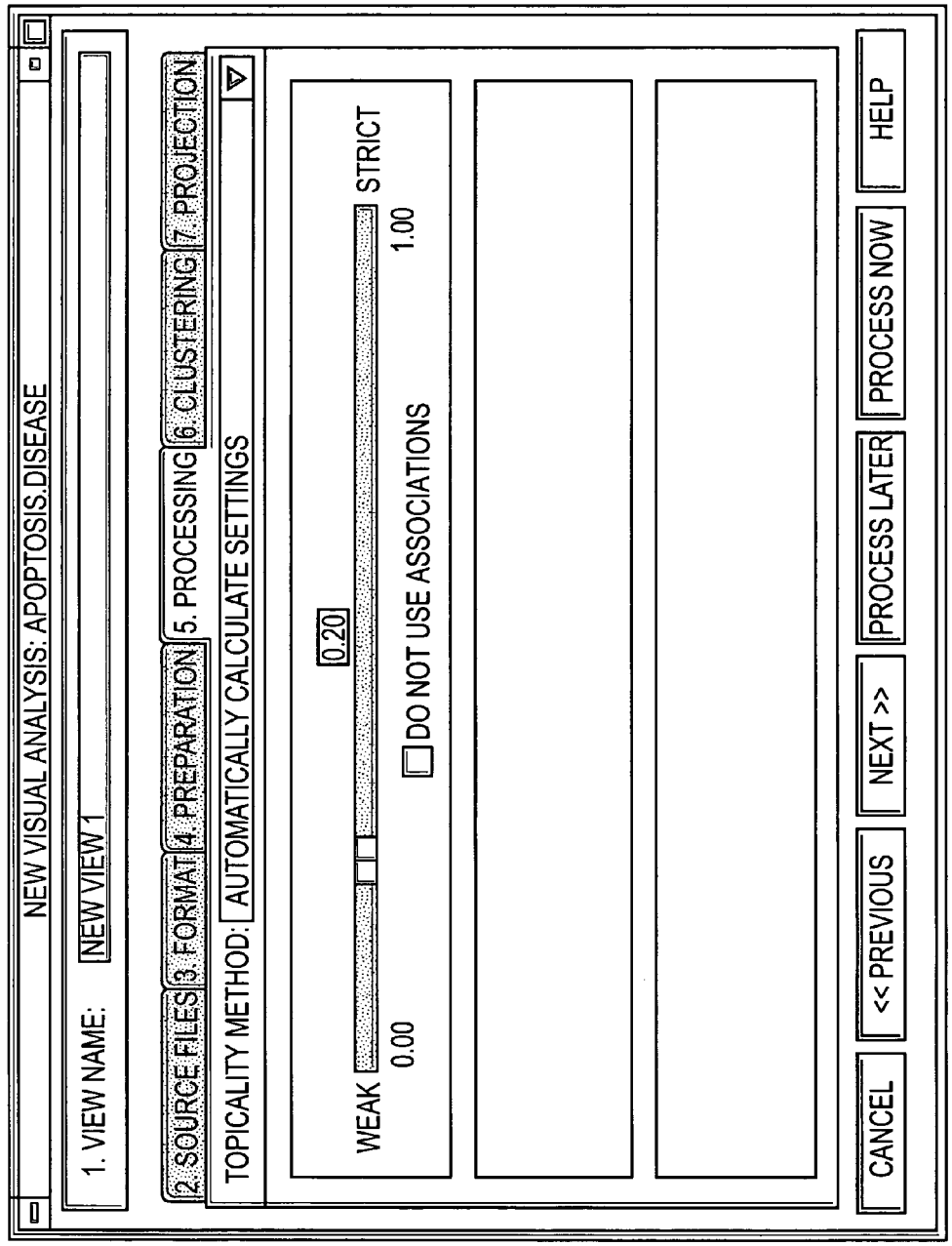
Figure 6J:
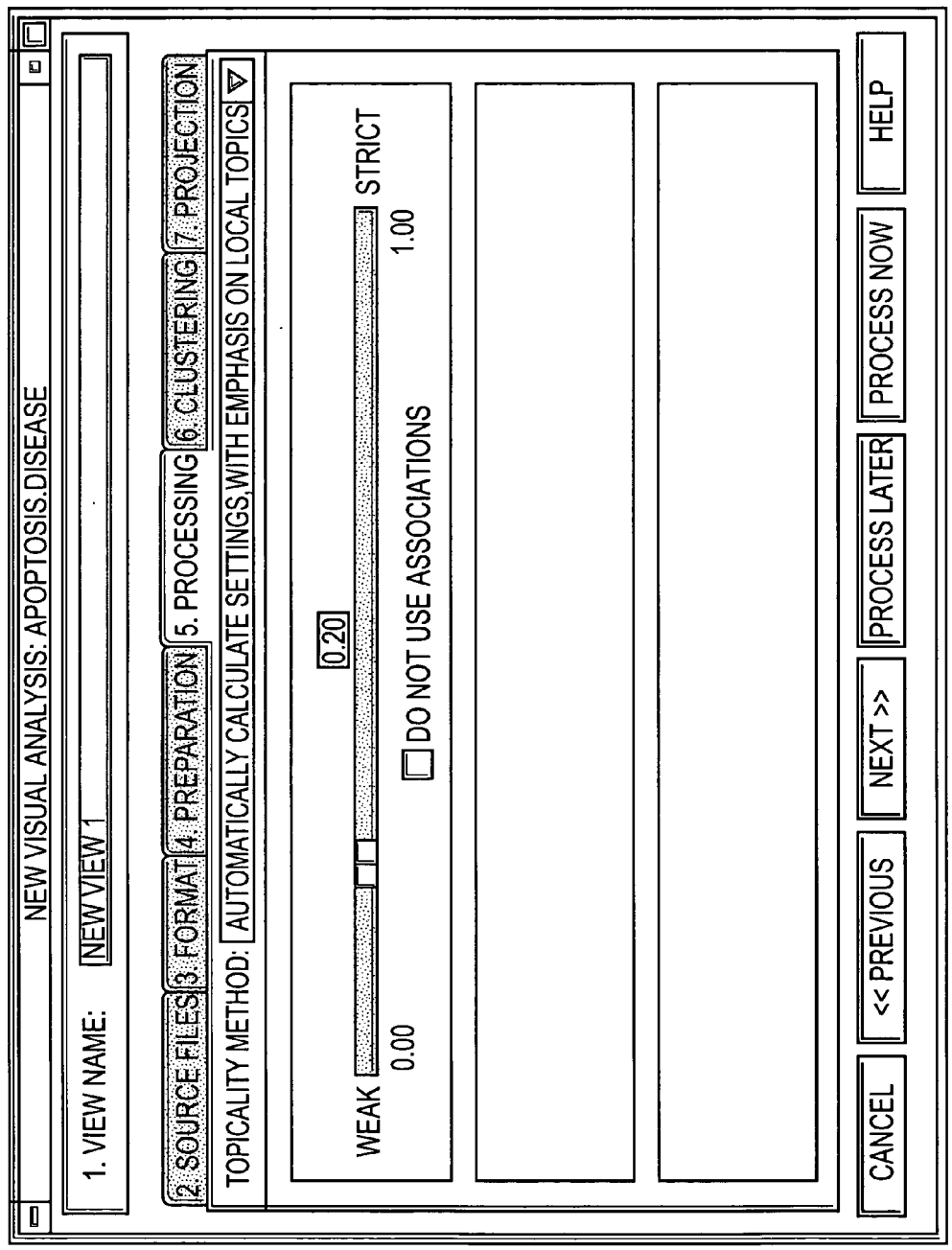

Referring to FIG. 6i, the user may specify a topicality method that automatically calculates the setting for the view all indicated in the display screen illustrated. The user may use a sliding scale selection field that specifies the weights of association as indicated by the field 689. Referring to FIG. 6j, the user may specify the weights of association for the topicality method that automatically calculates the settings with emphasis on local topics.

Figure 6K:
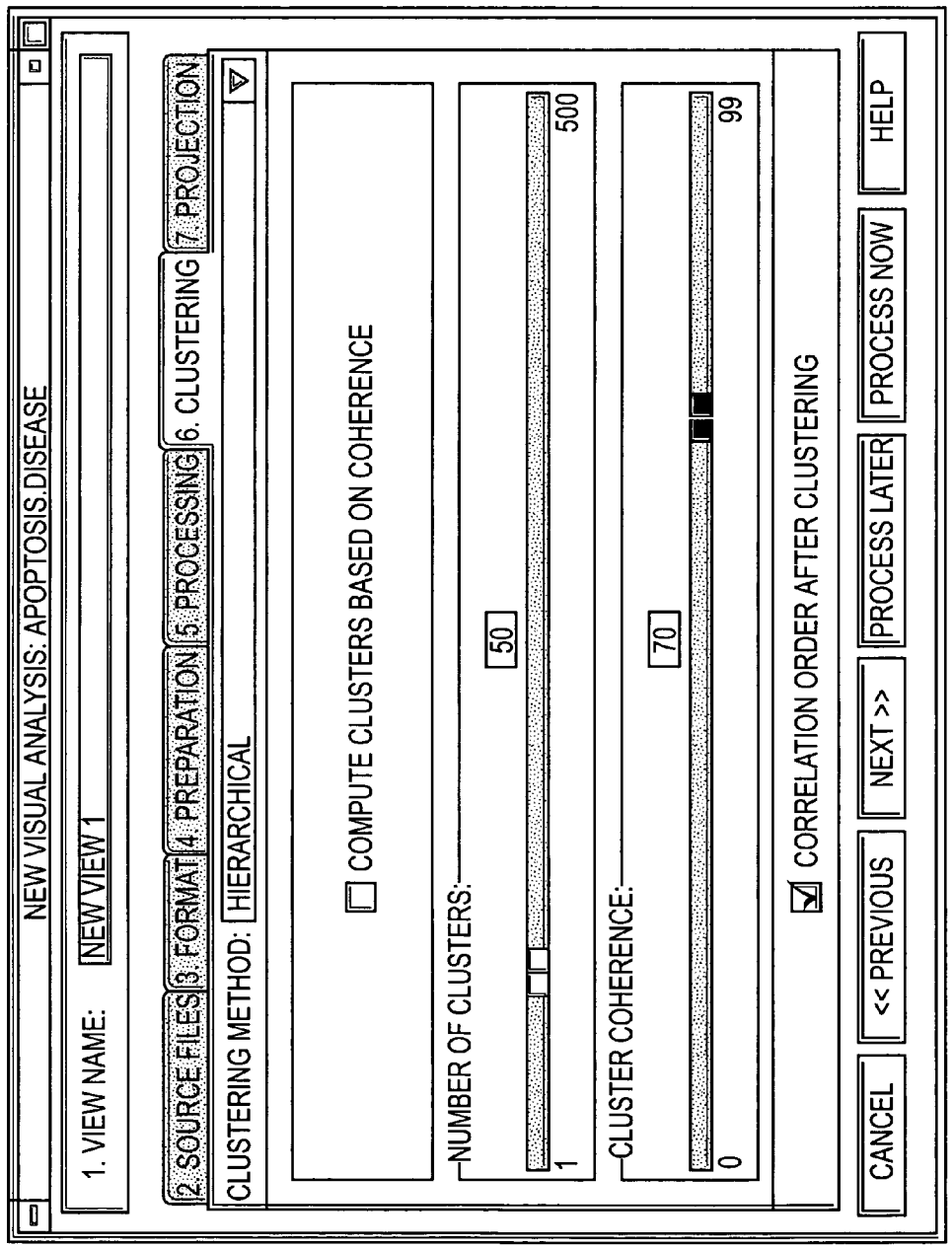

Referring to FIG. 6k, when a user selects the clustering tab 690, the user may specify a clustering method such as hierarchical or k-means. When hierarchical clustering is chosen, the user may select an option to compute clusters based on coherence. The user may indicate the number of clusters, and the cluster coherence. The user may also select whether to correlate the order after clustering.

Figure 6L:
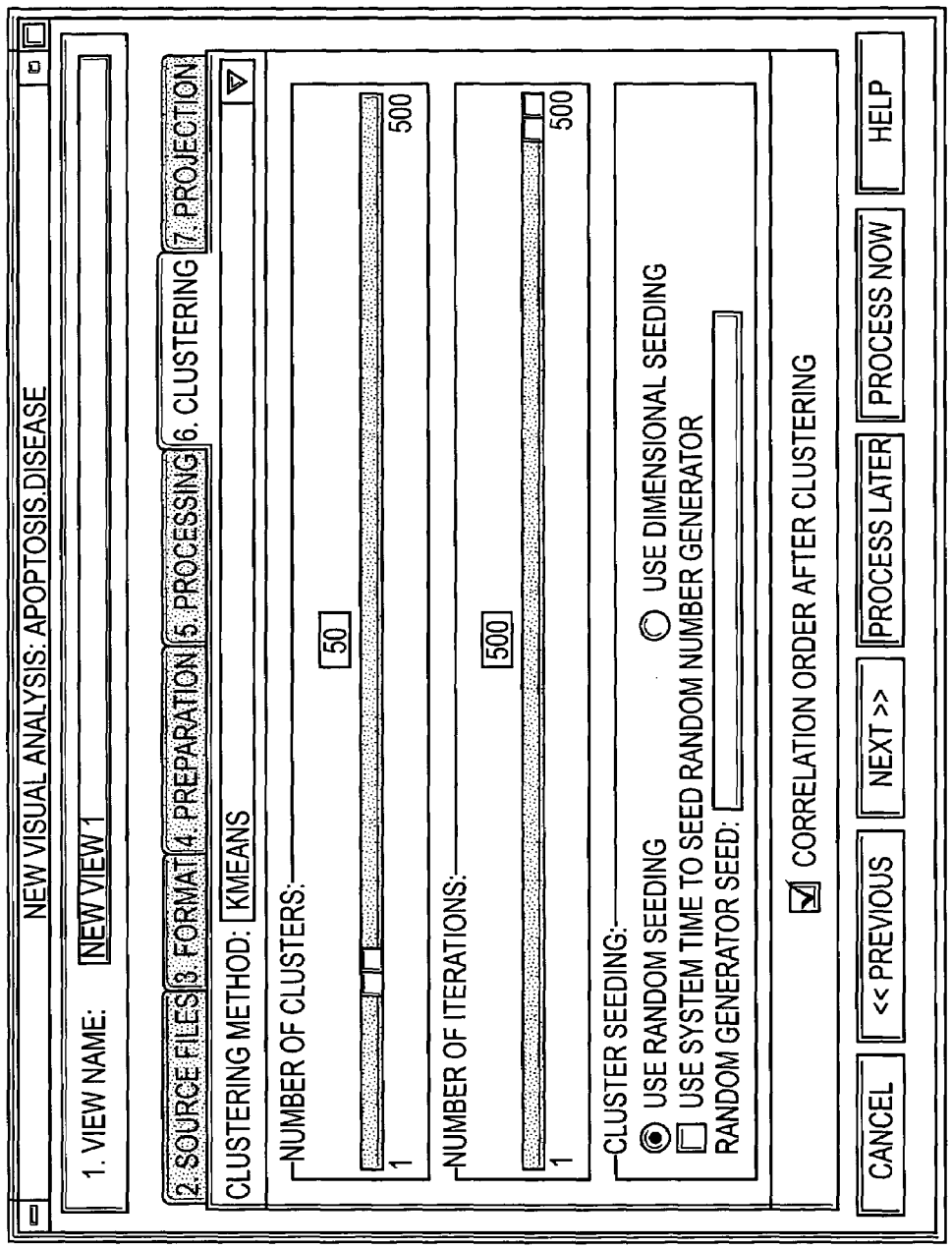

Referring to FIG. 6l, the graphical interface used for specifying the parameters of the k-means is illustrated. The user may specify the number of clusters or the number of iterations to be used for the k-means. When k-means is used, the user may select the cluster seeding parameters such as using random seeding or using dimensional seeding. The seeding may also occur by using the computer's internal clock (system time) to seed random number generator. The user may alternatively specify a value for the random generator seed.

Figure 6M:
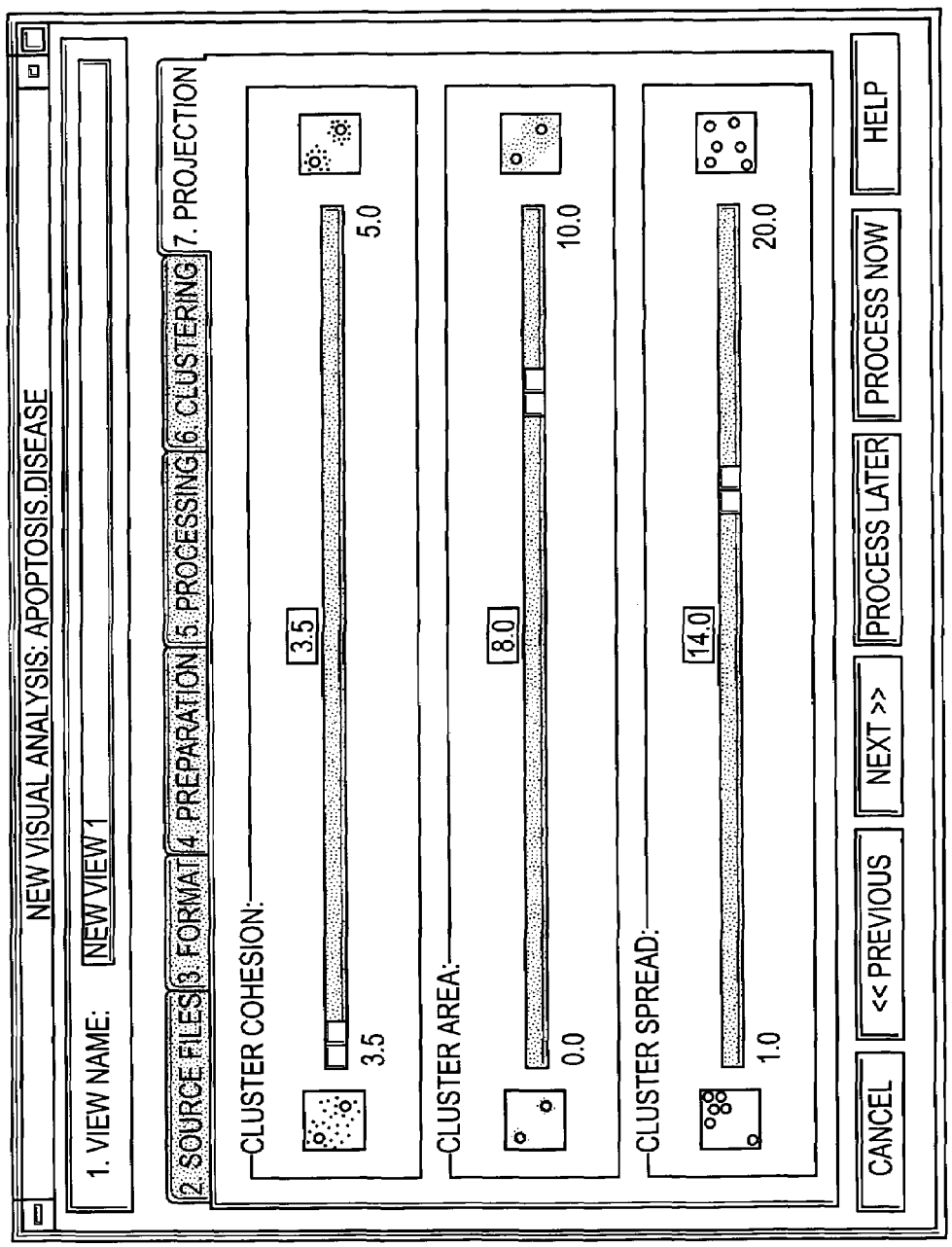

Referring to FIG. 6m, the user may select the type of projection to use by selecting the projection tab 695. The user may select cluster cohesion, cluster area, or cluster spread. When the user selects either of these options, the user may use a weighted scale for each of the options to identify the weight to be associated with each projection option.

3. Common Formatting, Vector Creation, and Index Creation

Figure 2B:
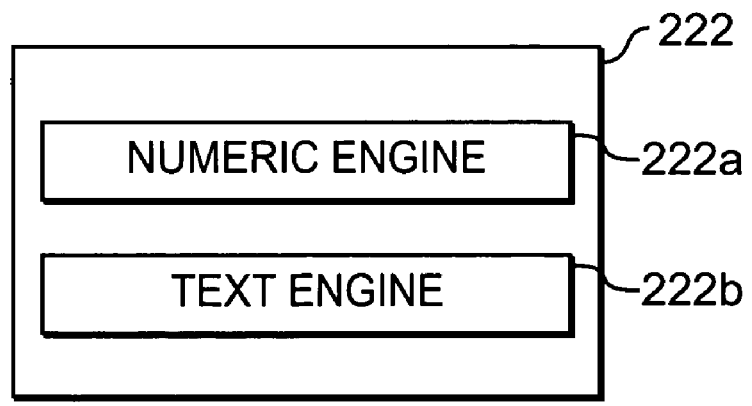
FIGS. 2b, 2c, 2d and 2e are block diagrams of program modules consistent with the present invention.

FIG. 2b illustrates vector creation engines consistent with the present invention. In an implementation, vector creation programs 222 include a numeric engine 222a, and a text engine 222b.

Figure 7A:
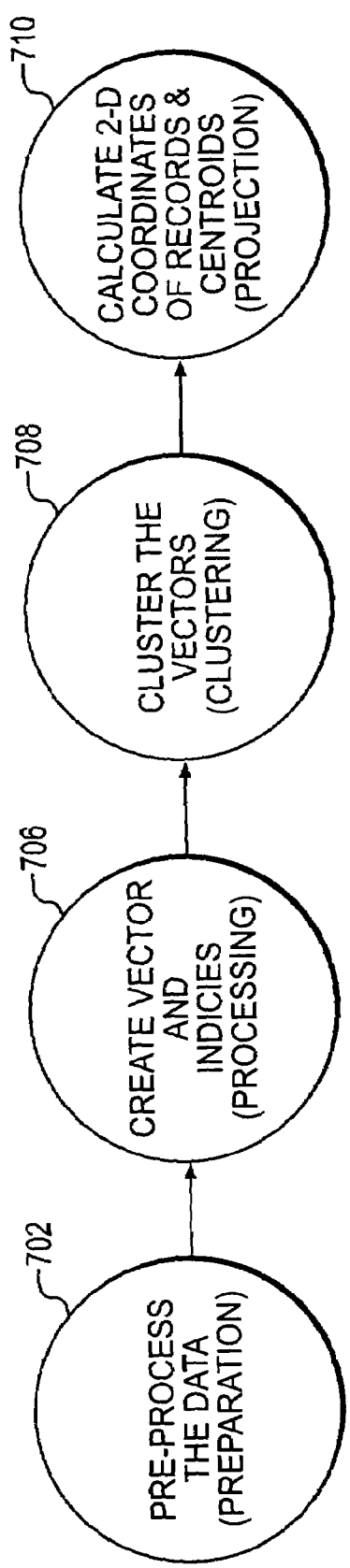
FIGS. 7a and 7b are flow diagrams of processes associated with an analysis processing module consistent with the present invention.

Referring to FIG. 7a, the general processes performed by the processing programs are discussed. Certain types of data, such as sequence data, is preprocessed (step 702) prior to data being input into the text engine. The sequence data is modified to a form that is acceptable to the text engine for generating the high-dimensional context vectors.

High-dimensional context vectors are created based upon the attributes of the objects or records to be used for a view and vector indices that correspond to the particular view are created and stored in a vector file associated with the data set (step 706). The vectors are clustered using known clustering programs based upon information from the vector files (step 708). The cluster assignment file (.hcls), as discussed below, is created (step 708). Two dimensional coordinates of the records and centroids are calculated for creating a two dimensional projection of the clustered vectors (step 710). Two dimensional coordinate files are created (.docpt) for each document.

i. Vector Creation and Formatting

The visualizations discussed herein are based on high-dimensional context vector representations of the data. Thus, each type of data is represented in that manner. For purely numeric data, the vector representation is simply the values associated with each record attribute. For categorical data, the vector representation can be based on any method that translates categorical values or the distances between values as a number. For text data, the vector representation can be derived by latent semantic indexing as known to those skilled in the art or by related methods, such as described in U.S. patent application Ser. No. 08/713,313, entitled "System for Information Discovery," filed on Sep. 13, 1996 (now issued as U.S. Pat. No. 6,772,170). As stated in that patent, the steps for processing text data may comprise:

a) semantically filtering a set of documents in a database to extract a set of semantic concepts, to improve an efficiency of a predictive relationship to its content, based on at least one of word frequency, overlap and topicality;

b) defining a topic set, said topic set being characterized as the set of semantic concepts which best discriminate the content of the documents containing them, said topic set being defined based on at least one of word frequency, overlap and topicality;

c) forming a matrix with the semantic concepts contained within the topic set defining one dimension of said matrix and the semantic concepts contained within the filtered set of documents comprising another dimension of said matrix;

d) calculating matrix entries as the conditional probability that a document in the database will contain each semantic concept in the topic set given that it contains each semantic concept in the filtered set of documents; and e) providing said matrix entries as vectors to interpret the document contents of said database.

For sequence data, the context vector can be derived from any combination of numerical or categorical attributes of the sequence or by methods described herein. In addition, a user skilled in the art will recognize that the vectors created for each record do not have to be created from a single data type. Rather, the vectors can be created from mixed mode data, such as combined numeric and text data.

Not only are high-dimensional vectors created for each record of a data type, but also a common method is used to store that information about the records and their vectors so that later processes can access the data. Methods consistent with the present invention create a group of meta data files through the action of a series of computational steps (collectively referred to as the numeric engine) alone, or in conjunction with another series of computational steps, referred to as the text engine. The files that are produced are binary, for reasons of access speed and storage compactness. The files produced during vector creation are discussed below in more detail.

Unless otherwise noted, the files discussed below have the following characteristics: (1) Files are binary, and remain within a directory established for the analysis; (2) IDs and positions are 0-based; (3) Terms have been converted to lowercase, and are listed in ascending lexical order; (4) Record IDs are listed in ascending order; (5) Index files (.<x>_index) contain cumulative counts of records written to the file they are indexing (.<x>). This cumulative count is for the current record and all previous records. This cumulative count is equivalent to the record no. of the next record; and (6) Internal Numerical representations in a Sun Microsystem Operating System are:

```
TermID (4 bytes)
TermCount (4)
DocID (4)
DocCount (4)
streampos (4)
double (8)
```

Although the examples provided refer to flat file storage of the relevant information, one skilled in the art will recognize that a database could equally serve as the method for storing and retrieving the meta data.

The files produced during vector creation are:

```
.dcat (document catalog)
   number of records in the source file
   for each record (line number-2 is the record id)
   Source file id
   Starting byte offset with the source file
   Length (in bytes) of the record
.tl (title file)
   for each record (line number-1 is the record id)
   title field
.docv (vector file)
   no. of records in view
   no. of dimensions for vectors (= no. of topics)
   for each record
      for each dimension
         coordinate value (float)
``` ii. Visualization and Formatting

The visualization methods keep track of the location of the record representation and may use an object-oriented design. One type of visualization that is especially effective with high-dimensional data is a proximity map or a galaxy view. This and related visualizations can take advantage of methods to group the records in the high-dimensional space (clustering) and to project the arrangement of objects in high-dimensional space to two or three dimensions (projection).

Clustering can be by any of a number of methods including partition methods (such as k-means) or hierarchical methods (such as complete linkage). Any of these type methods can be used with the present invention. Despite the different methods, the computational processes that carry out the clustering create a common set of meta files that allow the chosen visualization method to access the clustering information, regardless of original data type.

The files produced during cluster analysis are:

```
.hcls (cluster assignment file)
This file contains the assignments for each record to a cluster. The
format of the file is as follows:
Number of total Clusters
For each cluster (in correlation order)
Cluster ID
Cluster vector as determined by taking the average of the record
vectors assigned to the cluster
Number of Records in the Cluster
The record id's of the records assigned to the cluster
```

After the .hcls file is produced, it may be resorted in correlation order (a user-definable option).

An example .hcls file:

```
9 (number of clusters)
6 (cluster ID)
0.0457451 0.0399342 0.0864002 0.0652852 0.0635923 0.0429373
0.0650352 0.0661765 0.0487868 0.0885645 0.10 0173 0.0482019
0.048553 0.091455 0.0991594 (cluster vector)
4 (number of records in the cluster)
7 (record ID)
4 (record ID)
3 (record ID)
5 (record ID)
5
0.0392523 0.0364486 0.0897196 0.0626168 0.0598131 0.0364486
0.0616822 0.0794393 0.0448598 0.0925234 0.11
215 0.0429907 0.0420561 0.0962617 0.103738
1
6
1
0.0341207 0.0209974 0.0918635 0.0682415 0.0603675 0.0314961
0.0629921 0.0656168 0.0393701 0.11811 0.1049
87 0.0393701 0.0393701 0.112861 0.110236
1
8
3
0.0587949 0.0578231 0.0739416 0.0695847 0.0651338 0.0544486
0.0705118 0.0665825 0.0739358 0.0612976 0.07
11892 0.0697833 0.0711892 0.0645948 0.0711892
3
12
13
2
``` iii. Projection and Formatting

Projection can also be by any number of methods, for example, multidimensional scaling. Like cluster analysis, a specific projection method is not required for use with the present invention. However, as with clustering, the results of that projection are stored in a common format so that the visualization operations can retrieve the data independent of the original data type.

Files created during projection from high-dimensional space to 2 or 3 dimensions are:

.cluster (2-D Coordinates for the Cluster Centroids)

This file contains the 2-D coordinates for placing the cluster centroid on a galaxy view). For each cluster, a single line in the file contains:

Cluster ID

X coordinate

Y coordinate

An example .cluster file:

```
6 0.770783 0.831761
5 1 1
1 0.920542 0.989886
3 0.073888 0.210541
7 0.0206639 0.109404
4 0 0.13854
0 0.0187581 0.153266
2 0.139079 0.0695485
8 0.374849 0
```

Example of a .docpt file

```
0    0.374849 −4.46282e-07 8
1    0.0300137 0.145639 0
2    0.0890008 0.222 3
3    0.861783 0.90898 6
4    0.745403 0.813245 6
5    0.84583 0.896318 6
6    1 1 5
7    0.630116 0.708499 6
8    0.920542 0.989886 1
9    0.0206639 0.109405 7
10   0.0206639 0.109405 7
11   −4.91018e-08 0.1385 4
```

Note that the X and Y coordinates in the cluster and .docpt files are represented by a number between 0 and 1 inclusive. Also note that analogous file structures would be used for a 3D projection.

iv. Data Linkage and Formatting

Advantageously, the present invention enables linkage among all visualizations and data types (text, categorical, numerical, or sequence). Prior methods enabled linkage between views of the same data visualized using different attributes or visualizations. In addition to the attributes used to create the visualization, other attributes or descriptors for each data record are linked and readily available for interaction. These interactions are possible with any of the data types. That is, additional attributes related to a record, as well as those used for vector creation, are equally available regardless of data type. This is accomplished through the use of a common set of file or database structures created by the numeric or text engines. These files store information about each record attribute, which itself can be any of the data types. These files are created during an initial processing of the data and are independent of the specific visualization method to be employed. These files provide a common framework that can be addressed by any visualization or interactive tool through an API.

The files created to store and manage the ancillary data, such as data not used in creating a view, are:

```
.headings (used for data input through a matrix array only)
for each record (line number-1 is the record id)
name of the column heading
.vocab (text)
for each term in the view
term (i.e., a word)
.vocab_index
for each term in the view
cumulative no. of chars written to .vocab (including \n's);
.field_off
```

-continued

```
for each record
  for each field defined in the format file
    starting position (in bytes) of the field from the start of the record and
    the number bytes in the field
.corrv
for each correlatable field defined in the format file
  number of unique values of field
  for each unique value of the field
    number of records that contain the unique value
    record id's of the records that contain the value
.ifi (inverted file index)
for each term in the view
  for each record containing that term
    doc ID
    frequency of term within the record
.ifi_index
for each term in the view
  cumulative no. of records written to .ifi
.docterm (document term file)
for each record
  for each term in the record
    term ID
    frequency of term within the record
.docterm_index
for each record
  cumulative no. of records written to .docterm
.topic (topic file)
no. of topics
minimum topicality for topics
minimum no. of docs containing a topic
maximum no. of docs containing a topic
no. of cross terms
minimum topicality for cross terms
minimum no. of docs containing a cross term
maximum no. of docs containing a cross term
for each major term (topic or cross term)
  term ID
  topicality
  no. of docs containing the term
  term strength (4 bytes; 0 = MINOR_TERM, 1 = CROSS_TERM,
    2 = TOPIC_TERM)
.rel (Association matrix file)
no. of major terms
no. of topics
conditional correction
for each major term
  for each topic
    relation value of major term to topic (values are encoded as
    four-bits and packed into bytes)
  four zero bits to pad last byte for major term, if needed
```

In each of the above files, "terms" refer to text vocabulary words; "topics" refer to text vocabulary words deemed by statistical analysis to be most likely to convey the thematic meaning of the text; and "crossterms" refer to text vocabulary words that provide some meaningful description of the text content but are not topics. U.S. patent application Ser. No. 08/713,313, entitled "System for Information Discovery," filed on Sep. 13, 1996 discusses topics and crossterms in more detail.

Many of the binary files are paired, with the first file holding the information, and the second providing an easily accessed index into the first. For example, the inverted file index consists of .ifi and .ifi_index files. Each index is a list of the cumulative number of records in the data file.

Together these files provide indexing of and access to the textual information associated with each record including the distribution of keywords within each record and co-occurrences of those keywords. Furthermore, the files provide a catalog of all the categorical data including the distribution of the values. For numerical attributes not used in the actual vector representation, additional files are created using the .docv format so that this type of ancillary information will also be readily available to establish interaction among the various views.

Figure 7B:
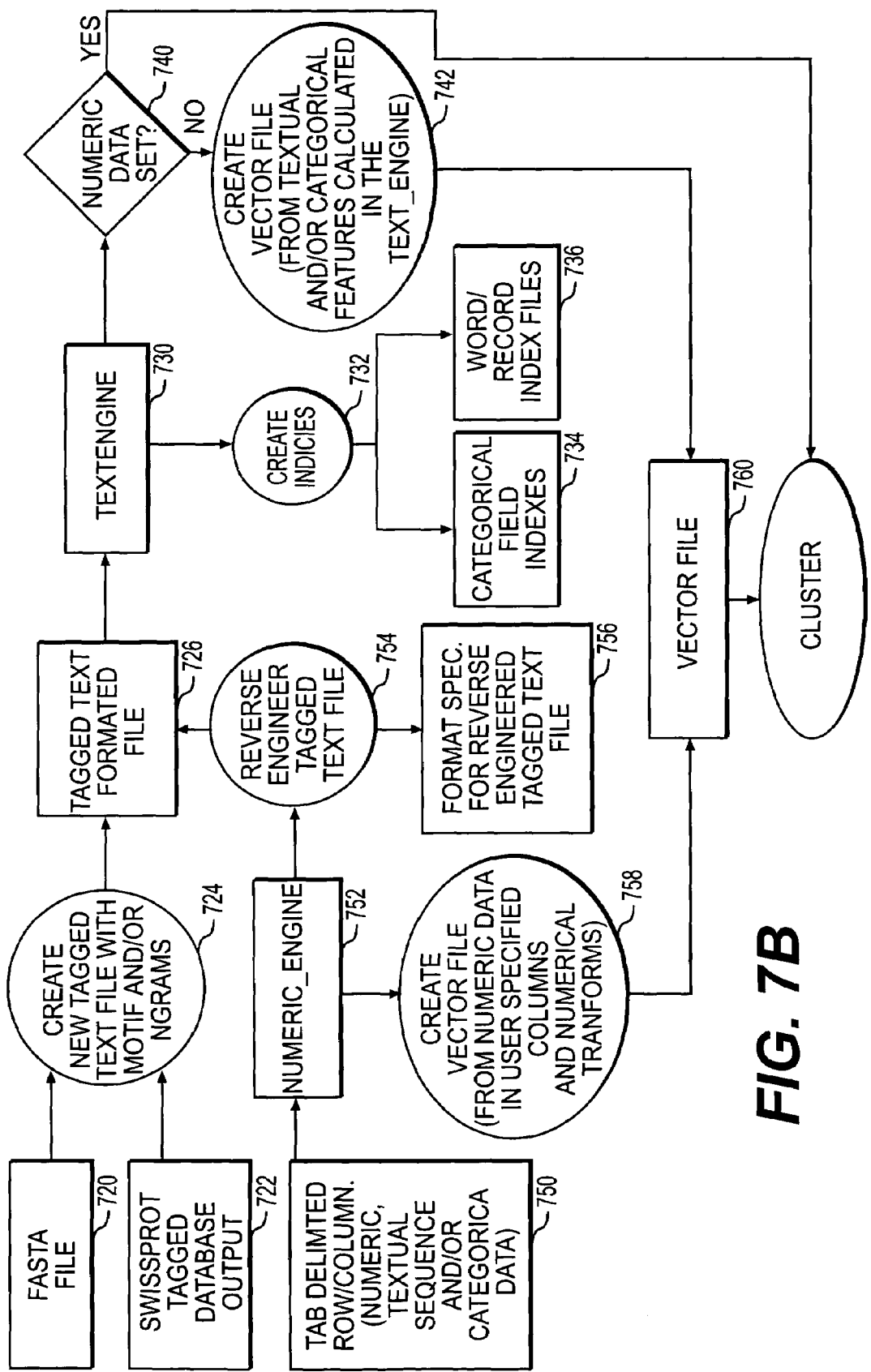

The processes associated with producing the series of common files described above are depicted in FIG. 7b. Referring to FIG. 7b, the text engine (730) creates the files associated with text or categorical fields. The expected input for the text engine (block 730) is a tagged formatted file. For text data sets, the input is either the original format for the input or the result of a processing step to identify the beginning and end of each record along with special information, such as the record title. An example original input file to the text engine is provided in Appendix C.

For sequence data in the commonly used formats FASTA (720) or SwissProt (722), a software module (724) reformats the input file to contain a series of fields that delineate the initial input and meta data created for the vector representation (726). The reformatting and processing of sequence data is discussed in more detail in the U.S. patent application entitled "Method and Apparatus for Extracting Attributes from Sequence Strings and Biopolymer Materials" filed concurrently herewith and incorporated herein by reference. Once in this tagged format (726), the text engine (730) is able to create all the required meta data files.

Numerical data, or any other data presented in a data matrix, (750) is received at the numeric engine (752). The data in the input file can be tab delimited or use any other delimiter. The numeric engine (752) creates the record vectors for data presented in a data matrix instead of the text engine. In addition to the numerical columns, the user may specify other columns within the table that can contain textual, sequence, or categorical information or additional numerical data that will not be used for the vector created. Usually, each row in the table becomes a record; however, the user can choose to make each column the record. Each user-defined set of columns becomes an attribute (also called fields) within the record. A set of numeric columns is specified by the user for subsequent clustering. The other fields, which can be numeric, text, categorical, or sequence, will become attributes of the record that can be queried, listed, or otherwise made available within the interactive tools.

If categorical data is specified by the file format (FIG. 8), as indicated by the index 804 for the view used, categorical data is processed during the text engine processing steps for all types of data. The categorical data shown in FIG. 8 records where each unique character strain and the categorical field occurs in the data set. Thus, subsequent categorical tools are enabled to correlate various records based upon the categorical values.

Each field expected in the input file is defined by a section beginning with |51 F followed by the field number (e.g., ||F0). For each field, the name is defined (in this case, title). Then the type of field is defined; this could be string (text or categorical), numeric, or sequence. Next, the delimiter tag for the field is defined. The METHOD line indicates whether the field is on a single line or continues to the next field. The DOC_VECTOR line tells the clustering module whether to use this information in the cluster analysis. The next item designates whether the field should be accessible within the query tools. The CORR line determines whether the contents of the field should be indexed for all possible associations. The next item defines whether the content is case sensitive or not. The following lines describe the behavior of the delimiter tag. WHOLE_BOUNDARY indicates whether the tag must be a single word or could be embedded within other text; LINEPOS indicates whether the tag must start at the beginning of a line or may be found elsewhere. Similar information would be given about each field in the data. This format file is stored in a directory associated with the view created.

Referring again to FIG. 7b, the numeric engine (752) is executed on the set of columns that the user specified for clustering. The numeric engine (752) performs any number of user defined mathematical operations and creates a record vector that is identical in format to those produced for sequence or text data. In contrast to the text engine (730), which automatically determines the features to use in the record vector, the vector creation in the numeric engine (752) utilizes a user specified set of columns from the users column/row formatted source file.

Once the record vector is created (758), the numeric engine automatically creates a text engine compatible source file (i.e., reverse engineered tagged text file, 754), and corresponding format file (756) from the input column/row formatted table. An example format file produced from the numeric engine is shown in Appendix D. The new tagged text source file and format files (726) are used so that any text, categorical, or sequence information that may have been embedded within the original column/row files, can be processed by the same programs that operate on text, categorical, or sequence information. This subsequent processing is performed by the text engine (730), which reads the reverse-engineered tagged text source file and indexes the textual and/or categorical data fields within each record (732, 734 and 736). The result is a standardized set of meta data which is related to the user source data and which is available to all tools regardless of data type.

Although the numeric engine processes numerical data, the processing steps of the numeric engine places any of the other data types (text, categorical, or sequence) into an appropriate tagged field in the data file so that the text engine will handle it appropriately.

In summary, if the data input is array data, the array data (column/row formatted tables) is processed by the numeric engine (752). The numeric engine 752 creates a second vector that is identical to the format of the context vectors for sequence and text data produced by the text engine (730). However, in contrast to the text engine, which can automatically determine the features to use in the second vector, the numeric engine 1052 accepts a user defined series of mathematical operations to be performed on specified columns of the array data source file. In order to make the non-numeric contents, such as annotated notes, associated with the array file accessible for subsequent analysis, a format file is produced and a tag text format file is produced for the non-numeric contents associated with the numeric file. The associated non-numeric contents is used as an input to the text engine and the output is associated with the numeric data. Thus, the textual or categorical data associated with the numeric array data may be indexed and associated with the data as produced for other text data sets that are input to the text engine (730). Plain text data should be in a tagged text format and does not require any pre-processing prior LAW OFFICES to input to the text engine (730).

4. Clustering

Figure 2D:
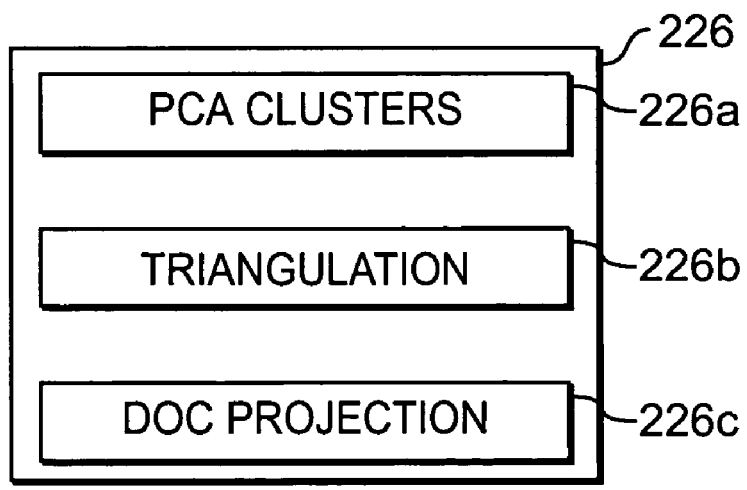
Figure 2C:
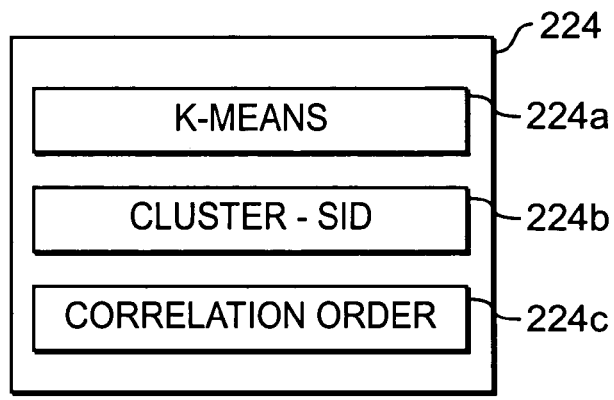

FIG. 2c illustrates clustering programs. Three clustering modules or options k-means 224a, cluster-sid 224b, and correlation order 224c are provided. The clustering options may have a set of user definable parameters. The k-means module 224a clusters documents by establishing a user specified number of seed clusters and then iteratively assigns documents to those documents until a user specified number of iterations is reached or the process/algorithm determines that all the documents have been assigned to the clusters.

The k-means module 224a moves documents to minimize the sum of squares between objects and centroids as known by those skilled in the art. The cluster-sid 224b is an agglomerative/hierarchical clustering method that minimizes the maximal between clusters distance (farthest neighbor method). The output of the clustering process is a file containing a correlation ordered list of clusters and the record's IDs of their members. Those skilled in the art will recognize that other clustering algorithms can be used.

Figure 9:
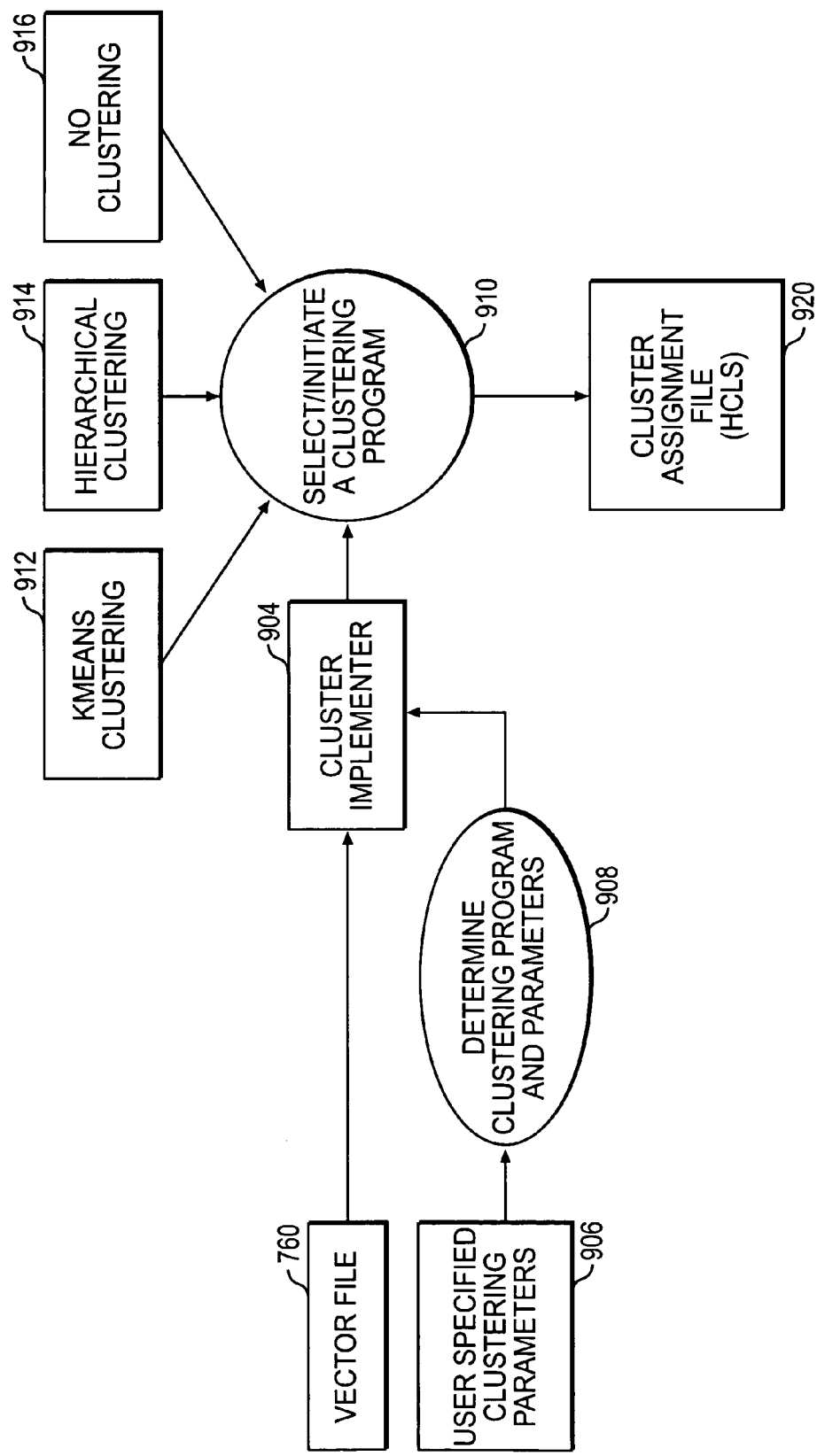
FIG. 9 is a flow diagram of a clustering process consistent with the present invention.

FIG. 9 shows a clustering process performed by the processing unit. A vector file is received from the stored context vector files (step 760) at the cluster implementer (step 904). The user specified clustering parameters are retrieved from stored files (step 906) and the clustering program and parameters associated with the files are determined (step 908). The clustering parameters associated with the clustering program are provided to the cluster implementer (step 904) and the clustering program associated with the vector file of the data set is selected (step 910). The clustering programs are chosen from a k-means clustering program (block 912), a hierarchical clustering program (block 914), or no clustering is selected (block 916). After the clustering program performs its operations (step 910), a cluster assignment file (.hcls) is created (step 920).

5. Projection

FIG. 2d illustrates projection programs 226. Systems consistent with the present invention may apply three separate processes to produce the meta data used to produce visualizations. These processes are carried out by three modules, the PCA-clusters module 226a, a triangulation module 226b, and a document projection module 226c. The PCA-clusters module 226a determines the principle components for each cluster and then determines the two dimensional coordinates for projecting the cluster centroids as known to those skilled in the art. The triangulation module 226b determines the boundaries for the area around each cluster centroid. These boundaries are later used in the doc projection module 226c to take into account the influence of records and neighboring clusters when determining how far from the center and on what side of the cluster centroid a record will be projected. The doc projection module 226c determines the x,y projection coordinates for each record in the visual analysis.

Figure 10:
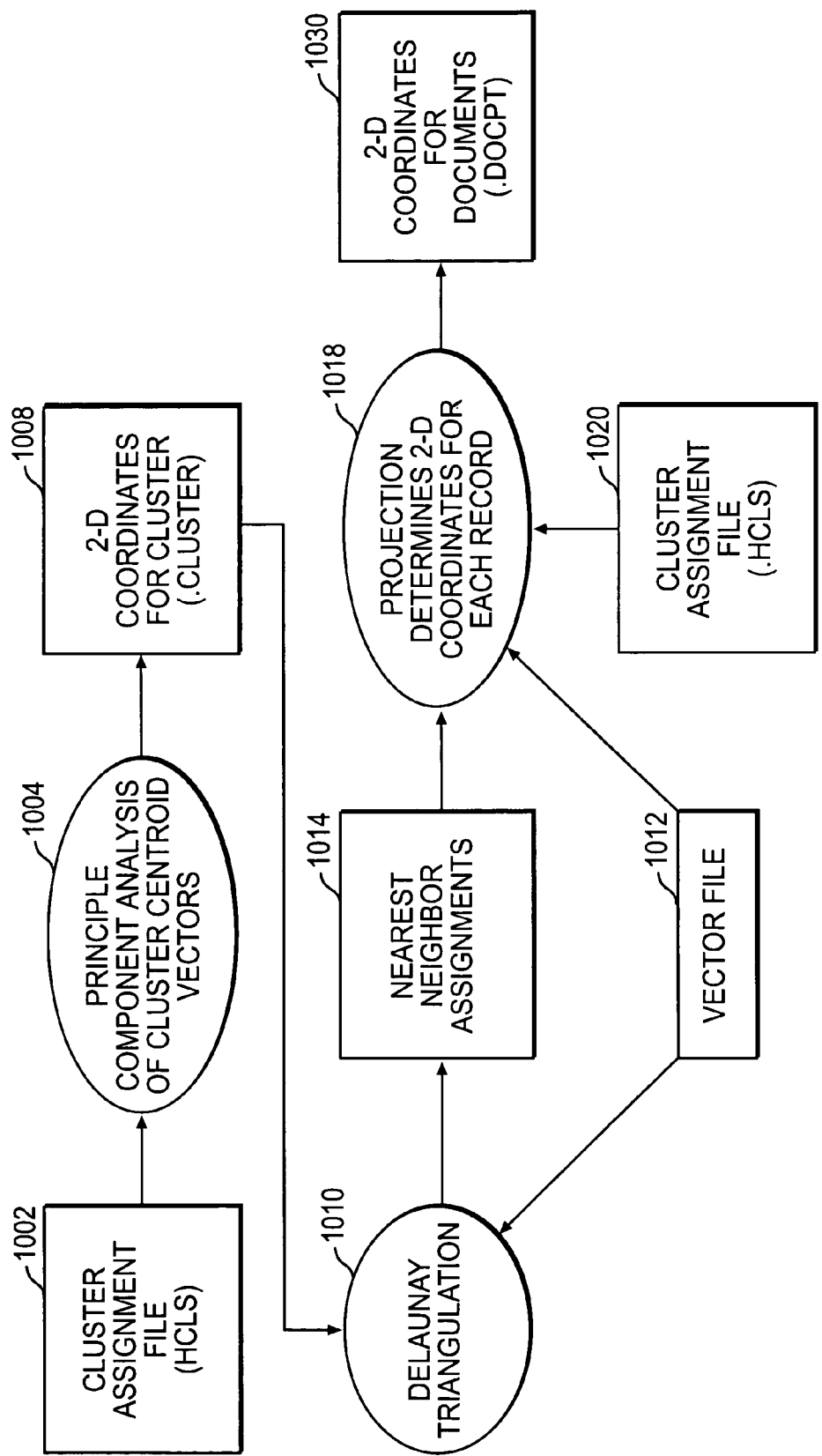
FIG. 10 is a flow diagram of a projection process consistent with the present invention.

Referring to FIG. 10, the processes associated with creating a two dimensional projection from the cluster assignment files is illustrated. The cluster assignment file (.hcls) is retrieved from storage (step 1002) and the principle component analysis of the cluster centroid vectors are performed (step 1004). Two dimensional coordinates for the cluster (.clster) are created (step 1008). Delaunay triangulation is performed (step 1010) based on the vector file retrieved from storage (step 1012) that is associated with the data set. Nearest neighbor assignments are associated with the Delaunay triangulation results (step 1014). The projection program determines the two dimensional coordinates for each record (step 1018) based upon the vector files retrieved from storage (step 1012). The projection program also accesses and retrieves the cluster assignment file (.hcls) (step 1020) associated with the data set. The two dimensional coordinates for the group of documents of the data set are stored in a document file (.docpt) (step 1030).

6. Graphic Modules and Tools

Figure 2E:
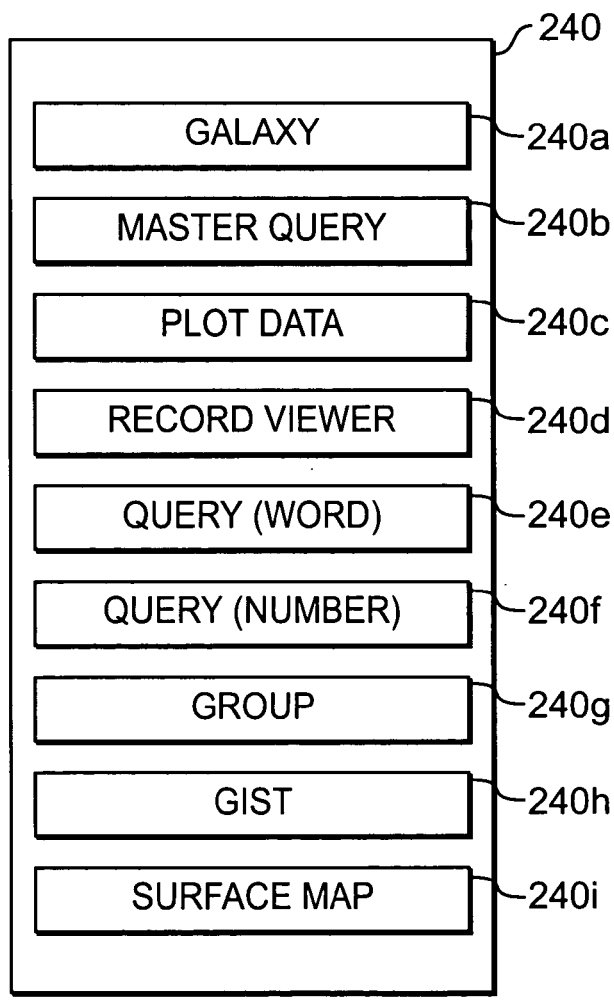

Referring to FIG. 2e, the interactive tools and graphics modules are illustrated. The interactive tools and graphics modules 240 include a galaxy module 240a, a master query module 240b, a plot data module 240c, a record viewer module 240*d*, a query (word) module 240*e*, a query (number) module 240*f*, a group module 240*g*, a gist module 240*h*, and a surface map module 240*i*.

The galaxy module 240*g* displays records as a scatter plot. The master query module 240*b* applies a correlation algorithm to all indexed categorical data and creates a two dimensional matrix with values of a category along each axis. At each intersection in the matrix, a rectangle is drawn with sections colored to show the correlation between the categories. The following are analytical tools. The plot data module 240*c* displays a two dimensional line plot of the n-dimensional vectors created for analysis by the user, this is done for all records in the analysis or just those selected by the user. This module can also be used to examine any ancillary numerical attributes associated with the records. The record viewer module 240*d* displays a list of the currently selected documents, displays a text of a document, highlights terms selected by other tools, such as the query tool 240*e*. The query tools 240*e* and 240*f* enable the user to input requests to search for information that has been represented by a vector during the processing and analysis of the user's data set. The query tools 240*e* and 240*f* compare the user input to vectors representing the processed data set. The query tool 240*f* performs Boolean or phrase queries in any text or categorical field based on a user's input. The query tool 240*f* also performs n-space queries based on the user's input and compares the input to the n-dimensional vector used for clustering. Thus, vectors that correspond to the users input can be identified and highlighted. The numeric query tool 240*f* performs queries based on numeric values. The group tool 240*g* enables users to create groups of records of a data set, based on queries or based on user selections, and colors the groups for display in the galaxy visualization created by the galaxy module 240*a*. The gist tool 240*h* determines the most frequently used terms in the currently selected set of records. The surface map module 240*i* provides a surface map that shows records and a plurality of attributes associated with those records.

Referring to FIG. 11, a table is shown that illustrates meta data files that result from statistical analyses and indexing of the data sets consistent with an embodiment of the present invention. The table also depicts the meta data files that are used for the various interactive tools and graphics modules. All of the meta data files except for the tab delimited column/row file, the tagged text source file(s), and the re-engineered tag text file are defined by the data set name or view name as created by the data set editor 314 or view editor 316 (FIG. 2*a*) plus an ".extension," such as [data set name].dcat or [view name].cluster. The meta data files include a data set name.dcat file, a data set name.properties file, a view name.clsp file, a view name.cluster file, a view name.corrv file, a view name.d cat file, a view name.docpt file, a view name.docterm file, a view name.docterm index file, a view name.docv(vector) file, a view name.edge file, a view name.fieldoff file, a view name.gif file, a view name.groups file, a view name.fmt file, a view name.hcls file, a view name.headings file, a view name.ifi file, a view name.ifi index file, a view name.properties file, a view name.punc file, a view name.rel file, a view name.repository file, a view name.stop file, a view name.tl file, a view name.topic file, a view name.vocab file, a view name.vocab index file, a tab delimited column/row file, a tag text source file(s), and a re-engineered tag text file. The table indicates which program modules create, read or update files as indicated by the letters C, R, and U, respectively. For example, the view name.clsp file is created by the view editor 216 (FIG. 2*b*) and is read by the k-means module 224*a* and the cluster-sid module 224*b* (FIG. 2*c*) and is read by the galaxy module 240*a* (FIG. 2*e*). The view name.groups file is updated by the group module 240*g*. All file access is performed through the API layer (FIG. 2*a*).

Figure 12:
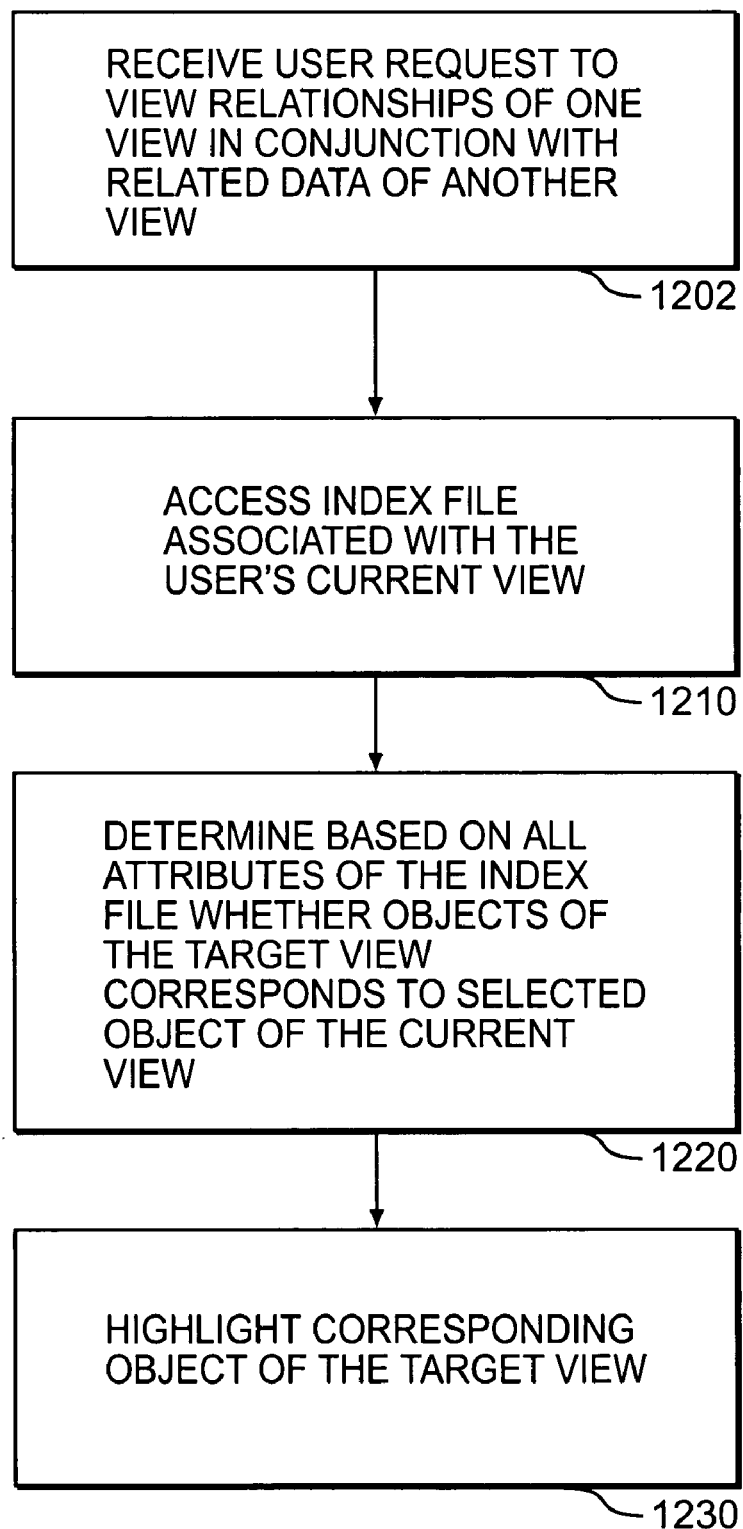
FIG. 12 is a flow diagram of a visualization linking process consistent with the present invention.

After the clustering and projection processes have been completed, the user may now view the results of the various operations performed on the user's data set. As discussed above, prior methods of visualization do not adequately provide access to relationships among attributes of data records other than those used in creating the visualization and, consequently, do not enable the identification of relationships between attributes of different visualizations or views. A system operating according to the present invention enables a user to identify relationships among different visualizations or views by maintaining all attributes associated with the data record for indexing although all attributes are not used in creating the visualization. Referring to FIG. 12, the processes consistent with an embodiment of the present invention used to link different visualizations or views is discussed. When a user is viewing a particular visualization or view, the user may request to identify the relationships that exist between the attributes used to create the current visualization with the attributes used to create another visualization (step 1202). After the user initiates a request to explore the data of another view (a target view) an index file associated with the user's current view or data set is accessed (step 1210). After the index file is accessed (step 1210), the process determines whether objects selected by the user in the current view, such as by initiating a query, correspond to objects of a target view based upon all of the attributes contained in the index file (step 1220). If objects of the target view or file correspond to the selected objects of the current view, the objects of the target view are highlighted (step 1230). Therefore, relationships among attributes of data records other than those used in creating the visualization can be used to identify relationships of another visualization as discussed in connection with FIG. 1.

Methods and apparatus consistent with the invention also provide tools that allow a user to display information interactively so that the user can explore the information to discover knowledge. One such tool displays a set of records and their associated attributes in the form of superimposed two-dimensional line charts. The tool can also generate a single two-dimensional line chart that provides the average values for the attributes associated with the set of records. Each of these charts are linked to other views, such that a record selected in the charts is highlighted in the other views, and vice versa.

Another tool generates summary miniplots that may be quickly used by a user to obtain an overview of the attributes associated with a particular group of records. In particular, records shown in a scatter chart are organized into groups. The average values for the attributes associated with each group of records is used to form a two-dimensional line chart. The line chart is superimposed on the scatter chart, based on the location of the set of records.

As described above, one basic visual tool implemented by the invention for viewing information is a "galaxy view" as produced by the galaxy tool 350*a*. A galaxy view is shown in window 120 of FIG. 1. The galaxy view is a two-dimensional scatter graph in which records are organized and depicted in groups (or "clusters") based on relationships between one record and another. In addition to this galaxy view tool, the invention provides numerous interactive visual tools that allow a user to explore and discover knowledge.

Figure 13:
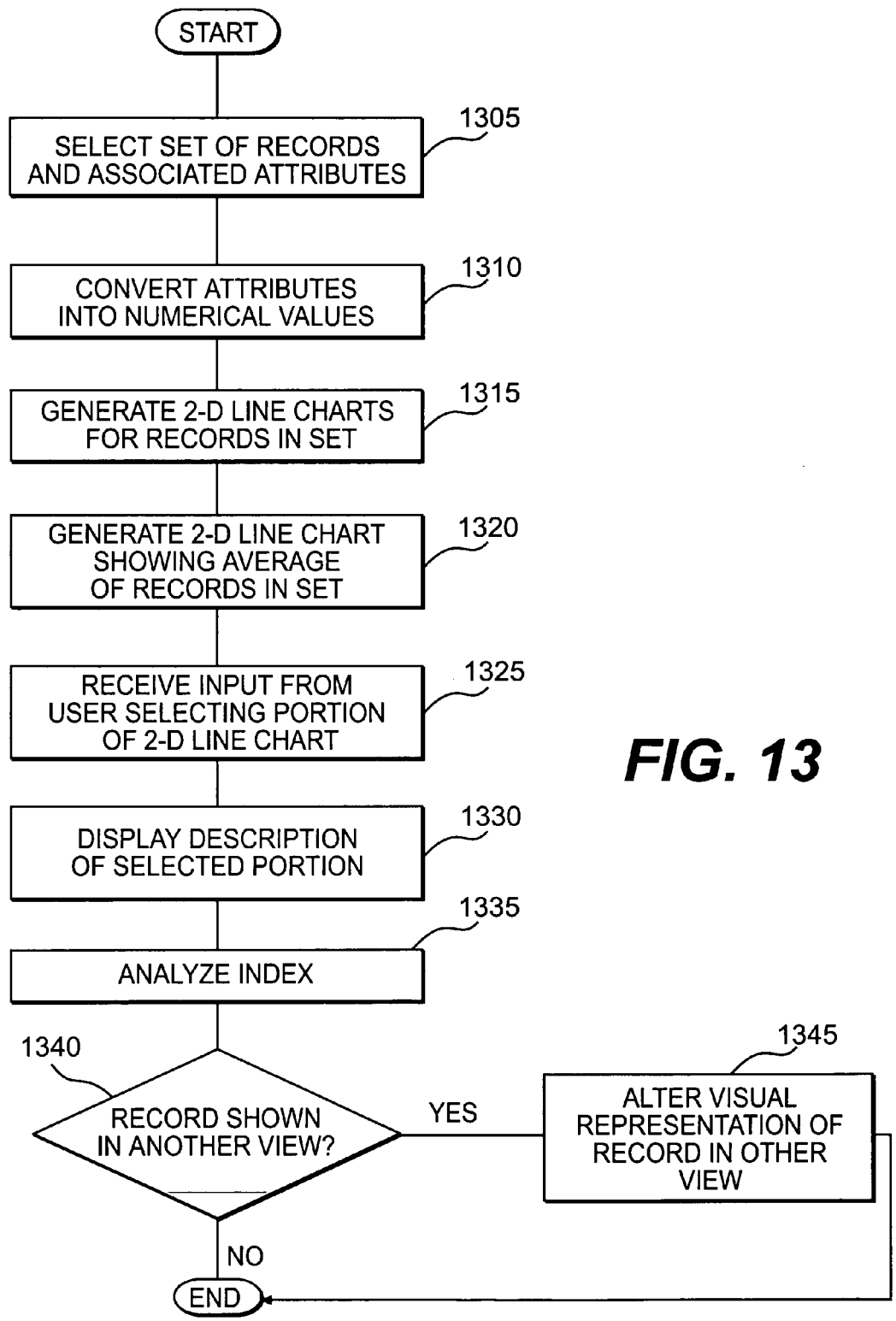
FIG. 13 a flow diagram of a method consistent with the invention for displaying information interactively by using 2-D charts.

FIG. 13 describes one method for displaying information interactively, in the form of two-dimensional line charts. The method begins with the user selecting a set of records and a set of attributes associated with those records (stage 1305). The attributes may comprise any of numerous data types, including the following: numeric, text, sequence (e.g., protein or DNA sequences), or categoric. The selected attributes are converted into numerical values, as discussed above.

Figure 14:
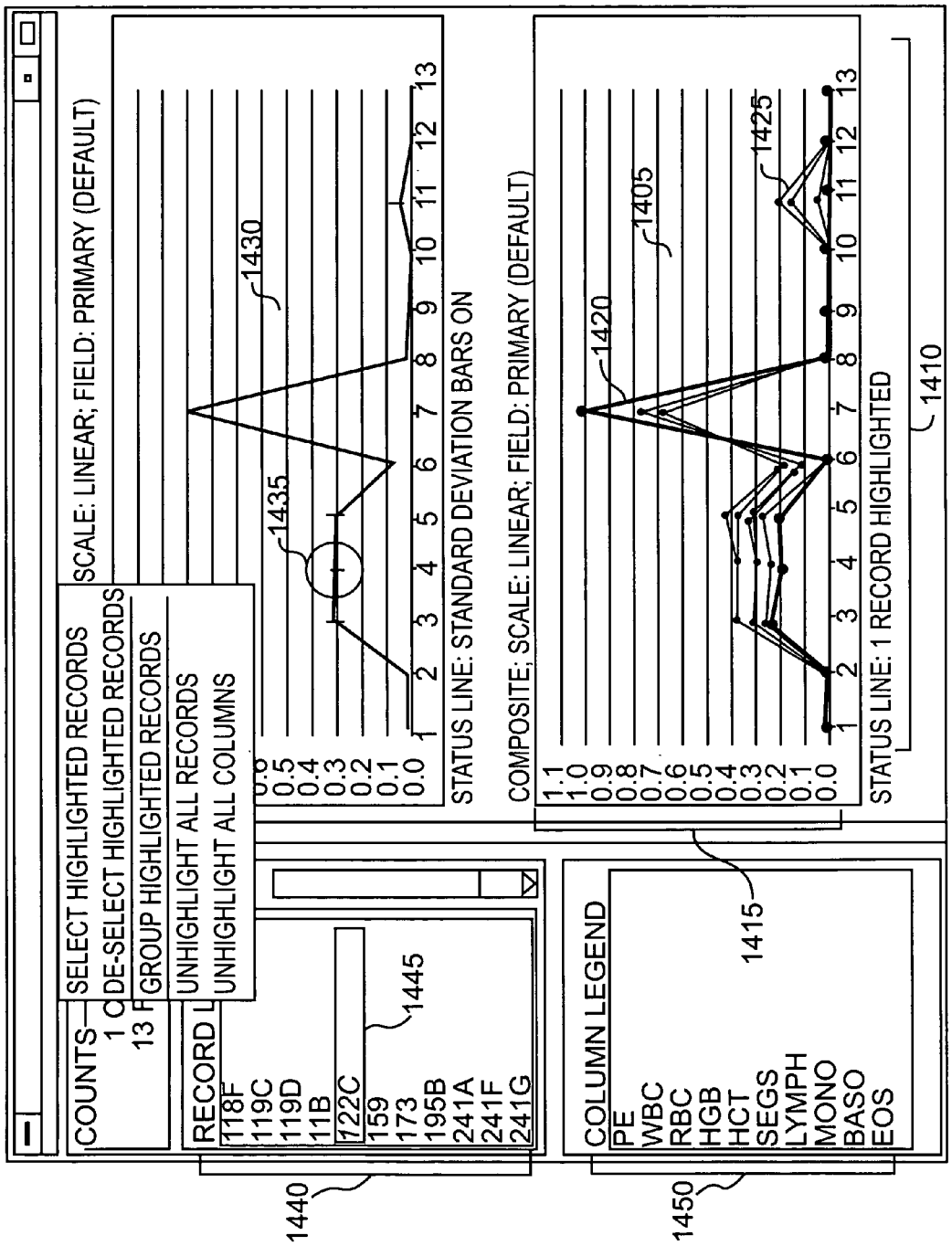
FIG. 14 is a representative user interface screen showing 2-D line charts consistent with the invention.

Next, a two-dimensional line chart is generated to visually depict the records and their associated attributes (stage 1315). FIG. 14 represents an implementation of two-dimensional charts that are consistent with the invention. FIG. 14 contains line chart 1405, and legends 1440 and 1450.

Figure 15:
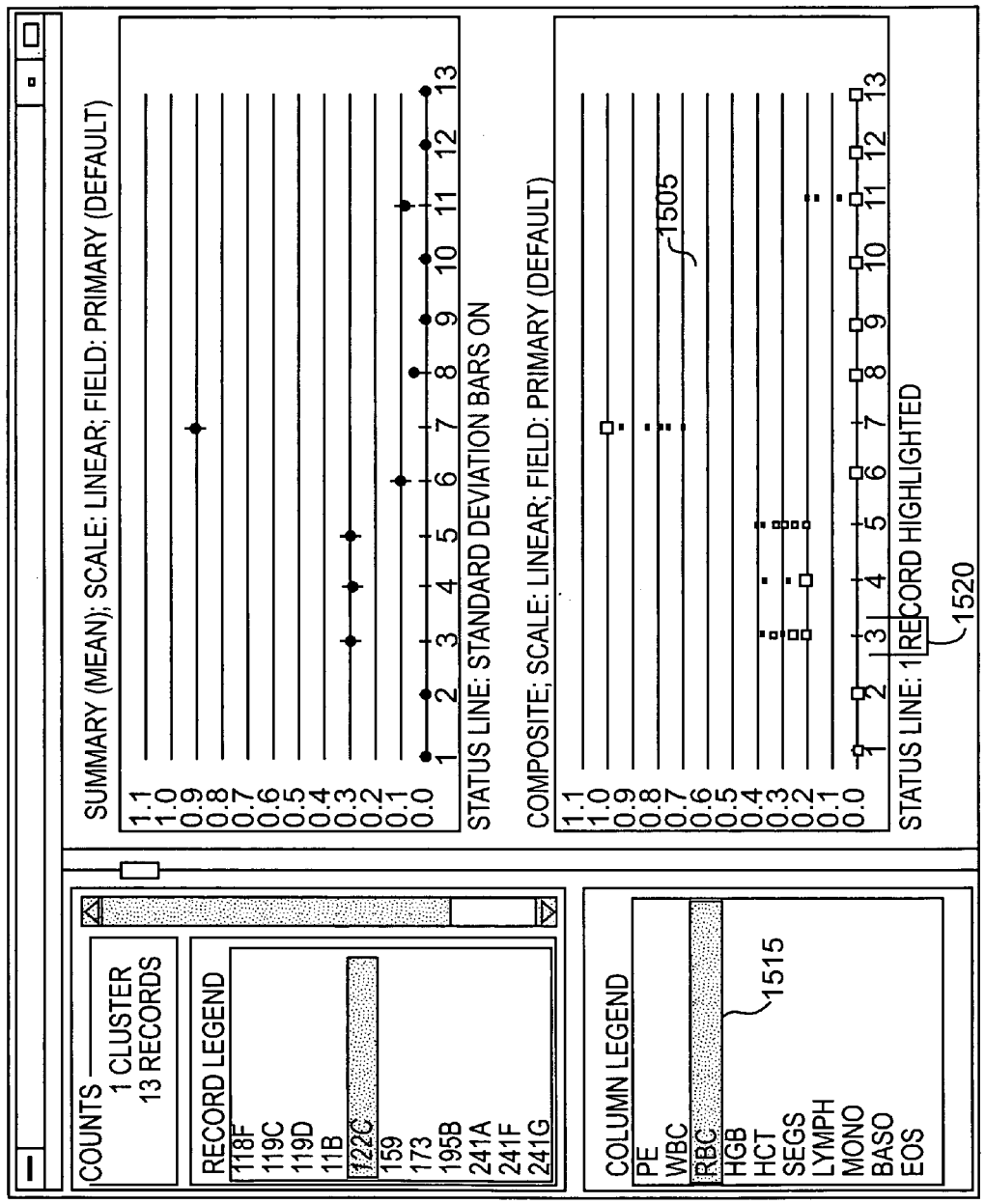
FIG. 15 is another representative user interface screen showing 2-D point charts consistent with the invention.

Chart 1405 contains a collection of superimposed line charts that depict a set of records. For example, line chart 1420 depicts one record within the set, while line chart 1425 depicts another. In the line charts, the x-axis (e.g., as shown by 1410) represents attributes associated with the records, and the y-axis (e.g., as shown by 1415) represents the value of each attribute. The scale of each axis and the colors of the line charts may be modified by the user. Although this description focuses on line charts, other types of charts may be used to depict a set of records, as shown for example by the point chart shown as 1505 in FIG. 15. Legend 1440 contains a text-based description of records. For example, legend 1440 contains a record described as "122C", as shown by 1445. Legend 1450 contains a text-based description of attributes.

Methods consistent with the invention can also generate a two-dimensional line chart that shows relationships between the records shown in 1405 (stage 1320). For example, FIG. 14 shows a line chart 1430 that depicts a statistical value corresponding to the set of records shown in 1405. In the example shown in FIG. 14, chart 1430 depicts the average attribute value for each record shown in 1405. In alternative implementations, however, chart 1430 may depict other relevant characterizations of the set of records, such as median attribute values, standard deviations (as shown by 1435), etc.

In addition to viewing the information in graphical form, the user can interact with the line charts. The invention is capable of receiving input from a user selecting a portion of a chart (stage 1325). This may be achieved, for example, by using a device to point to a portion of map 1405 or by clicking a pointing device on a portion of map 1405. In response to this user input, the text-based description of the selected record and/or attribute is highlighted in legends 1440 and 1450 (stage 1330). In the example shown in FIG. 14, the user has selected record "122C", as shown by the highlighting in legend 1440. Similarly, the value of a particular attribute being pointed to in charts 1405 or 1430 can be displayed in text format. In the example shown in FIG. 15, the user has selected attribute "RBC", as shown by the highlighting 1515 in the legend and 1520 on the x-axis.

Figure 16:
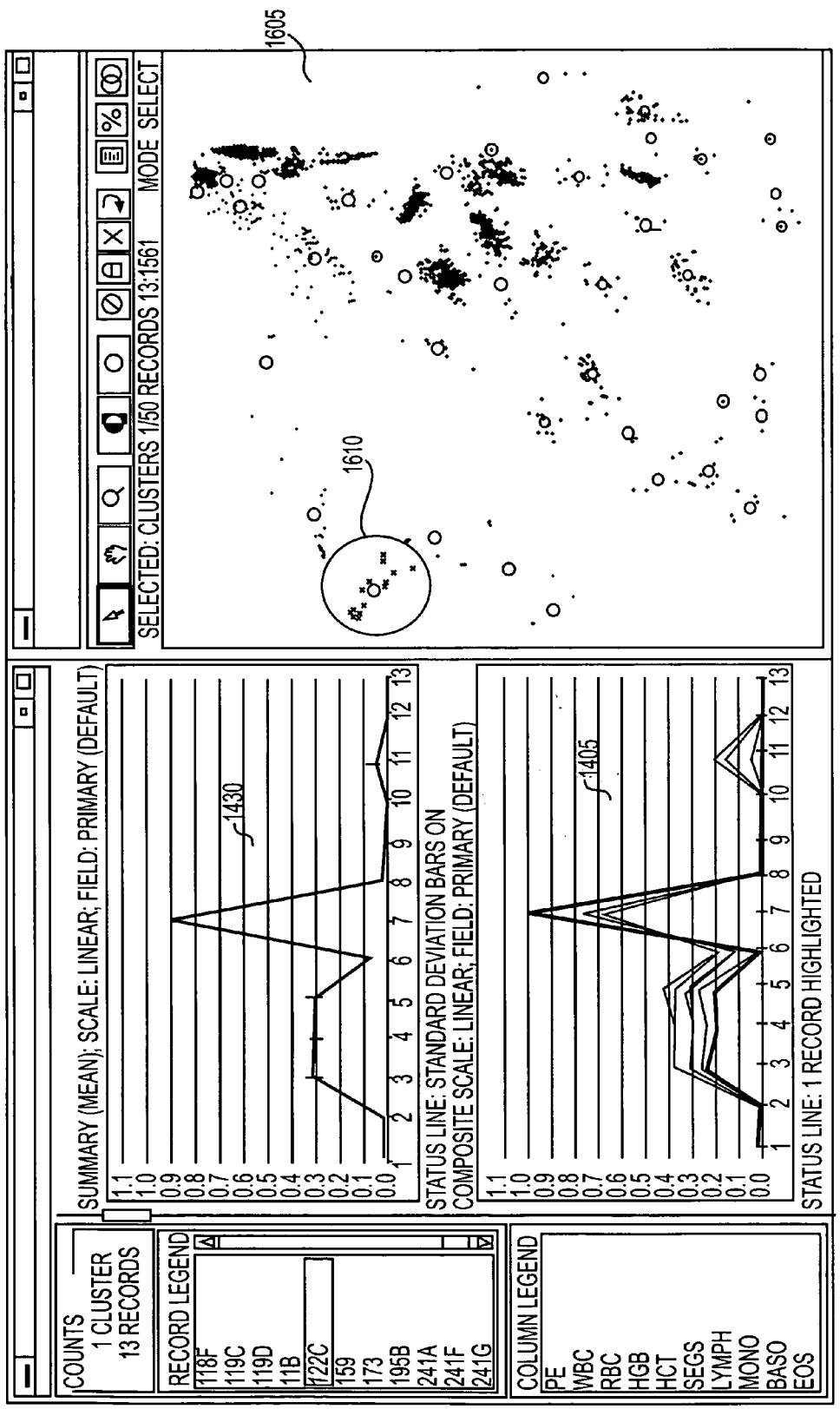
FIG. 16 is another representative user interface screen showing 2-D line charts linked to a galaxy view consistent with the invention.

Furthermore, any selections made by the user on charts 1405 or 1430 are propagated to other views. For example, in response to receiving input from a user selecting a record on chart 1405, an index, as discussed above, is analyzed to determine if the record is shown in another view (stage 1335). If the record is shown in another display (stage 1340), the visual representation of that record in the other view is altered (stage 1345). FIG. 16 is a diagram showing both (1) charts 1405 and 1430, and (2) a galaxy view 1605 of records. If a record is selected on map 1405, the record is highlighted in galaxy view 1605, and vice versa. Similarly, the group of records shown on map 1405 may be highlighted in galaxy view 1605 (as shown by 1610), and vice versa.

Figure 17:
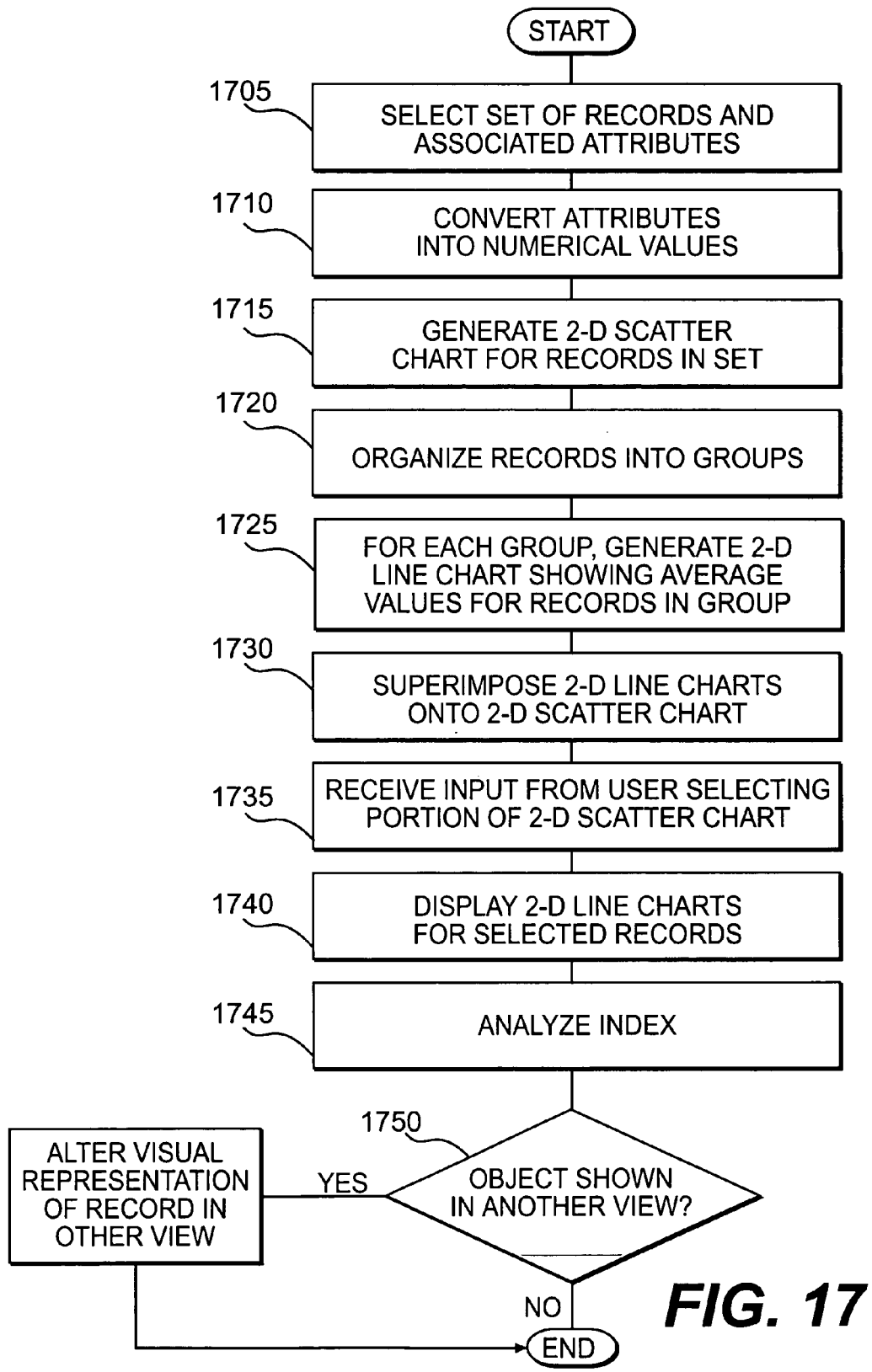
FIG. 17 a flow diagram of a method consistent with the invention for displaying information interactively by using summary miniplots.

FIG. 17 describes another method of displaying information interactively, in the form of summary miniplots. The method begins with the user selecting a set of records and a set of attributes associated with those records (stage 1705). The attributes may comprise any of numerous data types, including the following: numeric, text, sequence (e.g., protein or DNA sequences), or categoric. The selected attributes are converted into numerical values, as discussed above (stage 1710).

Next, a two-dimensional scatter chart is generated to visually depict the records (stage 1715). An example of such a chart is galaxy view 1805 shown in FIG. 18. Galaxy view 1805 contains a collection of records, one example of which is shown as 1810. The records within galaxy view 1805 are organized into groups (or clusters) (stage 1720), based on relationships between one record and another.

For each group shown in galaxy view 1805, a two-dimensional line chart (summary miniplot) is generated that depicts some information about the records contained within that group (stage 1725). Each such summary miniplot is superimposed onto the two-dimensional scatter chart, based on the location of the group of records on the scatter chart (stage 1730). For example, chart 1805 contains a group of records 1815, for which summary miniplot 1820 represents the average attribute values. In the example shown, summary miniplot 1820 is superimposed at the centroid coordinate for the records in group 1815.

In alternate implementations, summary miniplots may be used to represent other groupings of record. For example, the records shown in a scatter chart may be grouped into quadrants of the scatter chart; and four summary miniplots could be used to represent the quadrants. Furthermore, each line charts, such as line chart 1820, can also be coded in a variety of ways (e.g., size, color, thickness of lines, etc.) to represent additional information (e.g., the variability within the group's records, the value of an unrelated field, etc.).

Figure 18:
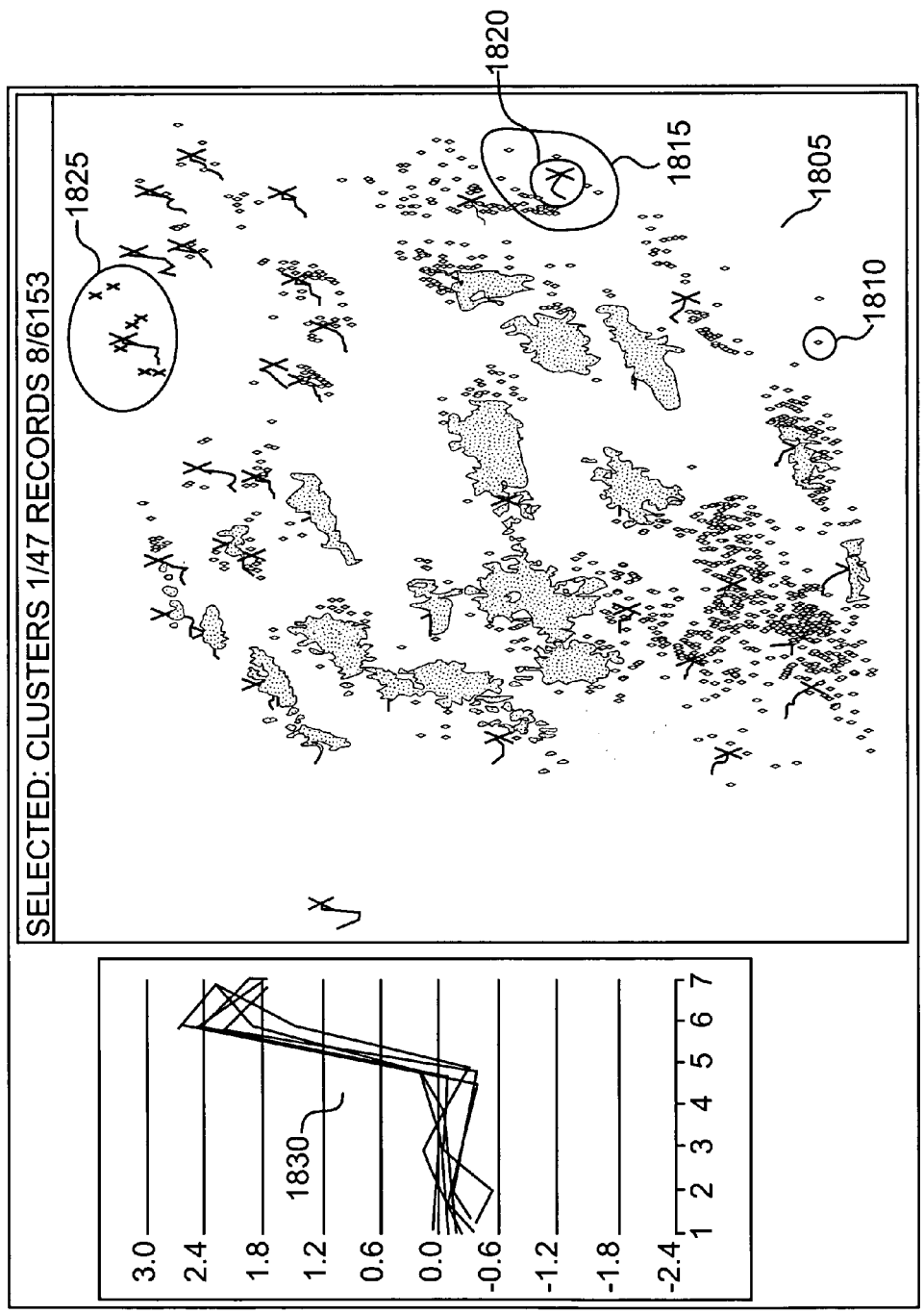
FIG. 18 is a representative user interface screen showing the use of summary miniplots in a galaxy view.

In addition to viewing the information in graphical form, the user can interact with the summary miniplots. The invention is capable of receiving input from a user selecting a summary miniplot (stage 1735). This may be achieved, for example, by using a device to point to a portion of map 1805 or by clicking 1a pointing device on a portion of map 1105. In FIG. 18, the user input constitutes selecting group 1825, as shown by the fact that group 1825 is highlighted. In response to this user input, a graph is generated that contains a series of superimposed line charts, with each line chart representing a record (stage 1740). An example of such a graph is shown in FIG. 18 as 1830, which is a series of superimposed line charts that represent attribute values for the records selected by the user in group 1825.

Furthermore, any selections made by the user of a summary miniplot on chart 1805 is propagated to other views. For example, in response to receiving input from a user selecting summary miniplot 1820, an index, as discussed above, is analyzed to determine if the records represented by summary miniplot 1820 are shown in another view (stage 1745). If the records are shown in another display (stage 1750), the visual representation of the records in the other view are altered (stage 1755). Similarly, if a user selects a record in another view, the summary miniplot corresponding to that record can be highlighted.

The preceding visualizations provide the opportunity to query records by attributes represented, e.g., by categorical and numerical values and by sequence of text content. Because the visualizations support a limited number of queries, the visualizations cannot analyze large associations efficiently. A multiple query tool creates a visualization that provides an overview of a large number of comparisons automatically, presenting the user with information, e.g., about associations and their expectation. Further, the multiple query tool also provides information about associations between clusters and attributes as well as associations between sets of attributes.

Figure 19:
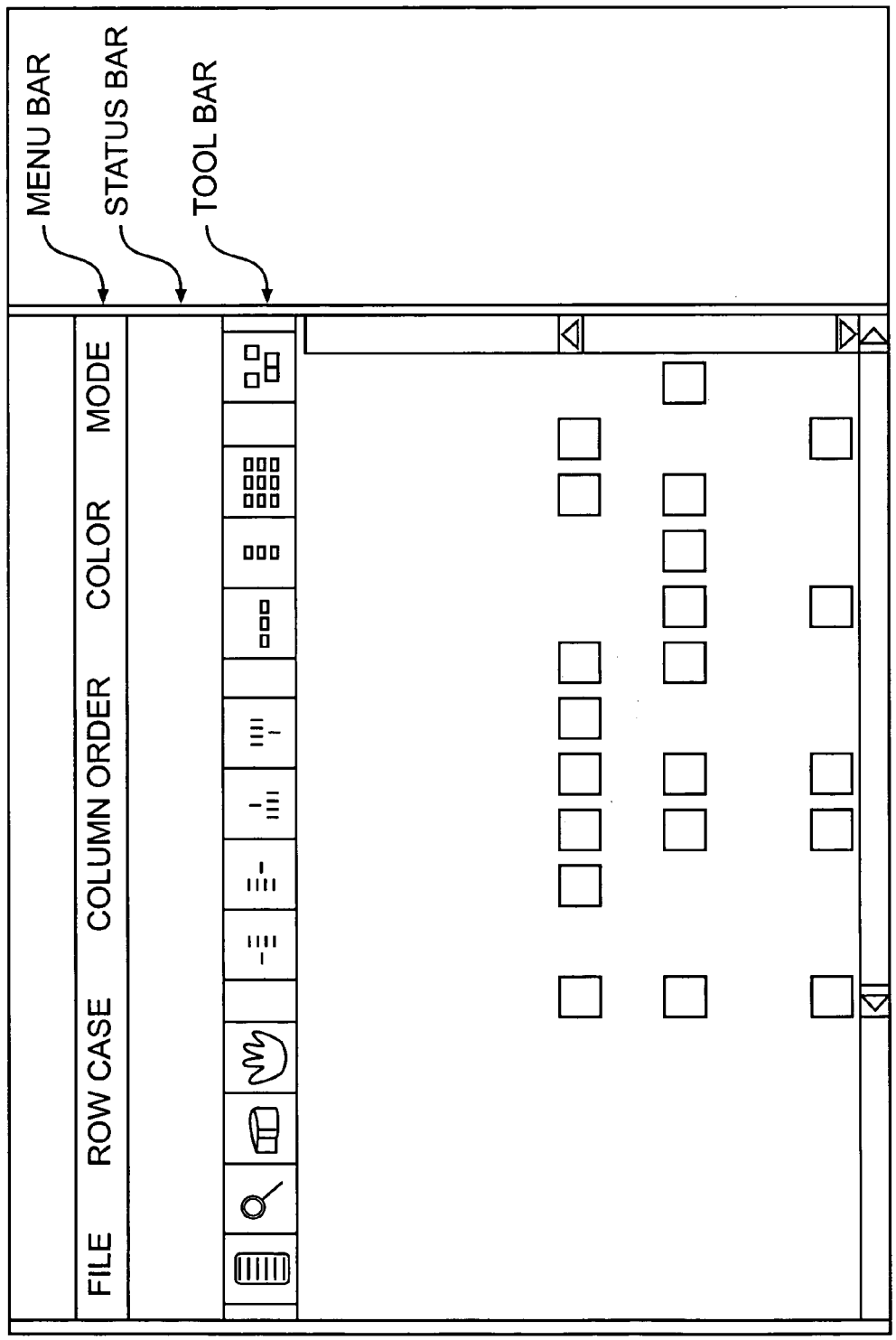
FIG. 19 provides an illustration of a multiple query tool visualization according to the present invention.

FIG. 19 provides an illustration of a multiple query tool visualization according to the present invention. The multiple query tool produces a visualization in the form of an interactive matrix that displays the requested associations and permits access to the underlying information. For example, the multiple query tool can provide links back to other open visualizations and tools, or stand alone as a separate visualization.

Figure 20:
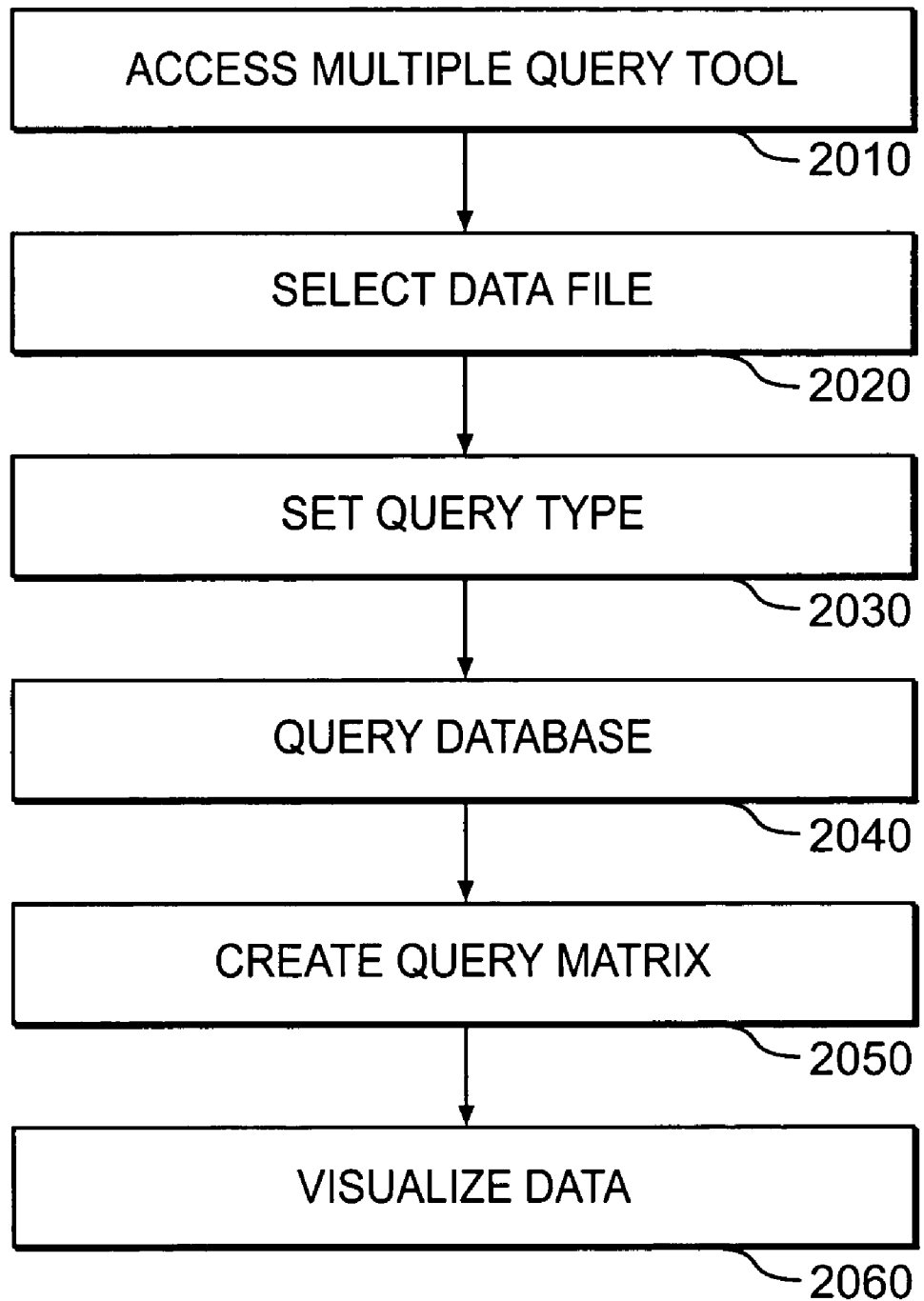
FIG. 20 illustrates a process of creating a visualization using the multiple query tool.

FIG. 20 illustrates a process of creating a visualization using the multiple query tool. As shown in step 2010, the user accesses the multiple query in any common manner of a graphical user interface, for example, a tool bar button, a previous visualization menu, a pop-up box, or a main menu.

Visualization of data begins with the selection of a data file. As shown in step 2020, a user selects a data file of interest. Alternatively, the data file can be preselected, when, e.g., the multiple query visualization is linked to another visualization analysis.

Figure 21:
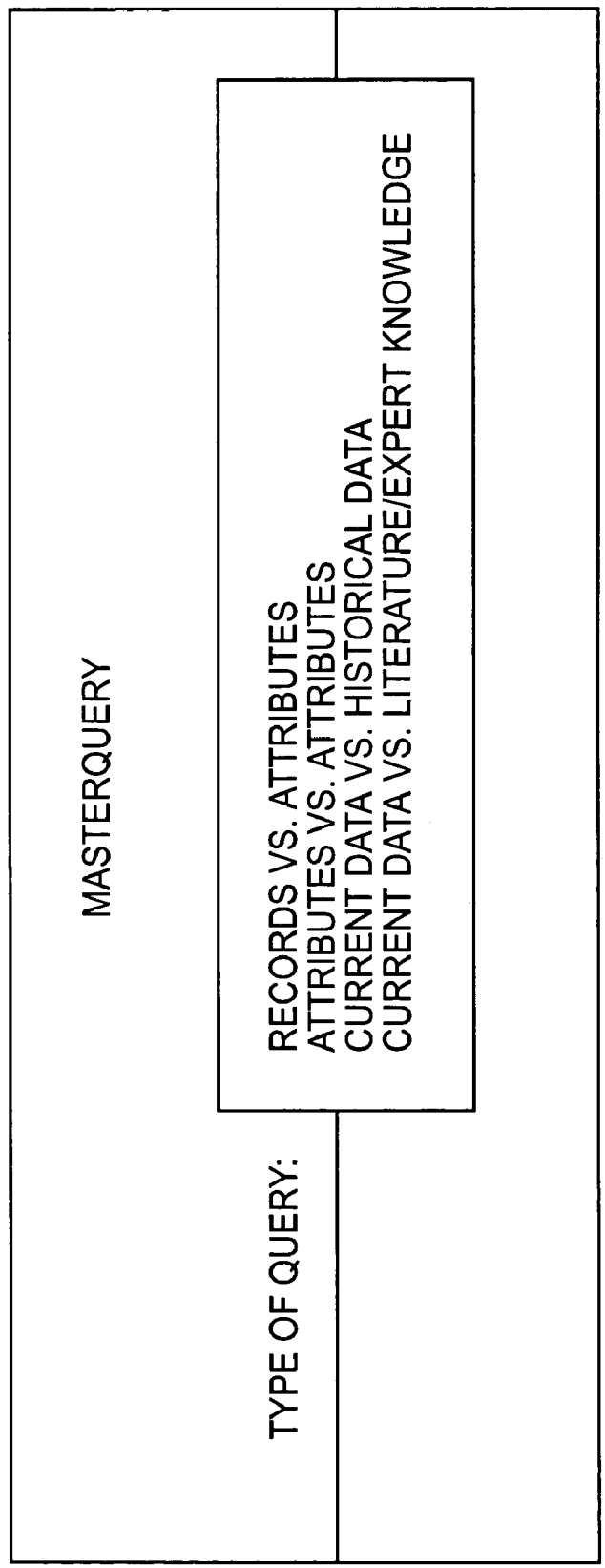
FIG. 21 illustrates a dialog box to set the type of query.

After a data set is selected, as shown in step 2030, the user sets the type of query. As shown in FIG. 21, a dialog box can be displayed to the user with a drop-down menu of query types. While FIG. 21 shows a selection between query types records vs. attributes, attributes vs. attributes, current data vs. historical data, and current data vs. expert data, other query types are within the scope of the invention. Once selected, the drop-down menu is rolled up to display only the selected query.

Figure 22A:
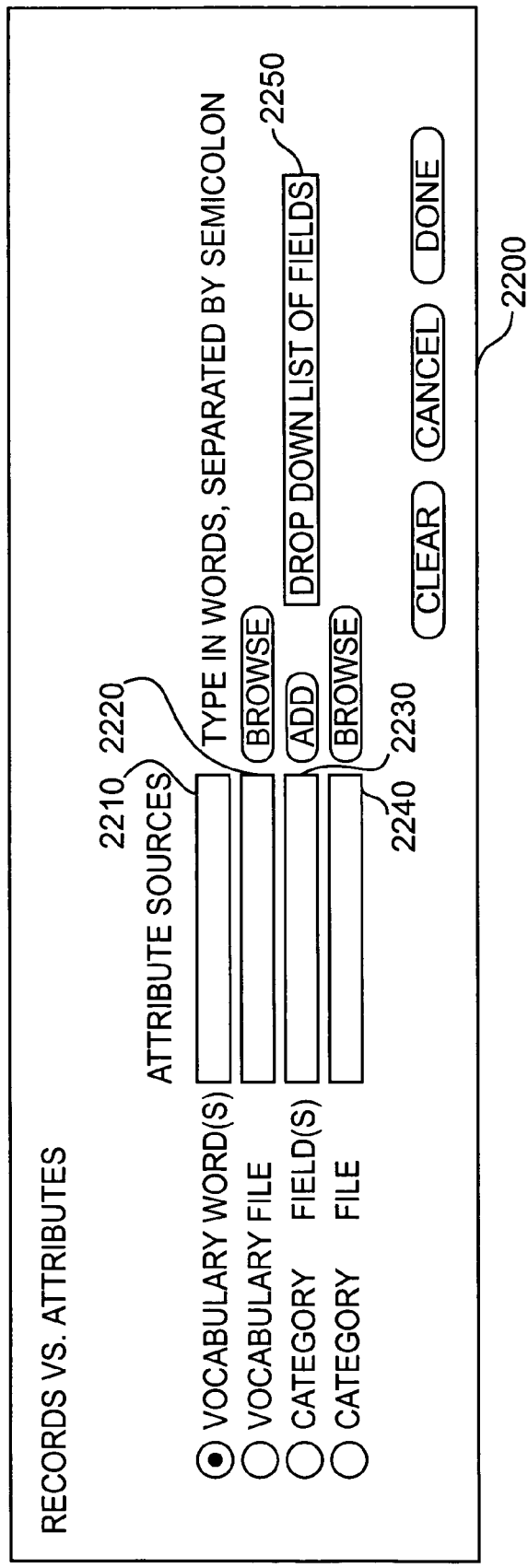

Upon selection of a query type, a dialog box specific to the query type is displayed so that the user can set the parameters of the query. FIGS. 22A–4C display exemplary parameter-setting dialog boxes for query types shown in FIG. 21.

For example, FIG. 22A, a record vs. attributes query dialog box 2200 is displayed. In this query, records are correlated to selected attributes. In one of its aspects, the records can be viewed as clusters of the records, for example, as clusters such as those defined in the galaxy view of a previous visualization or those defined using any other process. FIG. 22A displays four attribute sources, although other sources could be displayed.

In attribute source area 2210, labeled 'Vocabulary Word(s),' of dialog box 2200, the user types in the word or words that serve as attributes. For multiple words, a delimiter, such as a semicolon, could be used to separate entries. Other processing could also intelligently separate the words. Also, logical operators, such as Boolean AND, OR, NOT, could be included to produce a single composite attribute.

Also, the user can identify attribute words by pointing to a text file that contains a list of words. The user can identify the text file in attribute source area 2220, labeled 'Vocabulary File.' One format for this list would be a single keyword per line or a single phrase per line. With the text file, synonyms can also be identified. Vocabulary files including synonyms may have the following formats in one aspect of the present invention:

Format 1

Keyword1: alt_word1A; alt_word1B
Keyword2:
Keyword3: alt_word3A

Format 2

Keyword1
-alt_word1A
-alt_word1B
Keyword2
Keyword3
-alt_word3A

The processing of the identified text file will operate on files of the format(s) of existing user files, so as to avoid issues of file format conversion.

FIG. 22A also illustrates attribute source areas 2230 and 2240 for categorical values. In attribute source area 2230, labeled 'Category Field(s),' the user types in the category or categories that serve as attributes. For multiple categories, a delimiter, such as a semicolon, could be used to separate entries. Other processing could also intelligently separate the categories. Also, logical operators, such as Boolean AND, OR, NOT, could be included to act on categories to produce a single composite attribute. 2250 illustrates an area to access selectable menu of categories in the database, in the format of, e.g., a drop-down box. To develop the menu, each record in the database is parsed to identify all possible categorical values.

In attribute source area 2240, labeled 'Category File,' the user can identify attribute categories by pointing to a text file that contains a list of categories. Selecting categories from a file enables to the user to specify easily the order in which the categorical values would be displayed in the visualization and to allow the user to specify a hierarchy for those values. One format for the categorical value file is:

| | | |
|---|---|---|
| categorical_value_1 | 1 | (tab delimited lines with value indicating hierarchy level) |
| categorical_value_1.1 | 2 | |
| categorical_value_2 | 1 | |
| categorical_value_2.1 | 2 | |
| categorical_value_2.2 | 2 | |
| categorical_value_2.2.1 | 3 | |

Further, to collapse the number of attribute columns, the categories could be combined, similarly to the use of synonyms, or, for hierarchical categorical data, the user could select a maximum hierarchical level. As shown in step 2040 of FIG. 20, after the user selects the attributes, the database is queried using the multiple query. In step 2050, the results of the multiple query are used to create a query matrix.

For example, as shown in FIG. 23, from the attribute words or categories, the multiple query tool creates a query matrix of record rows and attribute columns. The cells of the matrix are set to binary values indicating the presence or absence of the attribute in each record. When a vocabulary file with synonyms is used, a single matrix cell should be created for each keyword, and the cell is marked if either the keyword or any of the alternate forms are found. One method of determining the presence of attribute would be to search the original data file or any indexed files describing the distribution of words or categorical values within the data set.

Figures 24, 25:
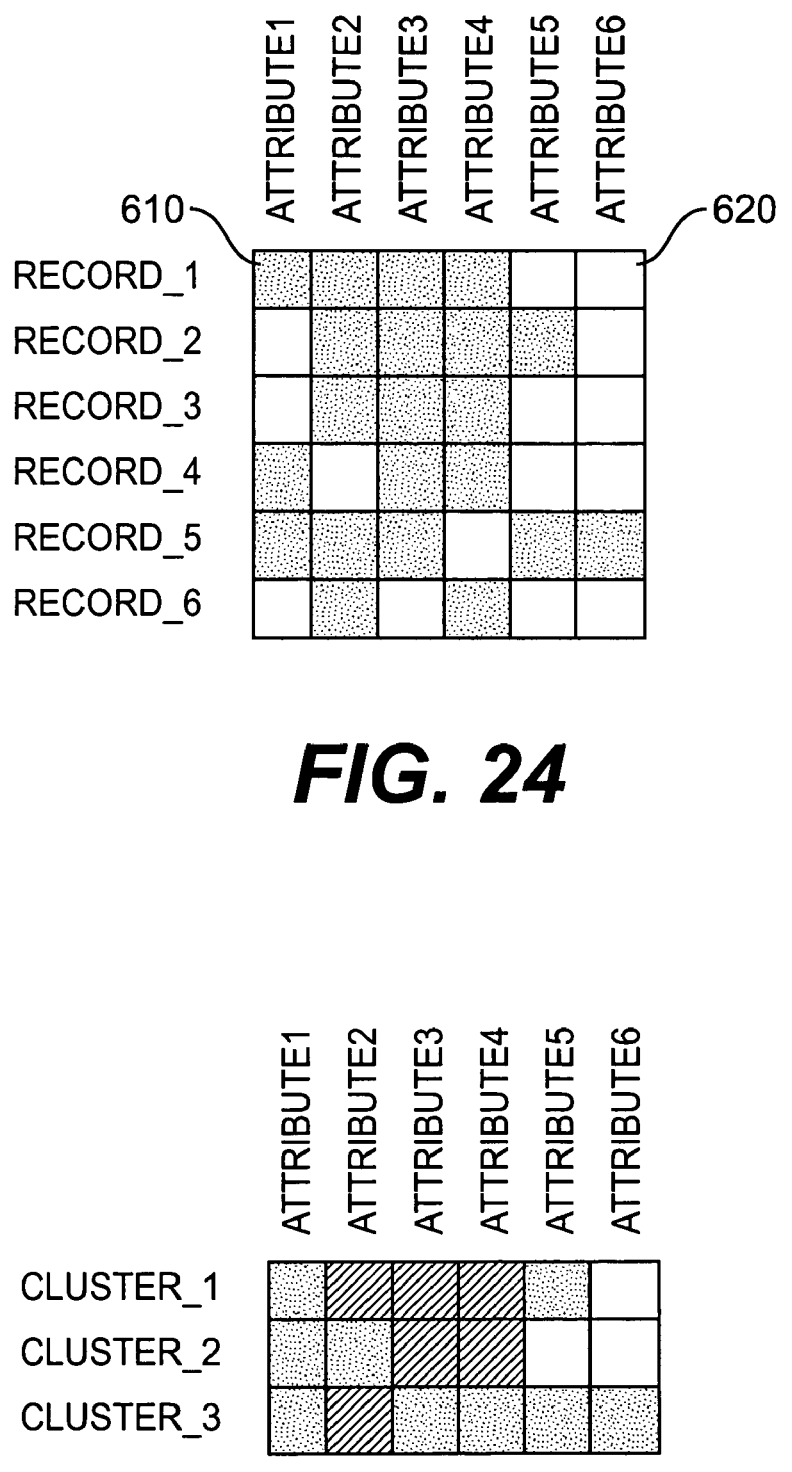

Following creation of the query matrix, the query matrix is visualized, in step 2060. One visualization is a binary, co-occurrence scheme, as shown in FIG. 24, where cells having a value of "1" are marked in a color or shade, 2410, while cells having a value of "0" are marked in a different color or shade, 2420. The user can select a size of cells, so that more cells or less cells are shown in a display of the visualization.

To minimize the display, the user can select a visualization based on cluster rows. When large numbers of records are to be analyzed, the cluster row visualization could be set as the default.

In this case, as shown in FIG. 25, the cells of the visualization matrix are set to indicate the presence or absence of the attribute in each record. To set the cell values, the query matrix is created or processed to create a composite value for a cell, for example, a basic scheme would involve summing the binary co-occurrence scores for a cluster and dividing by the number of records in the cluster.

Figure 26:
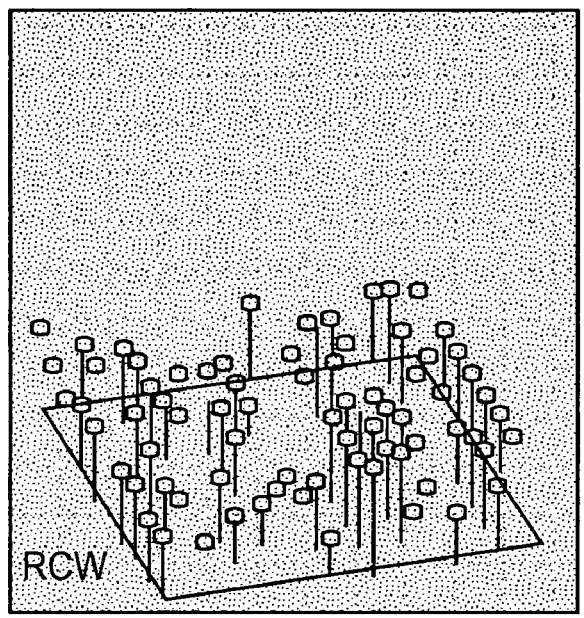
FIG. 26 illustrates a visualization as a three-dimensional view.
Figure 27:
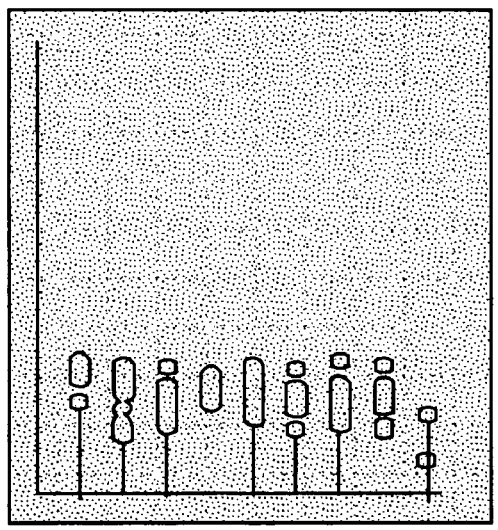
FIG. 27 illustrates a two-dimensional scatter plot of rows vs. values.

When the matrix using cluster rows is visualized in step 2060, cells are colored or shaded to indicate their composite values. FIG. 25 shows a binary co-occurrence shading scheme that illustrates the query matrix of FIG. 23, if records 1 and 2, 3 and 4, and 5 and 6 are assumed to be in clusters 1, 2, and 3, respectively. To enhance the interactive nature of the visualization, as shown in FIG. 26, an overall visualization can be displayed as a three-dimensional view of the rows vs. columns vs. values, with the value of each cell represented by a cube at an appropriate height on the Z-axis. The overall visualization is rotatable, so that the user can view 2-D scatter plots corresponding to the rows and columns. A 2-D row scatter plot is shown in FIG. 27.

Another more complex visualization, however, serves as the default when cluster rows are used. In this alternative visualization of cluster rows, the cells show association probabilities. The scheme of showing association probabilities would be to represent deviations as a difference from an expected value under a random distribution assumption. To calculate expected values, the total number of records containing each attribute, or the sum of the columns of the query matrix, is computed. Lower than expected values could be, for example, cool colors (blue (=−1) to green) and higher than expected will be hot colors (inverted black body with red=1). Deviations from an expected value under a random distribution assumption could also be represented as a ratio. Also, the probability of observing a number of attributes in a cluster of this size given this many total number of attributes are randomly distributed over all the clusters could also be represented. In this case, the values will range from 0 to 1 and the color display would have blue=0, white=0.5, and red=1; for example. To highlight extreme behaviors, the scale could be non-linear so that only the very high and very low probabilities are highlighted.

To compute association probabilities either an exact or approximate method is used for each of the association methods of the present invention. The exact method is precise at the cost of being computationally intensive. The approximate method can reduce the number of computations when the total number of objects and total number of occurrences of the attributes are relatively large. Further, the use of the laws of logarithms to reduce products and quotients to sums and differences, respectively, and exponentiation to a product will also save computing time.

The probability of observing what is observed given a random distribution indicates the possibility of observing certain number of occurrences of an attribute in a given cluster if the attribute is randomly distributed over all clusters. The lower the probability, the further the attribute distribution deviates from randomness. Described below are the exact method and approximate method for calculating this probability.

Equation 1 provides the exact method. Equation 1 is the discrete density function for a random variable having a hypergeometric distribution. The numerator consists of the product of two terms. The first term calculates how many ways to choose exactly m attributes out of M possible for the cluster of interest; the second term calculates the ways to assign the other (n−m) attributes which are not in the cluster of interest to the other clusters collectively. The denominator calculates the total number of ways to assign N objects to a cluster of size n.

$$p = \frac{\binom{M}{m}\binom{N-M}{n-m}}{\binom{N}{n}}$$ Equation 1

$$\binom{N}{n} = \frac{N!}{n!(N-n)!};$$

combination number of $n$ out of $N$.

Equation 2 provides the approximate method. Equation 2 is the discrete density function for a random variable having a binomial distribution, where the probability of a success is M/N and the probability of failure is (1−M/N). When N and M are large, (N−n)/(N−1) is close to one; thus, Equation 2 provides a reasonably good approximation to the hypergeometric distribution. N, M, n, and m denote the same quantities as defined above in Equation 1.

$$p = \binom{n}{m}\left(\frac{M}{N}\right)^m \left(1 - \frac{M}{N}\right)^{n-m}$$ Equation 2

Alternatively, the association probability can be represented as a measure of an unusual number of occurrences, which is a deviation of observed occurrence from the expected occurrence if the attribute is randomly distributed over all clusters. An exact method (Equation 3) or an approximate method (Equation 4) can be used. N, M, n, and m denote the same quantities in Equation 1. Note that the expectation is the sum over the range of the random variable of x of x multiplies p(x). Equation 3 uses hypergeometric distribution and Equation 4 uses a binomial method, similar to Equations 1 and 2, respectively. The exact method is very computationally expensive due to the summation, while summation in the approximate method can be calculated through and written into the simple form of Equation 4.

$$E = \sum_{k=1}^{n} K \frac{\binom{M}{k}\binom{N-M}{n-k}}{\binom{N}{n}}$$ Equation 3

$$E = n\frac{M}{N} \quad \text{Equation 4}$$

The deviation from expected occurrence can be measured using ether ratio or difference of the observed number of occurrences over (or from) the expected number of occurrences. The range of the ratio is between zero and infinity. A ratio value further away from 1 indicates a larger deviation from randomness.

$$Dev = \frac{m}{E} \quad \text{Equation 5}$$

Alternatively to make the deviation more comparable for various sizes of clusters, the difference between observed and expected occurrences is divided by the size of the cluster (Equation 6). Therefore, the range of this deviation measure is normalized between −1 and 1. A value further away from zero indicates a larger deviation from randomness.

$$Dev = \frac{m - E}{n} \quad \text{Equation 6}$$

While the order of attributes along the columns and the order of rows or clusters along the columns of the matrix can be selected by the user, using a menu item or by dragging rows and columns to new positions. For example, the order of the records or the order of the clusters is automatically set to same correlation order as known to those skilled in the art. The default display for attributes is based on correlation order, with the attribute having the highest column sum being on the left-hand side.

Thus, visualizations for the record vs. attributes query type is explained. The processing involved in creating the query matrix and visualization for the remaining query types is similar to the process of records vs. attributes query type.

If the user selects an attribute vs. attributes query type in step 230, as shown in FIG. 22B, an attributes vs. attributes query dialog box 2260 is displayed. The attributes vs. attributes query type is not interested in occurrences with specific records, only in defining the associations among attributes.

Query dialog box 2260 operates similarly to records vs. attribute query dialog box 2200, except that the user will be specifying two sets of attributes (vocabulary words or categories).

When querying the database in step 2040 and creating the query matrix in step 2050, the matrix cell scores are generated as a cumulative measure of the number of records that contain both test attributes. Then, the score should be normalized against the number of records. In other words, for n records, i row attributes, and j column attributes:

```
for row_attribute = 1 to i
   for column_attribute = 1 to j
      score(i,j)=0
      for record=1 to n
         if record contains both row_attribute(i) and column_attribute
            (j), then score(i,j)=score(i,j)+1
      next record
      norm_score(i,j)=score(i,j)/n
   next column_attribute
next row_attribute
```

Also, the total number of records that have each attribute is counted so that deviation from expected frequency can be calculated.

In step 2060, the attribute vs. attribute visualization follows the same mechanics as for records vs. attributes, but with a few differences. Specifically, in the default view for the attributes vs. attributes visualization, the default order for both axes would be the correlation order, with the column with the highest total score (e.g., the highest average value) on the top of left, and the default mode for showing associations uses deviation from expectation using with lower than expected values shown as cool colors (blue (=−1) to green) and higher than expected shown as hot colors (inverted black body with red=1).

Another use of the multiple query tool visualization is rapid assessment of the correlation between the current experiment being analyzed and historical data. Such a visualization points to the similarities or differences for all equivalent data points (record and condition).

Figure 22C:
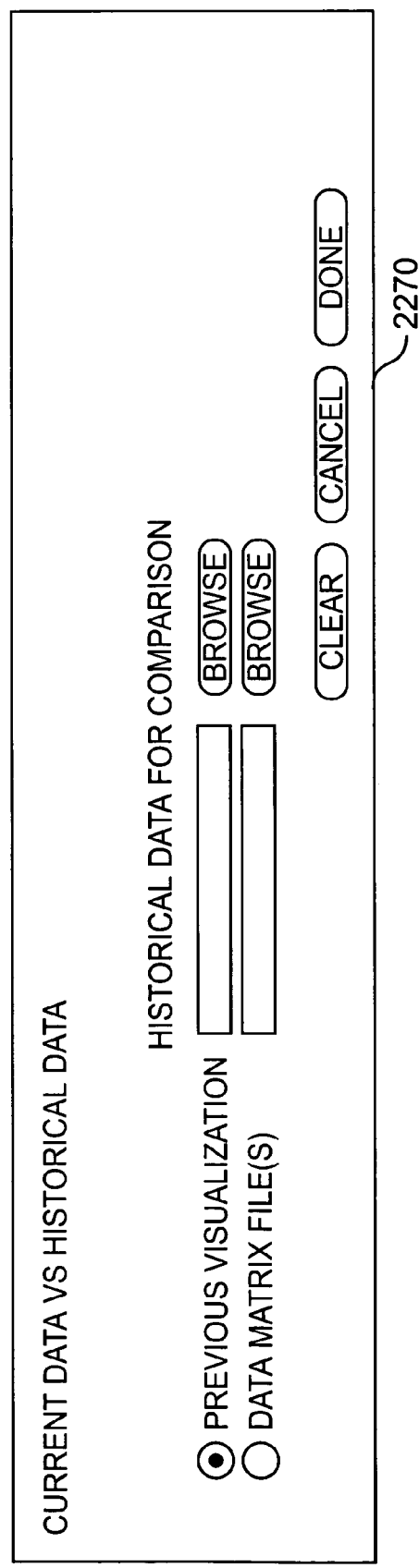

As shown in FIG. 22C, a current data vs. historical data query dialog box 2270 is displayed when the user selects such a visualization. A file containing a data matrix is used as the historical data. In other words, the user would select the files of a prior visualization. Alternatively, a data matrix, similar to those currently used to input data into the numerical engine, could be designated.

In step 2040, the method determines where the current and historical experiments overlap. For example, if the current experiment contains records 1 through 10 and the historical experiment contains records 1 through 5 and records 8 through 12, then correlations would only be performed with the common records 1 to 5 and 8 to 10. Similarly, if the current experiment used conditions (components) A through E (e.g., 5 time points or distinct treatments) and the historical experiment used conditions A, C, D, and F, then the correlation would be calculated only using the common conditions A, C, and D.

In step 2050, a query data matrix would then be created comparing the ES common entries. For record1, a correlation with the historical data set would be performed using all the common conditions (intersection). In the example given, this would be a correlation between current_record1(A,C, D) and historical_record1(A,C,D). A similar score would be derived for each record present in both data sets. For a record in the current data set that is not present in the historical set, the query matrix would be blank (or set to some flag). The calculations would be repeated for each historical set requested.

In step 2060, the query matrix is visualized as follows. The color code in each cell is based on the correlation of that record to its counterpart in the historical data. The correlation values will range from −1 to +1 and be presented using, for example, a modified rainbow with negative correlations being cool colors (blue=−1) and positive correlations being hot colors (red=1). For records that are not shared with the historical data set, the matrix cell should have no color (or be colored the same as the background) or, alternatively, these cells can be hidden. If the cells not shared with the historical data set are shown, the degree of overlap between the current and the historical data sets can be visualized. This visualization could also be selected as a separate visualization that shows the overlap, for example by using a grayscale color code in the matrix, where black indicates full overlap with the historical data components and white indicates no overlap. This query type would also be useful with other data mining tools.

Instead of comparisons of the records of the current and historical data, cluster assignments from one experiment to the next, even when the experiment types are quite different, can be compared. For each record in a current data cluster, the method can assess what fraction of other current cluster records exist in the same cluster in the historical set. Then, an average of the results from each current cluster record to is computed to get a score for that cluster. Another example assesses, for each record in a current cluster, what fraction of other current cluster records are found in the historical data within x Euclidean distance. An interactive slider would allow the user to change x and the method would allow viewing of the results dynamically.

When records are combined into clusters, the overall value for the cluster will be represented as the average or other statistical measure, such as median of the record correlations, based only on those records that are common between the data sets. An indication of variation is provided since a cluster that contains 10 records with a correlation of 0.8 and a cluster that contains 10 records with a correlation of 0.9 and 1 with a correlation of −1 (both cluster with average of 0.8) may be of different interest to the user. Such an indication can be achieved using multiple visualizations, for example by duplicating the previous query, that simultaneously show the average and the standard deviation, the minimum value or the maximum value.

The default order of clusters and records in this visualization should be the same as in the records vs. attributes query tool. In addition, a row is added that summarizes the comparison of the entire current data against each historical data set. For example, a row labeled "Summary" will be the average of all record correlations.

Alternatively, the user or system could identify specific records to group together at the top of the visualization. For example, all the controls could be grouped together as opposed to in separate clusters. Also, while only one set each of current and historical data is used, several sets data could be visualized contemporaneously. That is, any one of the data sets is treated as the prototype against which others are measured. A slider bar having each visualization would allow the user to run through multiple experiments. The progress through the slider (data sets) could be semiautomated to play like a movie, stopping whenever certain similarities or dissimilarities are found.

The 'current data vs. literature/expert knowledge' query is similar to the other queries. Correlations between the current data and the literature or expert knowledge are defined either as what records have previously been found to group together or as similarity to actual published/historical values.

Regardless of the query type, the visualization, as shown in FIG. 19, will be displayed in an interactive area of a display screen, so that the user may adapt the visualization to her preferences.

Figure 28:
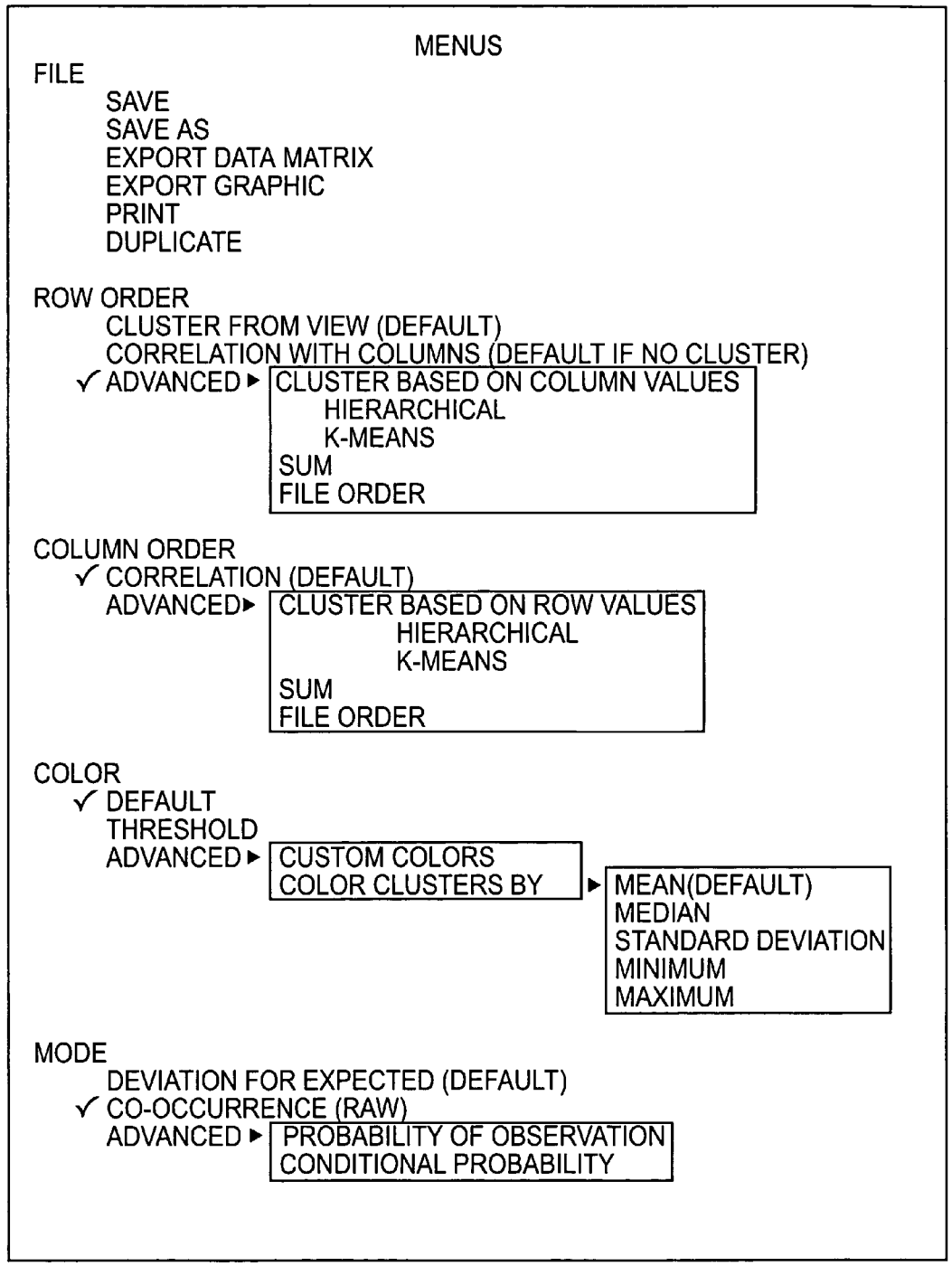
FIG. 28 illustrates the contents of a menu bar, with associated sub-menus, of the visualization of FIG. 19.

For example, to provide commands, the visualization could include a menu bar and a toolbar. A menu bar 1010, with associated sub-menus, of the visualization could include the features shown in FIG. 28.

The Duplicate command in the File menu of menu bar 2810 allows access to previously stored queries, so that the user can either re-run or adjust a previously run multiple query. The other commands in the File order are self-explanatory.

The Row Order menu of menu bar 2810 provides option for organizing the records, clusters, or row attributes. The Cluster from View command results in a correlation ordering for the records and clusters (if correlation ordering was not done for the view, then it is also not done here in the default), as discussed above this ordering is the default for a records vs. attributes query type or a current data vs. historical data query type. The Correlation with Columns command is an option for recalculating the cluster order based on the values in the query matrix. In a cluster view, records would remain with their cluster and the clusters are reordered according to correlation ordering. If a cluster was expanded to show records, the records in the cluster would be reordered according to correlation ordering. As discussed above, for an attributes vs. attributes query, correlation with columns is the default.

The Advanced sub-menu of the Row Order menu allows access to the following commands. The Cluster Based on Column Values command recalculates the clustering of the records or the attributes using the scores along the row as the vectors for clustering. The user would have the choice of using any clustering algorithm, such as either the hierarchical or partition methods. The Sum command is an option to order the records or attributes based on the sum of the scores across the row, with the record/attribute with the highest sum being at the top and the lowest being at the bottom, for example. Rows having a value below a predetermined threshold could be placed in a low value row or removed from the visualization matrix. The Sum command is not valid for visualization using clusters and would be deactivated. The File Order sets the order of clusters or attributes to that specified by the user, for example in an input file. If no file is provided or record rows are selected, this option would be deactivated.

The Column Order menu of menu bar 2810 provides analogous options as the Row Order menu for organizing the column attributes, expect that there will be no clustering from the view, as records and clusters do not appear in the columns, in one aspect of the present invention.

To provide the user the ability to choose a custom coloring scheme, the Color menu of menu bar 2810 permits a selection of display colors within the multiple query tool.

A tool bar is also provided in the visualization, either as a separate pop-up area or a bar, for example, located below a status bar, to provide access to functions with a single click. FIG. 29 illustrates examples of functions of a tool bar.

The RecordViewer function displays the currently highlighted record (or records in the highlighted cluster). For a record vs. attribute cell, this shows the single record with the specific attribute highlighted in the record. For a cluster vs. attribute cell, the RecordViewer shows all the records in that cluster with the specific attribute highlighted in the records. For an attribute vs. attribute cell, the RecordViewer would display all records that contain both attributes, with both attributes highlighted. To access the records, the RecordViewer calls a process that parses the data source file in the galaxy cluster view. An interpretation tool, such as the plot data tool, could also be provided. A double click on a cell can also call the RecordViewer function.

The Zoom function operates similarly to a zoom in the galaxy visualization. Primarily, the zoom will zoom out, so that an overview of a large multiple query tool can be obtained. The maximum zoom out should be based on the number of records and a user's desired minimum resolution, so that the colors of the visualization will be readily discernable. A possible default size for a cell in the multiple query tool is 12 by 12 pixels. This is large enough to display text labels at 10 point Helvetica for both rows and columns. Zooming out would provide an overview for large data sets. The Zoom Reset function returns the visualization to its default size.

The Pan function takes the form of a hand and allows the user to drag the graphic around the window, so that area hidden by display objects or the physical dimensions of a display screen can be viewed. Scroll bars, as shown in the multiple query tool above, could be employed instead of, or in addition to, the Pan tool. Nevertheless, labels for the rows and columns would always remain visible.

The Expand Row Clusters and Expand Column Clusters functions open the selected cluster(s) to display all their records or attributes as separate rows. If no clusters are selected, all clusters are expanded. If no clusters are defined (either from the associated view or by having done a cluster ordering within the multiple query tool), these functions are deactivated.

The Collapse Row Clusters and Collapse Column Clusters functions closes the cluster that contains the selected record(s) or attribute(s). If no record or attribute is selected, all clusters are collapsed. If no clusters are defined (either from the associated view or by having done a cluster ordering within the multiple query tool, these functions are deactivated. Although not illustrated in FIG. 29, a single button could also collapse all row and columns with a deviation from expectation between, e.g., −0.5 and +0.5 (or other definable range) into a single group or remove rows and columns that do not have values above a predetermined threshold.

The Orient Rows vs. Values and Orient Columns vs. Values functions orient the visualization so that the view is perpendicular to the row axis or column axis, respectively. This provides views of the 2-D scatterplot, as shown in FIG. 27, for example. The Reset Orientation function orients the visualization to the default 'overhead' view showing rows vs. columns.

Figure 30A:
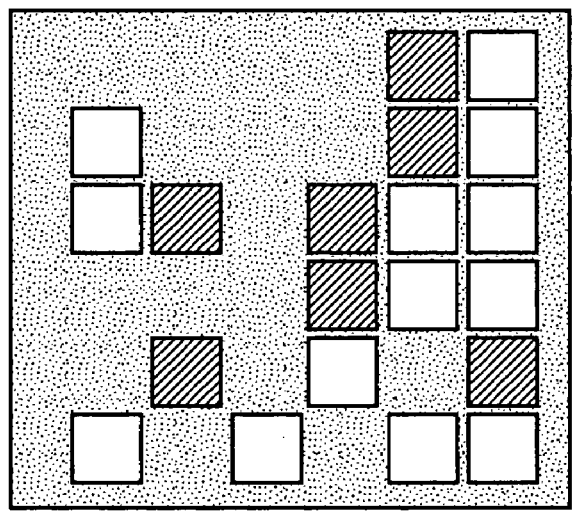
FIGS. 30A and 30B illustrates views of a visualization matrix having a grid and not having a grid, respectively.
Figure 30B:
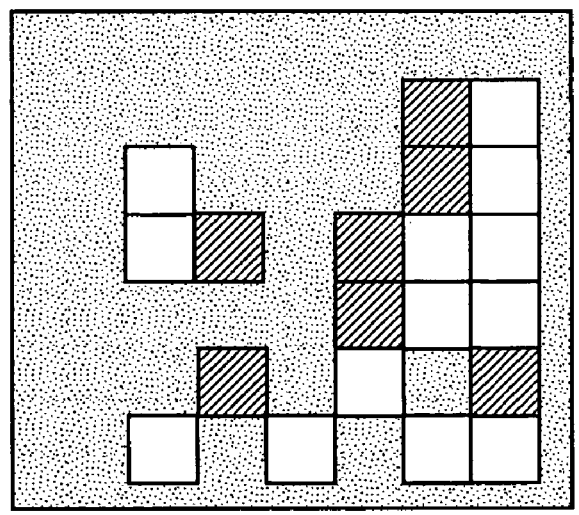

The Spacing Toggle function toggles the matrix between the two types of views shown in FIGS. 30A and 30B. Providing a grid as shown in FIG. 30A allows viewing of cells as discrete entities, for easier selection. Removing the grid, as shown in FIG. 12B, allows more information to be compressed into the same space and could improve enhance structure distinctions in the visualization matrix.

In addition to the command bars, the visualization area itself, as shown in FIG. 19, consists not only of the colored visualization matrix, but also includes labels for the rows and columns.

When the rows are records, the row labels are the record titles. Since record titles may be long, the initial substantially 20 characters could be displayed with a scroll bar or pop-up function to enable viewing of all of the characters. When collapsed into clusters, the row labels are labeled by cluster number. For attributes, the categorical value or vocabulary word itself serve as the label. In addition to the labels themselves, the rows and columns could have a master label indicating the content. For records as rows, the label would say "RECORDS." For vocabulary words input directly in the initial dialog box, the label would be "VOCABULARY". For vocabulary words input through a file, the label would be the file name. For categories as attributes, the field name would be shown. If multiple fields were requested, each field name would be shown, centered over its collection of row or column labels. The user could also edit or define the row, column, and major labels.

Rows and columns are selected and highlighted by clicking on the row and column labels using a mouse input device, for example. Shift-clicking and control-clicking can be used to select multiple labels.

The visualization is interactive. In addition to highlighting labels for selecting rows and columns, clicking on a cell should display key information regarding the cell. This pop-up information would be context sensitive, depending on the type of query and whether the cell represents an individual record or attribute as opposed to a cluster or group. The following provide suggested formats of the key attributes of a cell of the different groups and query types:

For a cell intersecting a record and attribute in a records vs. attributes query:
   Row: Record_name
   Column: Column_attribute_name
   Co-occurrence: 0 (or 1)
   Attribute found in ##/total_rows records For a cell intersecting a cluster and attribute in a records vs. attributes query:
   Row: Cluster# containing ## members
   Column: Column_attribute_name
   Co-occurrences: ##
   Number of co-occurrences expected: #
   Deviation from expected co-occurrence: ##
   Probability of observation: ##

For a cell intersecting an attribute and attribute in an attributes vs. attributes query:
   Row: Row_attribute_name
   Column: Column_attribute_name
   Co-occurrences: ##
   Row attribute found in ##/total_columns columns
   Column attribute found in ##/total_rows rows
   Number of co-occurrences expected: ##
   Deviation from expected co-occurrence: ##
   Probability of observation: ##

For the cell intersecting a record and historical data in a current data vs. historical data query:
   Probability of observation: #
   Row: Record_name
   Column: historical experiment_name
   Correlation: ## (if this record does not intersect with historical data, 'no intersection')

For the cell intersecting a cluster and historical data in a current data vs. historical data query:
   Probability of observation: ##
   Row: Record_name
   Column: historical experiment_name
   Average Correlation: ## (if this cluster does not contain any genes that intersect with historical data this should say 'no intersection')
   Maximum Correlation: # with record_name
   Minimum Correlation: ## with record_name
   Records that do not intersect historical data (could be a scrollable list):
   record_name1
   record_name5 . . .

CONCLUSION

Systems and methods consistent with the present invention employ an open architecture that enables different types of data to be used for analysis and visualization.

It will be understood by those skilled in the art that various changes and modifications may be made, and equivalents may be substituted for elements thereof without departing from the true scope of the invention.

Modifications may be made to adapt a particular element, technique, or implementation to the teachings of the present invention without departing from the spirit of the invention. For example, any genetic material, from organism to microbe, could be represented using the context vectors of the present invention. Further, the present invention is not limited to genetic material, and any material or energy could also be represented. Additionally, the rows and columns used in the description are illustrative only, and, for example, records could be placed along the columns. Also, the attributes used are not limited to text and categorical features. Numerical values could be set as attributes, for example using binning where adjacent ranges of numbers are defined. Additionally, for queries against individual records, categorical data could be presented in a single column rather than multiple columns for each categorical value as described above; in this case, the occurrence of a specific categorical value could be represented as a specific color. The resulting matrix could also be dynamically controllable by the user. The order of rows or columns could be adjusted by dragging or sorted according to the information within the row or column.

Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of memory.

Therefore, it is intended that this invention not be limited to the particular embodiment and method disclosed herein, but that the invention include all embodiments falling within the scope of the appended claims.

What is claimed is:

1. A computer-implemented method for simultaneous visualization of disparate data types, the method comprising:
   (1) selecting a set of attributes associated with an object, the attributes selected comprising a text data type and one other data type chosen from
      a biopolymer sequence data type,
      a numerical data type, and
      a categorical data type;
   (2) creating a high dimensional vector representing the object by applying transformation operations to the selected attributes; and
   (3) projecting the high dimensional vector thereby visualizing the object based on the attributes selected;
   wherein the transformation operations for the attributes of the text data type comprise:
      (a) semantically filtering a set of documents in a database to extract a set of semantic concepts, to improve an efficiency of a predictive relationship to its content, based on at least one of word frequency, overlap and topicality;
      (b) defining a topic set, said topic set being characterized as the set of semantic concepts which best discriminate the content of the documents containing them, said topic set being defined based on at least one of word frequency, overlap and topicality;
      (c) forming a matrix with the semantic concepts contained within the topic set defining one dimension of said matrix and the semantic concepts contained within the filtered set of documents comprising another dimension of said matrix;
      (d) calculating matrix entries as the conditional probability that a document in the database will contain each semantic concept in the topic set given that it contains each semantic concept in the filtered set of documents; and
      (e) providing said matrix entries from step (d) for creating the high dimensional vector.

2. A computer-implemented method for simultaneous visualization of disparate data types, the method comprising:
   (1) selecting a set of attributes associated with an object, the attributes selected comprising a biopolymer sequence data type and one other data type chosen from
      a text data type,
      a numerical data type, and
      a categorical data type;
   (2) creating a high dimensional vector representing the object by applying transformation operations to the selected attributes; and
   (3) projecting the high dimensional vector thereby visualizing the object based on the attributes selected;
   wherein the transformation operations for the attributes of the biopolymer sequence data type comprise:
      (i) comparing a sequence of each biopolymer material to a sequence of each other biopolymer material to provide respective comparison results;
      (ii) arranging the comparison results in a square matrix indexed by the plurality of biopolymer materials; and
      (iii) providing the square matrix entries for creating the high dimensional vector.

3. The computer-implemented method of claims 2, wherein the attributes selected in step (1) comprise a text data type and a biopolymer sequence data type.

4. The computer-implemented method of claims 2, wherein the transformation operations for the attributes of the text data type comprise:
   (a) semantically filtering a set of documents in a database to extract a set of semantic concepts, to improve an efficiency of a predictive relationship to its content, based on at least one of word frequency, overlap and topicality;
   (b) defining a topic set, said topic set being characterized as the set of semantic concepts which best discriminate the content of the documents containing them, said topic set being defined based on at least one of word frequency, overlap and topicality;
   (c) forming a matrix with the semantic concepts contained within the topic set defining one dimension of said matrix and the semantic concepts contained within the filtered set of documents comprising another dimension of said matrix;
   (d) calculating matrix entries as the conditional probability that a document in the database will contain each semantic concept in the topic set given that it contains each semantic concept in the filtered set of documents; and
   (e) providing said matrix entries from step (d) for creating the high dimensional vector.

5. The computer-implemented method of claim 3, wherein the attributes selected in step (1) comprise a text data type, a biopolymer sequence data type, and one other data type chosen from a numerical date type and a categorical data type.

6. The computer-implemented method of claim 3, wherein the attributes selected in step (1) comprise a text data type, a biopolymer sequence data type, a numerical data type, and a categorical data type.

7. A computer-implemented method for simultaneous visualization of disparate data types, the method comprising:
   (1) selecting a set of attributes associated with an object, the attributes selected comprising any three data types chosen from
       a text data type,
       a biopolymer sequence data type,
       a numerical data type, and
       a categorical data type;
   (2) creating a high dimensional vector representing the object by applying transformation operations to the selected attributes; and
   (3) projecting the high dimensional vector thereby visualizing the object based on the attributes selected;
wherein the transformation operations for the attributes of the text data type, if selected, comprise:
   (a) semantically filtering a set of documents in a database to extract a set of semantic concepts, to improve an efficiency of a predictive relationship to its content, based on at least one of word frequency, overlap and topicality;
   (b) defining a topic set, said topic set being characterized as the set of semantic concepts which best discriminate the content of the documents containing them, said topic set being defined based on at least one of word frequency, overlap and topicality;
   (c) forming a matrix with the semantic concepts contained within the topic set defining one dimension of said matrix and the semantic concepts contained within the filtered set of documents comprising another dimension of said matrix;
   (d) calculating matrix entries as the conditional probability that a document in the database will contain each semantic concept in the topic set given that it contains each semantic concept in the filtered set of documents; and
   (e) providing said matrix entries from step (d) for creating the high dimensional vector;
and wherein the transformation operations for the attributes of the biopolymer sequence data type, if selected, comprise:
   (i) comparing a sequence of each biopolymer material to a sequence of each other biopolymer material to provide respective comparison results;
   (ii) arranging the comparison results in a square matrix indexed by the plurality of biopolymer materials; and
   (iii) providing the square matrix entries for creating the high dimensional vector.

8. A computer-readable medium storing a software that when executed by a computer performs the method of any one of claims 1–7.

9. A device adapted to perform the method of claim 1–7.

10. The method of any of claims 1–7, wherein said application of transformation application on said selected attributes produces a vector representation of said object in correspondence with a uniform data structure.

11. A computer-readable medium storing a software that when executed by a computer performs the method of claim 10.

12. A device adapted to perform the method of claim 10.

13. The method of claim 10, further comprising using said representation to identify cluster groups of related objects.

14. A computer-readable medium storing a software that when executed by a computer performs the method of claim 13.

15. A device adapted to perform the method of claim 13.

* * * * *